US012812305B2

(12) United States Patent

Reed et al.

(10) Patent No.: US 12,812,305 B2
(45) Date of Patent: Nov. 24, 2026

(54) PROSTHESIS AUTOMATED ASSISTANT

(71) Applicants: Kieran Reed, Macquarie University (AU); Alexander Von Brasch, Macquarie University (AU); Stephen Fung, Macquarie University (AU)

(72) Inventors: Kieran Reed, Macquarie University (AU); Alexander Von Brasch, Macquarie University (AU); Stephen Fung, Macquarie University (AU)

(73) Assignee: Cochlear Limited, Macquarie University (AU)

( * ) Notice: Subject to any disclaimer, the term of this patent is extended or adjusted under 35 U.S.C. 154(b) by 573 days.

(21) Appl. No.: 17/315,913

(22) Filed: May 10, 2021

(65) Prior Publication Data

US 2022/0360909 A1 Nov. 10, 2022

Related U.S. Application Data

(63) Continuation of application No. 15/465,265, filed on Mar. 21, 2017, now abandoned.

(51) Int. Cl.
*H04R 25/00* (2006.01)
*G10L 15/22* (2006.01)

(52) U.S. Cl.
CPC .............. *H04R 25/30* (2013.01); *G10L 15/22* (2013.01)

(58) Field of Classification Search
CPC ......... G06F 3/167; H04R 25/70; H04R 25/30; G10L 15/22
See application file for complete search history.

(56) References Cited

U.S. PATENT DOCUMENTS

| | | | | |
|---|---|---|---|---|
| 6,774,795 | B2 | 8/2004 | Eshelman et al. | |
| 8,553,915 | B2 | 10/2013 | Nishizaki et al. | |
| 8,588,442 | B2 | 11/2013 | Schmitt et al. | |
| 8,718,288 | B2 | 5/2014 | Woods et al. | |
| 8,767,986 | B1 * | 7/2014 | Fabry | G16H 40/67 381/314 |
| 9,117,447 | B2 | 8/2015 | Gruber et al. | |
| 9,131,324 | B2 | 9/2015 | Goorevich et al. | |
| 11,086,593 | B2 * | 8/2021 | Boesen | A61B 5/6803 |
| 2010/0080398 | A1 | 4/2010 | Waldmann | |
| 2010/0142737 | A1 | 6/2010 | Roeck et al. | |
| 2011/0137656 | A1 * | 6/2011 | Xiang | H04R 25/505 381/312 |

(Continued)

FOREIGN PATENT DOCUMENTS

WO 2015024586 A1 2/2015

*Primary Examiner* — Joseph Saunders, Jr.
(74) *Attorney, Agent, or Firm* — Pilloff Passino & Cosenza LLP; Martin J. Cosenza

(57) ABSTRACT

A method, including implementing a hearing prosthesis automated assistant on one or more computing devices having one or more processors and memory, the method including, at the one or more computing devices, at an input device, receiving hearing prosthesis recipient input, the input invoking the automated assistant, the input being indicative of a problem associated with a hearing prosthesis of the recipient, interpreting the received recipient input to derive a representation of recipient intent, identifying at least one task based at least in part on the derived representation of user intent, and causing a first output to be provided, the first output providing an attempted solution to the problem.

41 Claims, 35 Drawing Sheets

(56) References Cited

U.S. PATENT DOCUMENTS

| | | | | |
|---|---|---|---|---|
| 2011/0245235 | A1* | 10/2011 | Hanley | A61P 27/16 514/357 |
| 2014/0194775 | A1* | 7/2014 | Van Hasselt | G16H 40/67 381/98 |
| 2015/0111188 | A1 | 4/2015 | Maruthurkkara | |
| 2015/0146876 | A1 | 5/2015 | Nishizaki | |
| 2016/0144178 | A1* | 5/2016 | Hillbratt | A61N 1/36038 607/57 |
| 2018/0275956 | A1 | 9/2018 | Reed et al. | |

* cited by examiner

PROSTHESIS AUTOMATED ASSISTANT

CROSS REFERENCE TO RELATED APPLICATIONS

The present application is a Continuation application of U.S. patent application Ser. No. 15/465,265, filed Mar. 21, 2017, naming Kieran REED as an inventor, the entire contents of that application being hereby incorporated by reference herein in its entirety.

BACKGROUND

Hearing loss, which may be due to many different causes, is generally of two types: conductive and sensorineural. Sensorineural hearing loss is due to the absence or destruction of the hair cells in the cochlea that transduce sound signals into nerve impulses. Various hearing prostheses are commercially available to provide individuals suffering from sensorineural hearing loss with the ability to perceive sound. One example of a hearing prosthesis is a cochlear implant.

Conductive hearing loss occurs when the normal mechanical pathways that provide sound to hair cells in the cochlea are impeded, for example, by damage to the ossicular chain or the ear canal. Individuals suffering from conductive hearing loss may retain some form of residual hearing because the hair cells in the cochlea may remain undamaged.

Individuals suffering from hearing loss typically receive an acoustic hearing aid. Conventional hearing aids rely on principles of air conduction to transmit acoustic signals to the cochlea. In particular, a hearing aid typically uses an arrangement positioned in the recipient's ear canal or on the outer ear to amplify a sound received by the outer ear of the recipient. This amplified sound reaches the cochlea causing motion of the perilymph and stimulation of the auditory nerve. Cases of conductive hearing loss typically are treated by means of bone conduction hearing aids. In contrast to conventional hearing aids, these devices use a mechanical actuator that is coupled to the skull bone to apply the amplified sound.

In contrast to hearing aids, which rely primarily on the principles of air conduction, certain types of hearing prostheses, commonly referred to as cochlear implants, convert a received sound into electrical stimulation. The electrical stimulation is applied to the cochlea, which results in the perception of the received sound.

Many devices, such as medical devices that interface with a recipient, have structural and/or functional features where there is utilitarian value in adjusting such features for an individual recipient. The process by which a device that interfaces with or otherwise is used by the recipient is tailored or customized or otherwise adjusted for the specific needs or specific wants or specific characteristics of the recipient is commonly referred to as fitting. One type of medical device where there is utilitarian value in fitting such to an individual recipient is the above-noted cochlear implant. That said, other types of medical devices, such as other types of hearing prostheses, exist where there is utilitarian value in fitting such to the recipient.

SUMMARY

In accordance with an exemplary embodiment, there is a method, comprising: implementing a hearing prosthesis automated assistant on one or more computing devices having one or more processors and memory, the method comprising: at the one or more computing devices: at an input device, receiving hearing prosthesis recipient input, the input invoking the automated assistant, the input being indicative of a problem associated with a hearing prosthesis of the recipient; interpreting the received recipient input to derive a representation of recipient intent; identifying at least one task based at least in part on the derived representation of user intent; and causing a first output to be provided, the first output providing an attempted solution to the problem.

In accordance with another exemplary embodiment, there is an automated assistant operating on one or more computing devices, the automated assistant comprising: an input device configured to receive first input based at least in part on usage of a prosthesis of a recipient; a dialog flow processor component, for identifying at least one prosthesis related task based least in part on the received first input; an action orchestration component, for identifying at least one action for responding to the identified task; and an output processor component configured to cause a first output to be provided based on the identified at least one action.

In accordance with another exemplary embodiment, there is a non-transitory computer-readable medium for implementing an automated assistant on one or more computing devices, the computer-readable medium having instructions stored thereon, the instructions, when executed by one or more processors, cause the processors to perform operations comprising: at an input device, receiving input from a prosthesis recipient and/or the prosthesis; invoking the automated assistant; identifying at least one of a plurality of core competencies of the automated assistant; interpreting the received recipient input, if present, to derive a representation of a recipient problem and analyzing data to develop a solution to the recipient problem; interpreting the received prosthesis input, if present, to identify a possible problem associated with operating the prosthesis in a manner indicated by the input; and causing a first output to be provided via an output interface of the automated assistant, the first output providing the solution to the recipient problem and/or warning of the possible problem.

BRIEF DESCRIPTION OF THE DRAWINGS

Embodiments are described below with reference to the attached drawings, in which.

DETAILED DESCRIPTION

Figure 1:
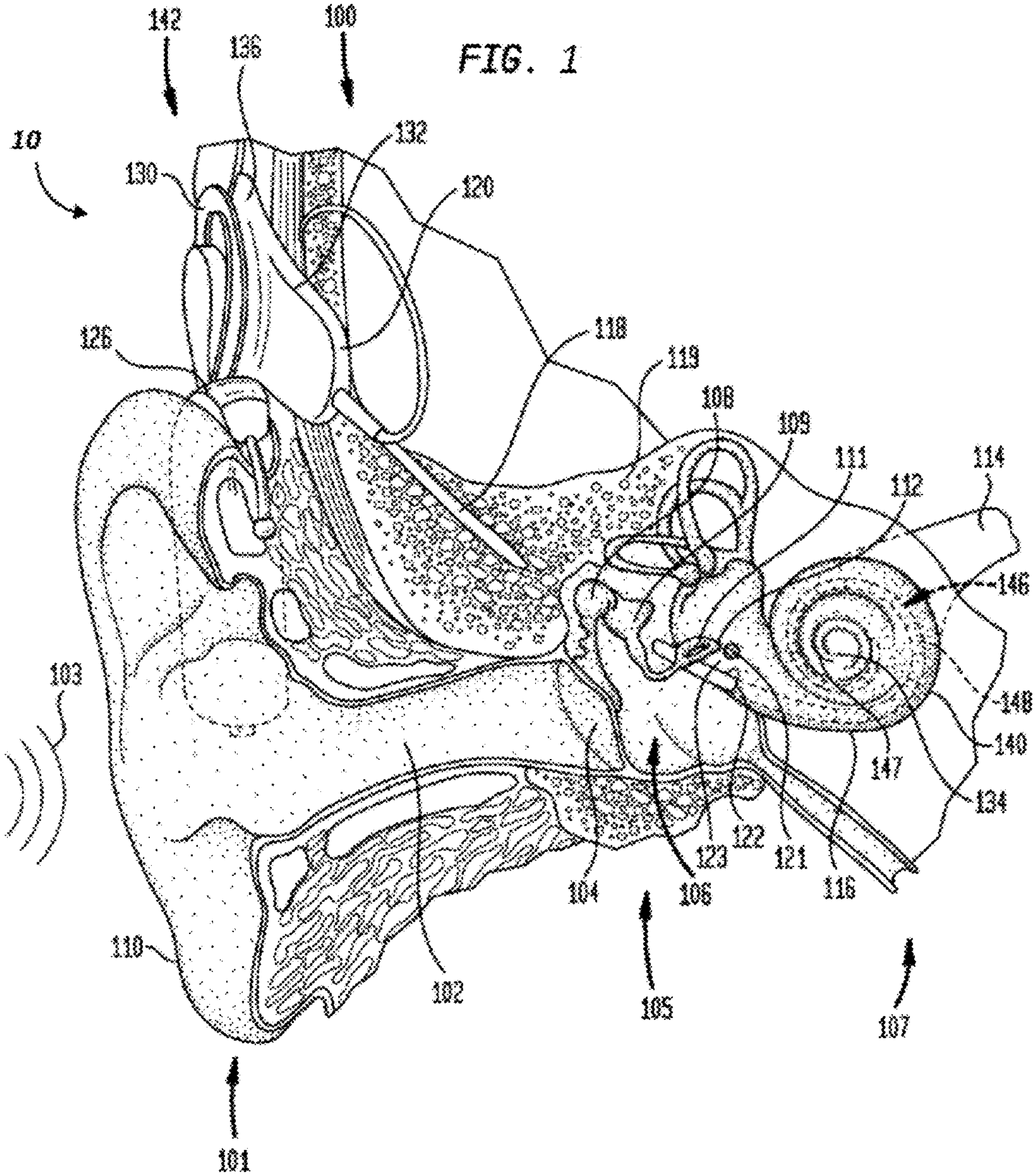
FIG. 1 is a perspective view of an exemplary hearing prosthesis in which at least some of the teachings detailed herein are applicable.

FIG. 1 is a perspective view of a cochlear implant, referred to as cochlear implant 100, implanted in a recipient, to which some embodiments detailed herein and/or variations thereof are applicable. The cochlear implant 100 is part of a system 10 that can include external components in some embodiments, as will be detailed below. It is noted that the teachings detailed herein are applicable, in at least some embodiments, to partially implantable and/or totally implantable cochlear implants (i.e., with regard to the latter, such as those having an implanted microphone and/or implanted battery). It is further noted that the teachings detailed herein are also applicable to other stimulating devices that utilize an electrical current beyond cochlear implants (e.g., auditory brain stimulators, pacemakers, etc.). Additionally, it is noted that the teachings detailed herein are also applicable to other types of hearing prostheses, such as by way of example only and not by way of limitation, bone conduction devices, direct acoustic cochlear stimulators, middle ear implants, etc. Indeed, it is noted that the teachings detailed herein are also applicable to so-called hybrid devices. In an exemplary embodiment, these hybrid devices apply both electrical stimulation and acoustic stimulation to the recipient. Any type of hearing prosthesis to which the teachings detailed herein and/or variations thereof that can have utility can be used in some embodiments of the teachings detailed herein.

In view of the above, it is to be understood that at least some embodiments detailed herein and/or variations thereof are directed towards a body-worn sensory supplement medical device (e.g., the hearing prosthesis of FIG. 1, which supplements the hearing sense, even in instances where all natural hearing capabilities have been lost). It is noted that at least some exemplary embodiments of some sensory supplement medical devices are directed towards devices such as conventional hearing aids, which supplement the hearing sense in instances where some natural hearing capabilities have been retained, and visual prostheses (both those that are applicable to recipients having some natural vision capabilities remaining and to recipients having no natural vision capabilities remaining). Accordingly, the teachings detailed herein are applicable to any type of sensory supplement medical device to which the teachings detailed herein are enabled for use therein in a utilitarian manner. In this regard, the phrase sensory supplement medical device refers to any device that functions to provide sensation to a recipient irrespective of whether the applicable natural sense is only partially impaired or completely impaired.

The recipient has an outer ear 101, a middle ear 105, and an inner ear 107. Components of outer ear 101, middle ear 105, and inner ear 107 are described below, followed by a description of cochlear implant 100.

In a fully functional ear, outer ear 101 comprises an auricle 110 and an ear canal 102. An acoustic pressure or sound wave 103 is collected by auricle 110 and channeled into and through ear canal 102. Disposed across the distal end of ear channel 102 is a tympanic membrane 104 which vibrates in response to sound wave 103. This vibration is coupled to oval window or fenestra ovalis 112 through three bones of middle ear 105, collectively referred to as the ossicles 106 and comprising the malleus 108, the incus 109, and the stapes 111. Bones 108, 109, and 111 of middle ear 105 serve to filter and amplify sound wave 103, causing oval window 112 to articulate, or vibrate in response to vibration of tympanic membrane 104. This vibration sets up waves of fluid motion of the perilymph within cochlea 140. Such fluid motion, in turn, activates tiny hair cells (not shown) inside of cochlea 140. Activation of the hair cells causes appropriate nerve impulses to be generated and transferred through the spiral ganglion cells (not shown) and auditory nerve 114 to the brain (also not shown) where they are perceived as sound.

As shown, cochlear implant 100 comprises one or more components which are temporarily or permanently implanted in the recipient. Cochlear implant 100 is shown in FIG. 1 with an external device 142, that is part of system 10 (along with cochlear implant 100), which, as described below, is configured to provide power to the cochlear implant, where the implanted cochlear implant includes a battery that is recharged by the power provided from the external device 142.

In the illustrative arrangement of FIG. 1, external device 142 can comprise a power source (not shown) disposed in a Behind-The-Ear (BTE) unit 126. External device 142 also includes components of a transcutaneous energy transfer link, referred to as an external energy transfer assembly. The transcutaneous energy transfer link is used to transfer power and/or data to cochlear implant 100. Various types of energy transfer, such as infrared (IR), electromagnetic, capacitive and inductive transfer, may be used to transfer the power and/or data from external device 142 to cochlear implant 100. In the illustrative embodiments of FIG. 1, the external energy transfer assembly comprises an external coil 130 that forms part of an inductive radio frequency (RF) communication link. External coil 130 is typically a wire antenna coil comprised of multiple turns of electrically insulated single-strand or multi-strand platinum or gold wire. External device 142 also includes a magnet (not shown) positioned within the turns of wire of external coil 130. It should be appreciated that the external device shown in FIG. 1 is merely illustrative, and other external devices may be used with embodiments of the present invention.

Cochlear implant 100 comprises an internal energy transfer assembly 132 which can be positioned in a recess of the temporal bone adjacent auricle 110 of the recipient. As detailed below, internal energy transfer assembly 132 is a component of the transcutaneous energy transfer link and receives power and/or data from external device 142. In the illustrative embodiment, the energy transfer link comprises an inductive RF link, and internal energy transfer assembly 132 comprises a primary internal coil 136. Internal coil 136 is typically a wire antenna coil comprised of multiple turns of electrically insulated single-strand or multi-strand platinum or gold wire.

Cochlear implant 100 further comprises a main implantable component 120 and an elongate electrode assembly 118. In some embodiments, internal energy transfer assembly 132 and main implantable component 120 are hermetically sealed within a biocompatible housing. In some embodiments, main implantable component 120 includes an implantable microphone assembly (not shown) and a sound processing unit (not shown) to convert the sound signals received by the implantable microphone in internal energy transfer assembly 132 to data signals. That said, in some alternative embodiments, the implantable microphone assembly can be located in a separate implantable component (e.g., that has its own housing assembly, etc.) that is in signal communication with the main implantable component 120 (e.g., via leads or the like between the separate implantable component and the main implantable component 120). In at least some embodiments, the teachings detailed herein and/or variations thereof can be utilized with any type of implantable microphone arrangement.

Main implantable component 120 further includes a stimulator unit (also not shown) which generates electrical stimulation signals based on the data signals. The electrical stimulation signals are delivered to the recipient via elongate electrode assembly 118.

Elongate electrode assembly 118 has a proximal end connected to main implantable component 120, and a distal end implanted in cochlea 140. Electrode assembly 118 extends from main implantable component 120 to cochlea 140 through mastoid bone 119. In some embodiments, electrode assembly 118 may be implanted at least in basal region 116, and sometimes further. For example, electrode assembly 118 may extend towards apical end of cochlea 140, referred to as cochlea apex 134. In certain circumstances, electrode assembly 118 may be inserted into cochlea 140 via a cochleostomy 122. In other circumstances, a cochleostomy may be formed through round window 121, oval window 112, the promontory 123 or through an apical turn 147 of cochlea 140.

Electrode assembly 118 comprises a longitudinally aligned and distally extending array 146 of electrodes 148, disposed along a length thereof. As noted, a stimulator unit generates stimulation signals which are applied by electrodes 148 to cochlea 140, thereby stimulating auditory nerve 114.

The prosthesis of FIG. 1 can be utilized in conjunction with the automated assistant/auto clinician teachings detailed herein. Typically, the description below will be directed towards two separate components: the prosthesis and a portable handheld electronic device. However, it is noted that in at least some exemplary embodiments, the auto clinician/automated assistant can be at least in part, part of the hearing prostheses. By way of example only and not by way of limitation, the functionality of the auto clinician can be based in components that are located in or otherwise part of a behind-the-ear device.

Various techniques will now be described in detail with reference to a few example embodiments thereof as illustrated in the accompanying drawings. In the following description, numerous specific details are set forth in order to provide a thorough understanding of one or more aspects and/or features described or reference herein. It will be apparent, however, to one skilled in the art, that one or more aspects and/or features described or reference herein may be practiced without some or all of these specific details. In other instances, well known process steps and/or structures have not been described in detail in order to not obscure some of the aspects and/or features described or reference herein.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. To the contrary, a variety of optional components are described to illustrate the wide variety of possible embodiments of one or more of the invention(s).

Further, although process steps, method steps, algorithms or the like may be described in a sequential order, such processes, methods and algorithms may be configured to work in alternate orders. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the invention(s), and does not imply that the illustrated process is preferred.

When a single device or article is described, it will be readily apparent that more than one device/article (whether or not they cooperate) may be used in place of a single device/article. Similarly, where more than one device or article is described (whether or not they cooperate), it will be readily apparent that a single device/article may be used in place of the more than one device or article.

The functionality and/or the features of a device may be alternatively embodied by one or more other devices that are not explicitly described as having such functionality/features. Thus, other embodiments of one or more of the invention(s) need not include the device itself.

Techniques and mechanisms described or reference herein will sometimes be described in singular form for clarity. However, it should be noted that particular embodiments include multiple iterations of a technique or multiple instantiations of a mechanism unless noted otherwise.

Although described within the context of intelligent automated assistant technology, it may be understood that the various aspects and techniques described herein (such as those associated with active ontologies, for example) may also be deployed and/or applied in other fields of technology involving human and/or computerized interaction with software.

Other aspects relating to intelligent automated assistant technology (e.g., which may be utilized by, provided by, and/or implemented at one or more intelligent automated assistant system embodiments described herein) are disclosed in one or more of the following references:

U.S. Provisional Patent Application Ser. No. 61/295,774 for "Intelligent Automated Assistant", filed Jan. 18, 2010, the disclosure of which is incorporated herein by reference;

U.S. patent application Ser. No. 11/518,292 for "Method And Apparatus for Building an Intelligent Automated Assistant", filed Sep. 8, 2006, the disclosure of which is incorporated herein by reference; and U.S. Provisional Patent Application Ser. No. 61/186,414 for "System and Method for Semantic Auto-Completion", filed Jun. 12, 2009, the disclosure of which is incorporated herein by reference.

The teachings detailed herein can use any one or more or all of the teachings of the aforementioned noted three patent applications, in at least some embodiments.

Hardware Architecture

Generally, the intelligent automated assistant techniques disclosed herein may be implemented on hardware or a combination of software and hardware. For example, they may be implemented in an operating system kernel, in a separate user process, in a library package bound into network applications, on a specially constructed machine, or on a network interface card. In a specific embodiment, the techniques disclosed herein may be implemented in software such as an operating system or in an application running on an operating system.

Briefly, it is noted that in an exemplary embodiment, the intelligent automated assistant techniques disclosed herein may be implemented on a personal handheld electronic device, such as a so-called smart phone or the like, a personal assistance device for a prosthesis (e.g., a device that is in signal communication with the hearing prosthesis, but separate therefrom that is utilized to provide control input or the like to the hearing prosthesis—the prosthesis can typically be utilized without this device—the device provides expanded input and capability beyond that which is the case resulting from the limited buttons and input components of the prosthesis itself (e.g., volume button, on/off button, etc.), or other types of devices, such as a personal computer (laptop and/or desktop), a smart pad, etc. Note further that in some exemplary embodiments, the intelligent automated assistant techniques disclosed herein may be implemented within the prosthesis itself. By way of example only and not by way of limitation, with respect to the exemplary embodiment where the prosthesis is a hearing prosthesis, the hearing prosthesis can be configured to receive verbal input from the recipient in a manner that enables the intelligent automated assistant techniques detailed herein to be practiced. Further, the output to the recipient could be the evocation of a hearing percept indicative of the results or the output of the intelligent automated assistant techniques. Any device, system, and/or method that can enable the teachings detailed herein can be utilized in at least some exemplary embodiments.

Software/hardware hybrid implementation(s) of at least some of the intelligent automated assistant embodiment(s) disclosed herein may be implemented on a programmable machine selectively activated or reconfigured by a computer program stored in memory. Such network devices may have multiple network interfaces which may be configured or designed to utilize different types of network communication protocols. A general architecture for some of these machines may appear from the descriptions disclosed herein. According to specific embodiments, at least some of the features and/or functionalities of the various intelligent automated assistant embodiments disclosed herein may be implemented on one or more general-purpose network host machines such as an end-user computer system, computer, network server or server system, mobile computing device (e.g., personal digital assistant, mobile phone, smartphone, laptop, tablet computer, or the like), consumer electronic device, or any other suitable electronic device, or any combination thereof. In at least some embodiments, at least some of the features and/or functionalities of the various intelligent automated assistant embodiments disclosed herein may be implemented in one or more virtualized computing environments (e.g., network computing clouds, or the like).

Figure 2:
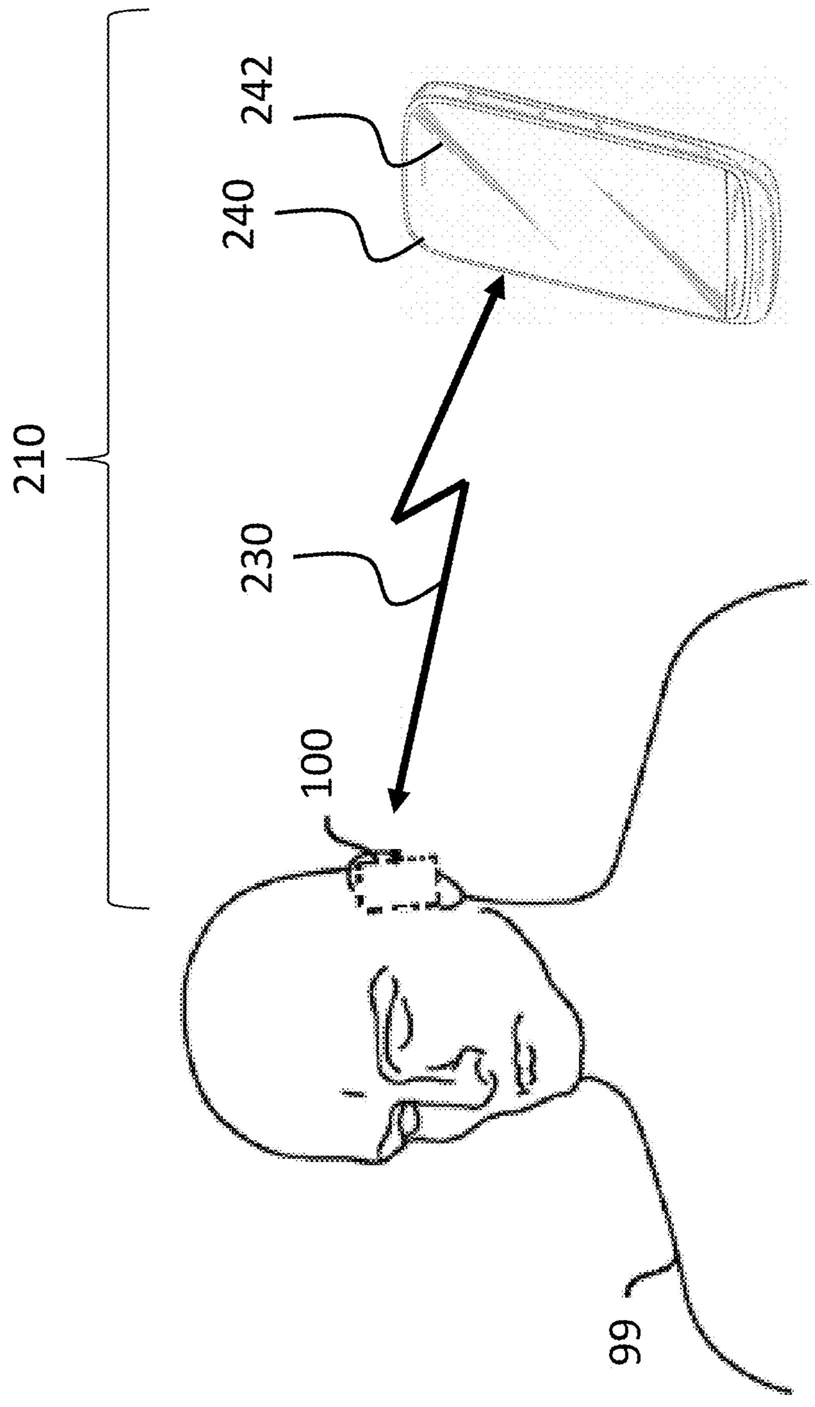
FIG. 2 presents an exemplary system including a hearing prosthesis and a remote device in the form of a portable handheld device.

FIG. 2 depicts an exemplary system 210 according to an exemplary embodiment, including hearing prosthesis 100, which, in an exemplary embodiment, corresponds to cochlear implant 100 detailed above, and a portable body carried device (e.g., a portable handheld device as seen in FIG. 2, a watch, a pocket device, etc.) 240 in the form of a mobile computer having a display 242. The system includes a wireless link 230 between the portable handheld device 240 and the hearing prosthesis 100. In an exemplary embodiment, the hearing prosthesis 100 is an implant implanted in recipient 99 (as represented functionally by the dashed lines of box 100 in FIG. 2). It is noted that while the embodiments detailed herein will be described in terms of utilization of a cochlear implant, alternative embodiments can be utilized in other types of hearing prostheses, such as by way of example only and not by way of limitation, bone conduction devices (percutaneous, active transcutaneous, and/or passive transcutaneous), or Direct Acoustic Cochlear Implants (DACI). That said, in an alternate embodiment, the hearing prosthesis 100 can be a non-implantable component, such as a conventional hearing aid (e.g., using an in-the-ear speaker/receiver). Still further, in an exemplary embodiment, the hearing prosthesis 100 can be a multimodal device (two or more types of stimulation and/or two or more components (one implanted and one external component)), such as a hybrid device (available from Cochlear LTD of Australia). Hereinafter, the hearing prosthesis 100 will be described in terms of a cochlear implant for simplicity. Also, it is noted that the teachings detailed herein can also be applicable to non-hearing related prostheses, such as retinal implants, prosthetic limbs, etc. However, unless otherwise specified or otherwise impractical due to technology limitations, any disclosure herein relating to the cochlear implant also corresponds to a disclosure relating to another type of prosthesis (another type of hearing prosthesis or otherwise). That is, any disclosure herein with regard to one of these types of hearing prostheses corresponds to a disclosure of another of these types of hearing prostheses or any other prosthetic medical device, unless otherwise specified, or unless the disclosure thereof is incompatible with a given hearing prosthesis based on the current state of technology. It is noted that some embodiments detailed herein will be described in terms of a portable body carried device in the form of a portable handheld device such as a smartphone. Any disclosure herein regarding a portable handheld device also corresponds to a disclosure of any other type of portable body carried device, such as by way of example only and not by way of limitation, a smartwatch, a pocket carried device, etc., as well as any other type of device that can enable the teachings detailed herein (PC, prosthesis based intelligence automated assistant, etc.).

In an exemplary embodiment, the system 210 is configured such that the hearing prosthesis 100 and the portable handheld device 240 have a symbiotic relationship. In an exemplary embodiment, the symbiotic relationship is the ability to display data relating to, and, in at least some instances, the ability to control, one or more functionalities of the hearing prosthesis 100. In an exemplary embodiment, this can be achieved via the ability of the handheld device 240 to receive data from the hearing prosthesis 100 via the wireless link 230 (although in other exemplary embodiments, other types of links, such as by way of example, a wired link, can be utilized). As will also be detailed below, this can be achieved via communication with a geographically remote device in communication with the hearing prosthesis 100 and/or the portable handheld device 240 via link, such as by way of example only and not by way of limitation, an Internet connection or a cell phone connection. In some such exemplary embodiments, the system 210 can further include the geographically remote apparatus as well. Again, additional examples of this will be described in greater detail below.

As noted above, in an exemplary embodiment, the portable handheld device 240 comprises a mobile computer and a display 242. In an exemplary embodiment, the display 242 is a touchscreen display. In an exemplary embodiment, the portable handheld device 240 also has the functionality of a portable cellular telephone. In this regard, device 240 can be, by way of example only and not by way of limitation, a smart phone as that phrase is utilized generically. That is, in an exemplary embodiment, portable handheld device 240 comprises a smart phone, again as that term is utilized generically.

The phrase "mobile computer" entails a device configured to enable human-computer interaction, where the computer is expected to be transported away from a stationary location during normal use. Again, in an exemplary embodiment, the portable handheld device 240 is a smart phone as that term is generically utilized. However, in other embodiments, less sophisticated (or more sophisticated) mobile computing devices can be utilized to implement the teachings detailed herein and/or variations thereof. Any device, system, and/or method that can enable the teachings detailed herein and/or variations thereof to be practiced can be utilized in at least some embodiments. (As will be detailed below, in some instances, device 240 is not a mobile computer, but instead a remote device (remote from the hearing prosthesis 100. Some of these embodiments will be described below).)

In an exemplary embodiment, the portable handheld device 240 is configured to receive data from a hearing prosthesis and present an interface display on the display from among a plurality of different interface displays based on the received data. Exemplary embodiments will sometimes be described in terms of data received from the hearing prosthesis 100. However, it is noted that any disclosure that is also applicable to data sent to the hearing prosthesis from the handheld device 240 is also encompassed by such disclosure, unless otherwise specified or otherwise incompatible with the pertinent technology (and vice versa).

In an exemplary embodiment, displays presented on display 242 can have the functionality for general control of the hearing prosthesis 100 and/or have the functionality to present information associated with the hearing prosthesis 100 (these functionalities are not mutually exclusive).

It is further noted that in at least some exemplary embodiments, the data received by the portable handheld device 240 entails any contextual data that can be provided by any component of a prosthesis system (the implantable component and the external components (both the prosthesis component and the support component(s), such as a remote assistant) to a portable handheld device or to a remote device. Also, it is noted that in at least some exemplary embodiments, any display that can have utilitarian value (such as serving as the interface for an app) can be presented based on the received data.

Figure 21:
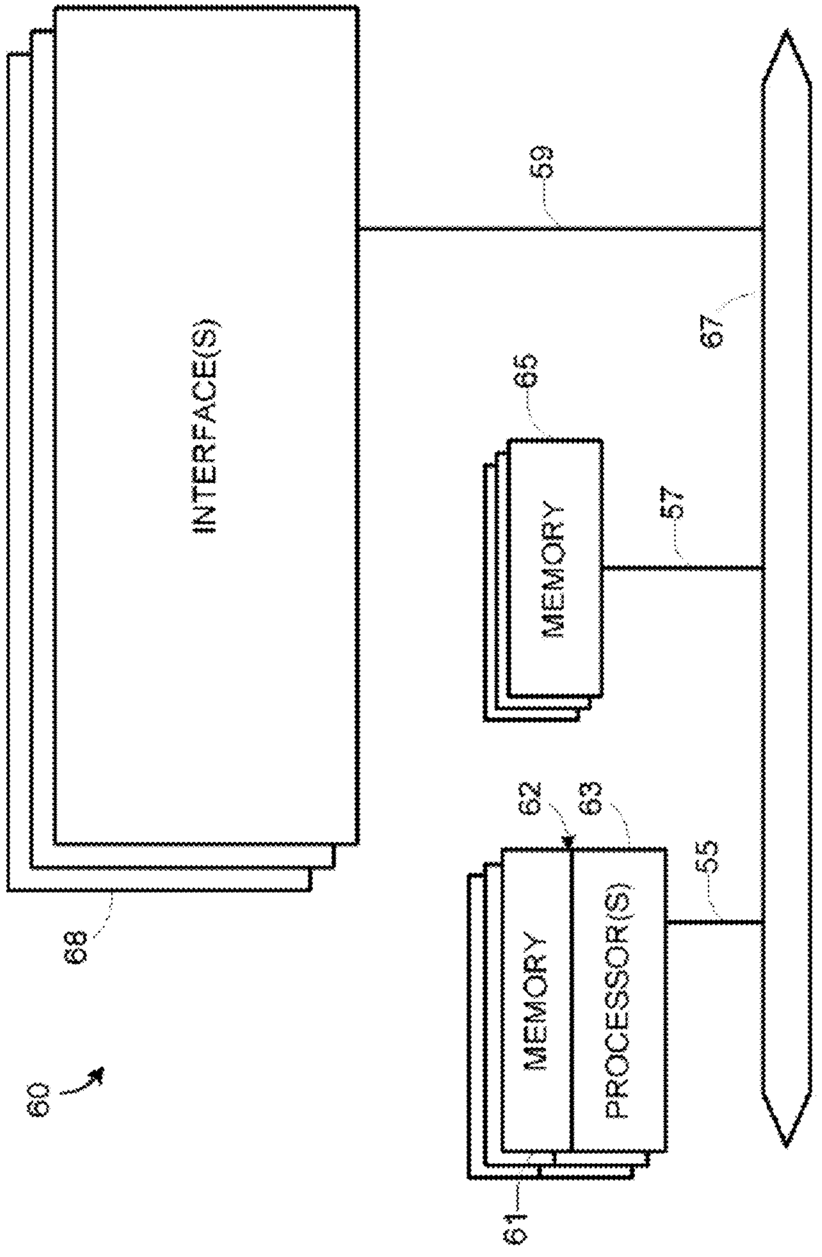
FIG. 21 is a block diagram depicting a computing device suitable for implementing at least a portion of an intelligent automated assistant according to at least one embodiment.

Referring now to FIG. 21, there is shown a block diagram depicting a computing device 60 suitable for implementing at least a portion of the intelligent automated assistant features and/or functionalities disclosed herein. Computing device 60 may be, for example, an end-user computer system, network server or server system, mobile computing device (e.g., personal digital assistant, mobile phone, smartphone, laptop, tablet computer, or the like), consumer electronic device, music player, or any other suitable electronic device, or any combination or portion thereof. Computing device 60 may be adapted to communicate with other computing devices, such as clients and/or servers, over a communications network such as the Internet, using known protocols for such communication, whether wireless or wired. In an exemplary embodiment, any of these components can be represented by element 240 of FIG. 2.

In one embodiment, computing device 60 includes central processing unit (CPU) 62, interfaces 68, and a bus 67 (such as a peripheral component interconnect (PCI) bus). When acting under the control of appropriate software or firmware, CPU 62 may be responsible for implementing specific functions associated with the functions of a specifically configured computing device or machine. For example, in at least one embodiment, a user's personal digital assistant (PDA) may be configured or designed to function as an intelligent automated assistant system utilizing CPU 62, memory 61, 65, and interface(s) 68. In at least one embodiment, the CPU 62 may be caused to perform one or more of the different types of intelligent automated assistant functions and/or operations under the control of software modules/components, which for example, may include an operating system and any appropriate applications software, drivers, and the like.

CPU 62 may include one or more processor(s) 63 such as, for example, a processor from the Motorola or Intel family of microprocessors or the MIPS family of microprocessors. In some embodiments, processor(s) 63 may include specially designed hardware (e.g., application-specific integrated circuits (AS-ICs), electrically erasable programmable read-only memories (EEPROMs), field-programmable gate arrays (FPGAs), and the like) for controlling the operations of computing device 60. In a specific embodiment, a memory 61 (such as non-volatile random access memory (RAM) and/or read-only memory (ROM)) also forms part of CPU 62. However, there are many different ways in which memory may be coupled to the system. Memory block 61 may be used for a variety of purposes such as, for example, caching and/or storing data, programming instructions, and the like.

As used herein, the term "processor" is not limited merely to those integrated circuits referred to in the art as a processor, but broadly refers to a microcontroller, a microcomputer, a programmable logic controller, an application-specific integrated circuit, and any other programmable circuit.

In one embodiment, interfaces 68 are provided as interface cards (sometimes referred to as "line cards"). Generally, they control the sending and receiving of data packets over a computing network and sometimes support other peripherals used with computing device 60. Among the interfaces that may be provided are Ethernet interfaces, frame relay interfaces, cable interfaces, DSL interfaces, token ring interfaces, and the like. In addition, various types of interfaces may be provided such as, for example, universal serial bus (USB), Serial, Ethernet, Firewire, PCI, parallel, radio frequency (RF), Bluetooth™, near-field communications (e.g., using near-field magnetics), 802.11 (WiFi), frame relay, TCP/IP, ISDN, fast Ethernet interfaces, Gigabit Ethernet interfaces, asynchronous transfer mode (ATM) interfaces, high-speed serial interface (HSSI) interfaces, Point of Sale (POS) interfaces, fiber data distributed interfaces (FDDIs), and the like. Generally, such interfaces 68 may include ports appropriate for communication with the appropriate media. In some cases, they may also include an independent processor and, in some instances, volatile and/or non-volatile memory (e.g., RAM).

Although the system shown in FIG. 21 illustrates one specific architecture for a computing device 60 for implementing the techniques of the invention described herein, it is by no means the only device architecture on which at least a portion of the features and techniques described herein may be implemented. For example, architectures having one or any number of processors 63 can be used, and such processors 63 can be present in a single device or distributed among any number of devices. In one embodiment, a single processor 63 handles communications as well as routing computations. In various embodiments, different types of intelligent automated assistant features and/or functionalities may be implemented in an intelligent automated assistant system which includes a client device (such as a personal digital assistant or smartphone running client software) and server system(s) (such as a server system described in more detail below).

Regardless of network device configuration, the system of the present invention may employ one or more memories or memory modules (such as, for example, memory block 65) configured to store data, program instructions for the general-purpose network operations and/or other information relating to the functionality of the intelligent automated assistant techniques described herein. The program instructions may control the operation of an operating system and/or one or more applications, for example. The memory or memories may also be configured to store data structures, keyword taxonomy information, advertisement information, user click and impression information, and/or other specific non-program information described herein.

Because such information and program instructions may be employed to implement the systems/methods described herein, at least some network device embodiments may include nontransitory machine-readable storage media, which, for example, may be configured or designed to store program instructions, state information, and the like for performing various operations described herein. Examples of such nontransitory machine-readable storage media include, but are not limited to, magnetic media such as hard disks, floppy disks, and magnetic tape; optical media such as CD-ROM disks; magneto-optical media such as floptical disks, and hardware devices that are specially configured to store and perform program instructions, such as read-only memory devices (ROM), flash memory, memristor memory, random access memory (RAM), and the like. Examples of program instructions include both machine code, such as produced by a compiler, and files containing higher level code that may be executed by the computer using an interpreter.

Figure 3:
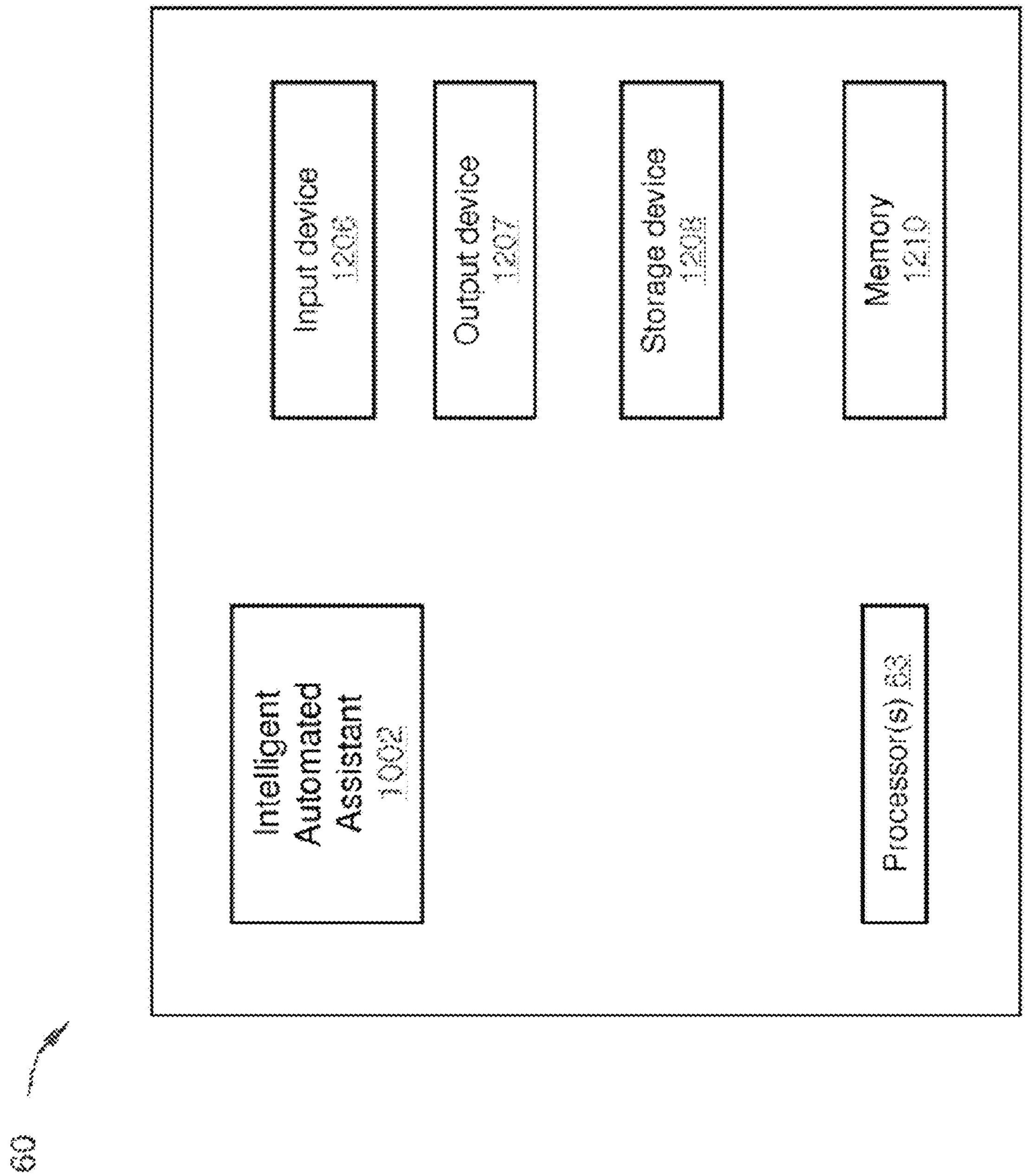
FIG. 3 is a block diagram depicting an architecture for implementing at least a portion of an intelligent automated assistant on a standalone computing system, according to at least one embodiment.

In one embodiment, the system of the present invention is implemented on a standalone computing system. Referring now to FIG. 3, there is shown a block diagram depicting an architecture for implementing at least a portion of an intelligent automated assistant on a standalone computing system, according to at least one embodiment. Computing device 60 includes processor(s) 63 which run software for implementing intelligent automated assistant 1002 (described in greater detail below). Input device 1206 can be of any type suitable for receiving user input, including for example a keyboard, touchscreen (e.g., that of screen 242), microphone (for example, for voice input—for example, of the prosthesis, of the device 240, etc.), mouse, touchpad, trackball, five-way switch, joystick, and/or any combination thereof. Output device 1207 can be a screen (and such can be the same as screen 242—input and output device can be the same), speaker, printer, and/or any combination thereof. Memory 1210 can be random-access memory having a structure and architecture as are known in the art, for use by processor(s) 63 in the course of running software. Storage device 1208 can be any magnetic, optical, and/or electrical storage device for storage of data in digital form; examples include flash memory, magnetic hard drive, CD-ROM, and/or the like.

Figure 4:
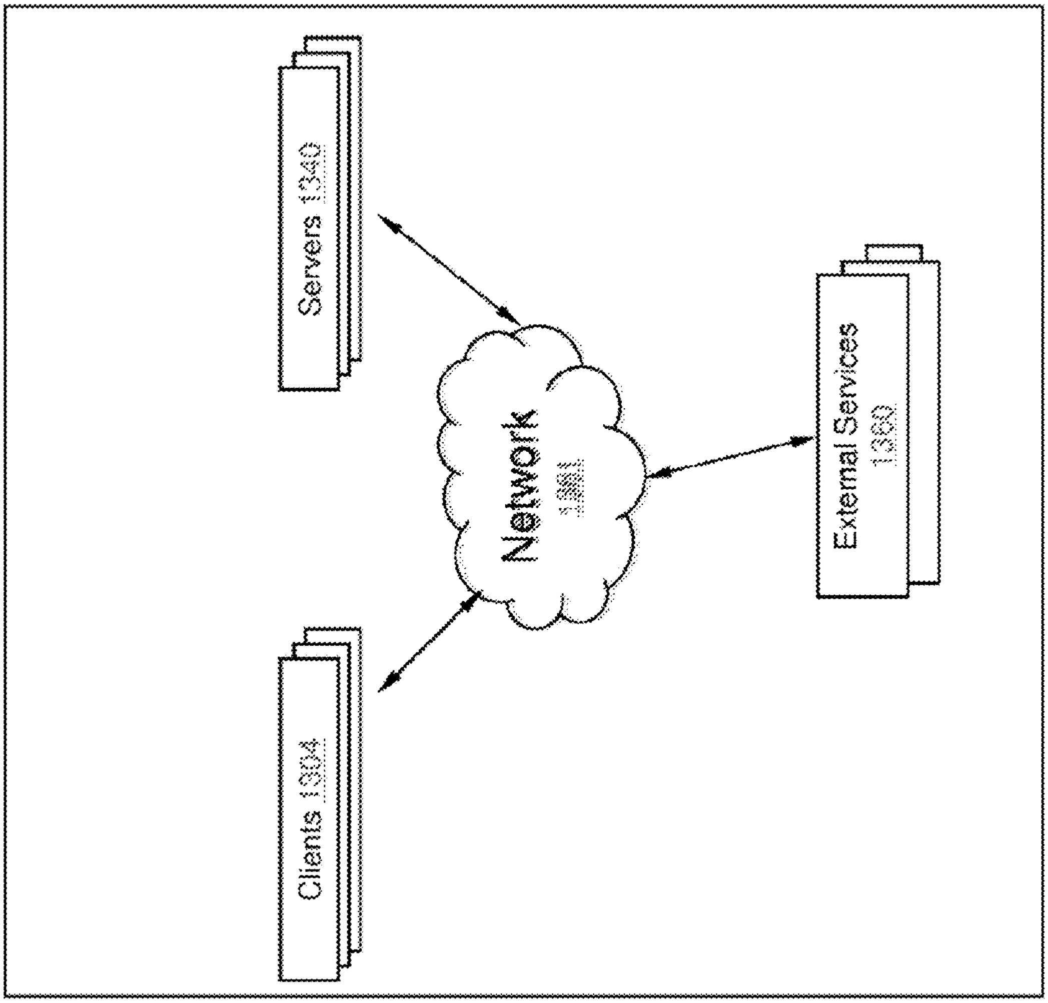
FIG. 4 is a block diagram depicting an architecture for implementing at least a portion of an intelligent automated assistant on a distributed computing network, according to at least one embodiment.

In another embodiment, the system of the present invention is implemented on a distributed computing network, such as one having any number of clients and/or servers. Referring now to FIG. 4, there is shown a block diagram depicting an architecture for implementing at least a portion of an intelligent automated assistant on a distributed computing network, according to at least one embodiment.

In the arrangement shown in FIG. 4, any number of clients 1304 are provided; each client 1304 may run software for implementing client-side portions of the present invention. In addition, any number of servers 1340 can be provided for handling requests received from clients 1304. Clients 1304 and servers 1340 can communicate with one another via electronic network 1361, such as the Internet. Network 1361 may be implemented using any known network protocols, including for example wired and/or wireless protocols.

In addition, in one embodiment, servers 1340 can call external services 1360 when needed to obtain additional information or refer to store data concerning previous interactions with particular users. Communications with external services 1360 can take place, for example, via network 1361. In various embodiments, external services 1360 include web-enabled services and/or functionality related to or installed on the hardware device itself. For example, in an embodiment where assistant 1002 (described in greater detail below) is implemented on a smartphone or other electronic device (e.g., device 240 of FIG. 2, etc., the prosthesis, etc.), assistant 1002 can obtain information stored in an application ("app"), contacts, other files, and/or other sources.

In various embodiments, assistant 1002 can control many features and operations of an electronic device on which it is installed. For example, assistant 1002 can call external services 1360 that interface with functionality and applications on a device via APIs or by other means, to perform functions and operations that might otherwise be initiated using a conventional user interface on the device. Such functions and operations may include, for example, with respect to a multi-function system beyond that associated with a prosthesis, setting an alarm, making a telephone call, sending a text message or email message, adding a calendar event, and the like. With respect to the features associated with the hearing prosthesis, such functions and operations can include, for example, a scenario where an ambient sound is captured and analyzed to improve the performance of a hearing prosthesis, as will be described in greater detail below. Any of the functionalities associated with the auto-clinician embodiments detailed herein and variations thereof can be implemented in this matter. Such functions and operations may be performed as add-on functions in the context of a conversational dialog between a user and assistant 1002. Such functions and operations can be specified by the user in the context of such a dialog, or they may be automatically performed based on the context of the dialog. One skilled in the art will recognize that assistant 1002 can thereby be used as a control mechanism for initiating and controlling various operations on the electronic device, which may be used as an alternative to conventional mechanisms such as buttons or graphical user interfaces.

For example, the user may provide input to assistant 1002 such as "I am having problems hearing my girlfriend who is 3 feet away and speaking directly at my microphone." Once assistant 1002 has determined the user's intent, using the techniques described herein, assistant 1002 can call external services 1340 to interface with an auto clinician function or application on the device. Assistant 1002 analyzes the ambient sound, by way of example only, and adjust a setting of the hearing prosthesis on behalf of the user. In this manner, the user can use assistant 1002 as a replacement for conventional mechanisms for not just adjusting the prosthesis or performing other functions on the device, but also having the assistant 1002 performed diagnostic functions and adjust the prosthesis accordingly (e.g., adjust a beamforming feature) or, in some alternate embodiments, provide a suggestion to the recipient as to what he or she should do (e.g., reposition microphone, move to another location, adjust a beamforming feature, etc.). If the user's requests are ambiguous or need further clarification, assistant 1002 can use the various techniques described herein, including active elicitation, paraphrasing, suggestions, and the like, to obtain the needed information so that the correct services 1340 are called and the intended action taken. In one embodiment, assistant 1002 may prompt the user for confirmation before calling a service 1340 to perform a function. In one embodiment, a user can selectively disable assistant's 1002 ability to call particular services 1340, or can disable all such service-calling if desired.

Figure 5:
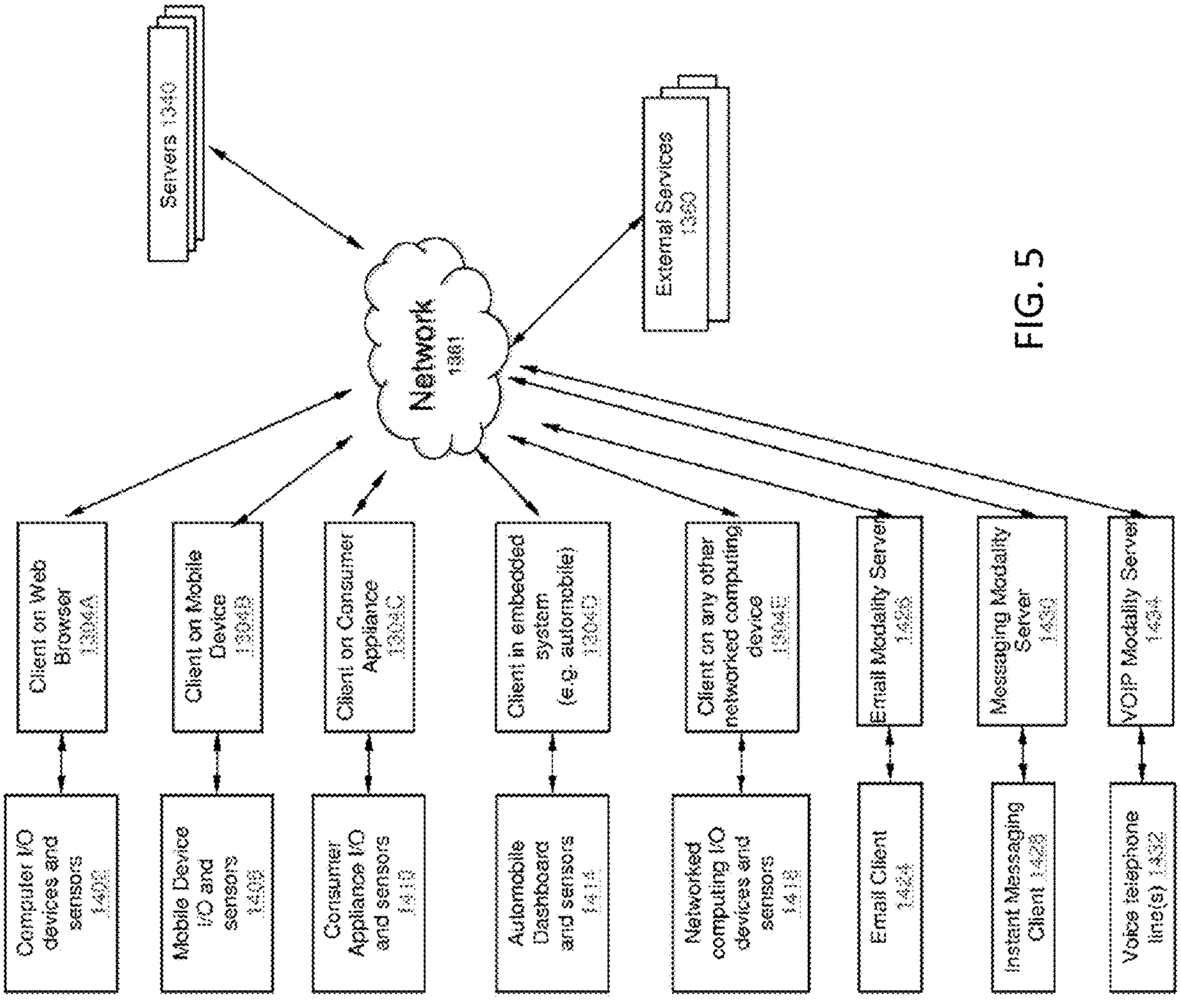
FIG. 5 is a block diagram depicting a system architecture illustrating several different types of clients and modes of operation.

The system of the present invention can be implemented with many different types of clients 1304 and modes of operation. Referring now to FIG. 5, there is shown a block diagram depicting a system architecture illustrating several different types of clients 1304 and modes of operation. One skilled in the art will recognize that the various types of clients 1304 and modes of operation shown in FIG. 5 are merely exemplary, and that the system of the present invention can be implemented using clients 1304 and/or modes of operation other than those depicted. Additionally, the system can include any or all of such clients 1304 and/or modes of operation, alone or in any combination. Depicted examples include:

A. Computer devices with input/output devices and/or sensors 1402. A client component may be deployed on any such computer device 1402. At least one embodiment may be implemented using a web browser 1304A or other software application for enabling communication with servers 1340 via network 1361. Input and output channels may of any type, including for example visual and/or auditory channels. For example, in one embodiment, the system of the invention can be implemented using voice-based communication methods, allowing for an embodiment of the assistant for the blind whose equivalent of a web browser is driven by speech and uses speech for output.

B. Mobile Devices with I/O and sensors 1406, for which the client may be implemented as an application on the mobile device 1304B. This includes, but is not limited to, mobile phones (e.g., device 240), smartphones, personal digital assistants, tablet devices, networked game consoles, and the like (again, all of which are conceptually represented by device 240).

C. Consumer Appliances with I/O and sensors 1410, for which the client may be implemented as an embedded application on the appliance 1304C.

D. Automobiles and other vehicles with dashboard interfaces and sensors 1414, for which the client may be implemented as an embedded system application 1304D. This includes, but is not limited to, car navigation systems, voice control systems, in-car entertainment systems, and the like.

E. Networked computing devices such as routers 1418 or any other device that resides on or interfaces with a network, for which the client may be implemented as a device-resident application 1304E.

F. Email clients 1424, for which an embodiment of the assistant is connected via an Email Modality Server 1426. Email Modality server 1426 acts as a communication bridge, for example taking input from the user as email messages sent to the assistant and sending output from the assistant to the user as replies.

G. Instant messaging clients 1428, for which an embodiment of the assistant is connected via a Messaging Modality Server 1430. Messaging Modality server 1430 acts as a communication bridge, taking input from the user as messages sent to the assistant and sending output from the assistant to the user as messages in reply.

H. Voice telephones 1432, for which an embodiment of the assistant is connected via a Voice over Internet Protocol (VoIP) Modality Server 1434. VoIP Modality server 1430 acts as a communication bridge, taking input from the user as voice spoken to the assistant and sending output from the assistant to the user, for example as synthesized speech, in reply.

For messaging platforms including but not limited to email, instant messaging, discussion forums, group chat sessions, live help or customer support sessions and the like, assistant 1002 may act as a participant in the conversations. Assistant 1002 may monitor the conversation and reply to individuals or the group using one or more the techniques and methods described herein for one-to-one interactions. By way of example only and not by way of limitation, in an exemplary embodiment, the auto clinician can monitor the actions of the recipient and/or the ambient environment of the recipient and extrapolate that the recipient is having problems or otherwise is not taking action or otherwise has difficulty, and thus implement the auto clinician accordingly. Indeed, it is noted that in at least some exemplary embodiments, any of the input to any of the systems detailed herein can be analyzed utilizing the intelligent automated assistant to determine when the features of the auto clinician should be implemented.

Figure 6:
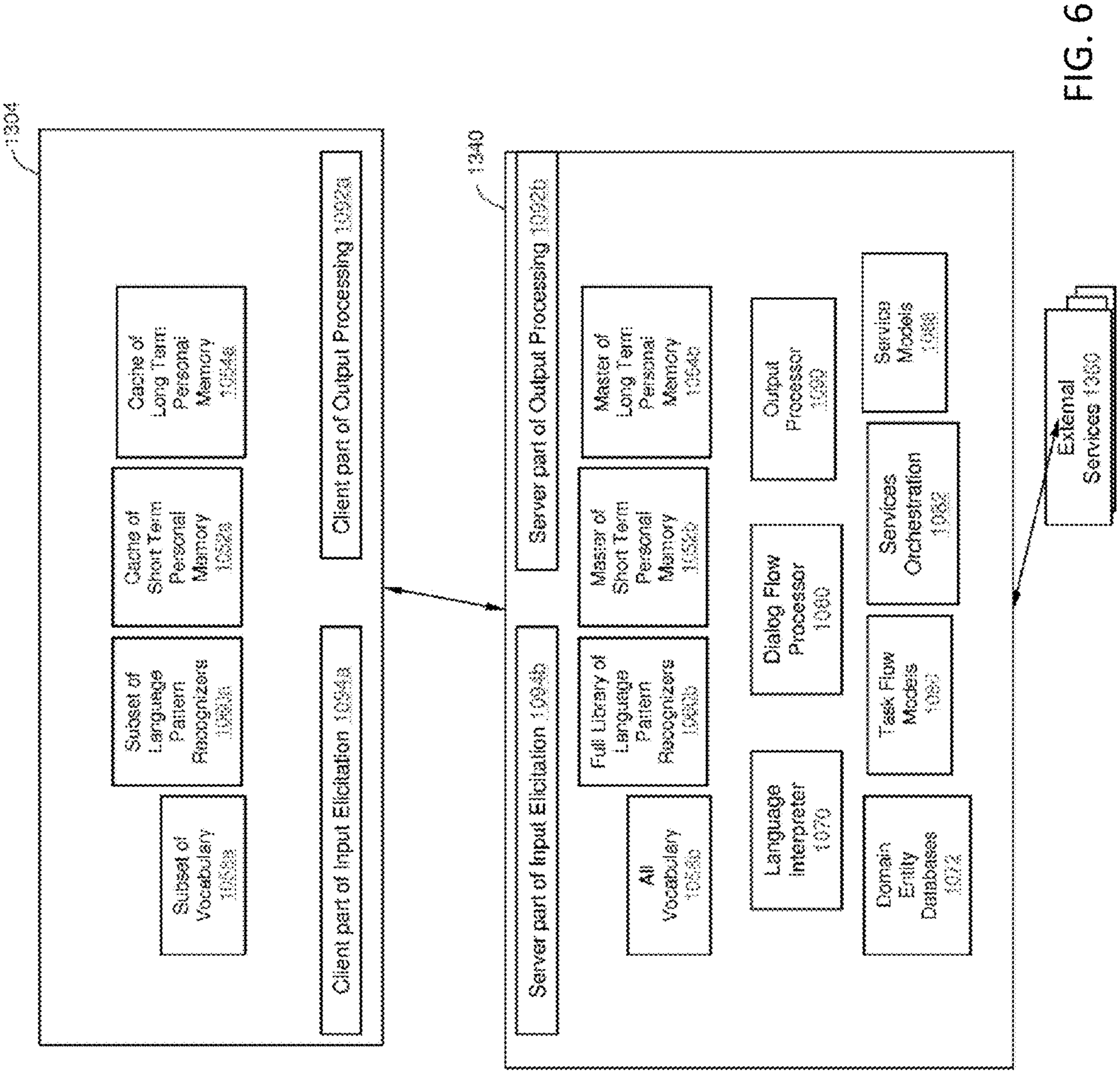
FIG. 6 is a block diagram depicting a client and a server, which communicate with each other to implement the present invention according to one embodiment.

In various embodiments, functionality for implementing the techniques of the present invention can be distributed among any number of client and/or server components. For example, various software modules can be implemented for performing various functions in connection with the present invention, and such modules can be variously implemented to run on server and/or client components. Referring now to FIG. 6, there is shown an example of a client 1304 and a server 1340, which communicate with each other to implement the present invention according to one embodiment. FIG. 6 depicts one possible arrangement by which software modules can be distributed among client 1304 and server 1340. One skilled in the art will recognize that the depicted arrangement is merely exemplary, and that such modules can be distributed in many different ways. In addition, any number of clients 1304 and/or servers 1340 can be provided, and the modules can be distributed among these clients 1304 and/or servers 1340 in any of a number of different ways.

In the example of FIG. 6, input elicitation functionality and output processing functionality are distributed among client 1304 and server 1340, with client part of input elicitation 1094 *a* and client part of output processing 1092 *a* located at client 1304, and server part of input elicitation 1094 *b* and server part of output processing 1092 *b* located at server 1340. The following components are located at server 1340:

complete vocabulary 1058 *b;*
complete library of language pattern recognizers 1060 *b;*
master version of short term personal memory 1052 *b;*
master version of long term personal memory 1054 *b.*

In one embodiment, client 1304 maintains subsets and/or portions of these components locally, to improve responsiveness and reduce dependence on network communications. Such subsets and/or portions can be maintained and updated according to well-known cache management techniques. Such subsets and/or portions include, for example:

subset of vocabulary 1058 *a;*
subset of library of language pattern recognizers 1060 *a;*
cache of short term personal memory 1052 *a;*
cache of long term personal memory 1054 *a.*

Additional components may be implemented as part of server 1340, including for example:

language interpreter 1070;
dialog flow processor 1080;
output processor 1090;
domain entity databases 1072;
task flow models 1086;
services/action orchestration 1082;
service capability models 1088.

Each of these components will be described in more detail below. Server 1340 obtains additional information by interfacing with external services 1360 when needed.

Conceptual Architecture

Figure 7:
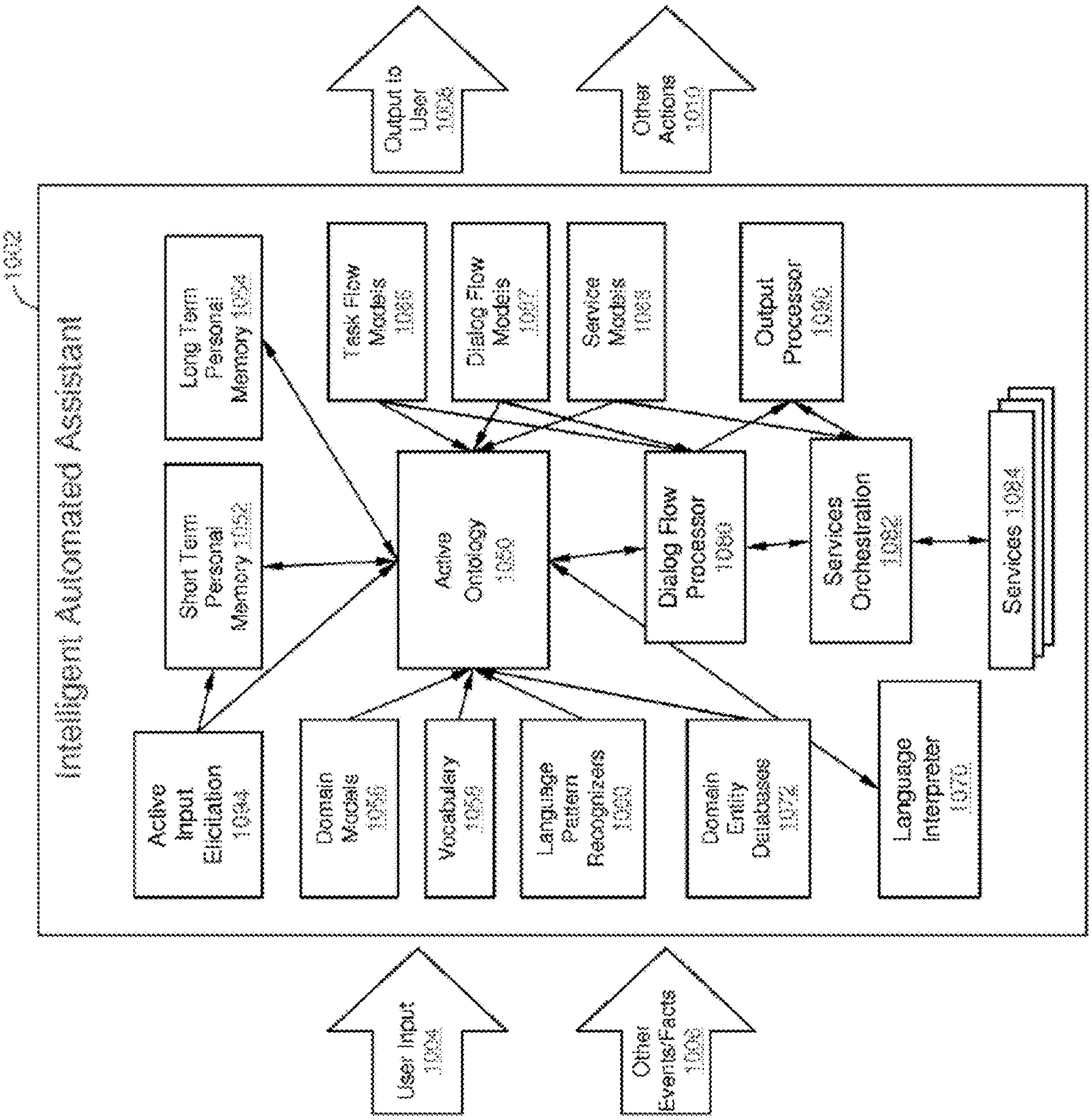
FIG. 7 is a block diagram depicting a fragment of an active ontology according to one embodiment.

Referring now to FIG. 7, there is shown a simplified block diagram of a specific example embodiment of an intelligent automated assistant 1002. As described in greater detail herein, different embodiments of intelligent automated assistant systems may be configured, designed, and/or operable to provide various different types of operations, functionalities, and/or features generally relating to intelligent automated assistant technology. Further, as described in greater detail herein, many of the various operations, functionalities, and/or features of the intelligent automated assistant system(s) disclosed herein may provide may enable or provide different types of advantages and/or benefits to different entities interacting with the intelligent automated assistant system(s). The embodiment shown in FIG. 7 may be implemented using any of the hardware architectures described above, or using a different type of hardware architecture.

For example, according to different embodiments, at least some intelligent automated assistant system(s) may be configured, designed, and/or operable to provide various different types of operations, functionalities, and/or features, such as, for example, one or more of the following (or combinations thereof):

- automate the application of data and services available over the Internet (albeit in some instances, proprietary technology/technology that is licensed to the recipient). In addition to automating the process of using these data and services, intelligent automated assistant 1002 may also enable the combined use of several sources of data and services at once.
- enable the operation of applications and services via natural language dialog that are otherwise provided by dedicated applications with graphical user interfaces. In one embodiment, assistant 1002 can be used to initiate, operate, and control many functions and apps available on the device.
- enable the operation of the auto clinician (which is not mutually exclusive from the above and/or below) via natural language dialog or any other input regime and/or enable a specific functionality or more than one specific functionality of the auto clinician (again, which is not mutually exclusive from the above and/or the below) via natural language which dialogue or any other input regime.
- Offer personal recommendations for improvements or otherwise changes to the hearing prosthesis or otherwise changes to the recipients actions or activities, or any other kind of recommendation service that benefits from an interactive dialog in natural language and automated access to data and services.

According to different embodiments, at least a portion of the various types of functions, operations, actions, and/or other features provided by intelligent automated assistant 1002 may be implemented at one or more client systems(s), at one or more server systems (s), and/or combinations thereof.

Figure 33:
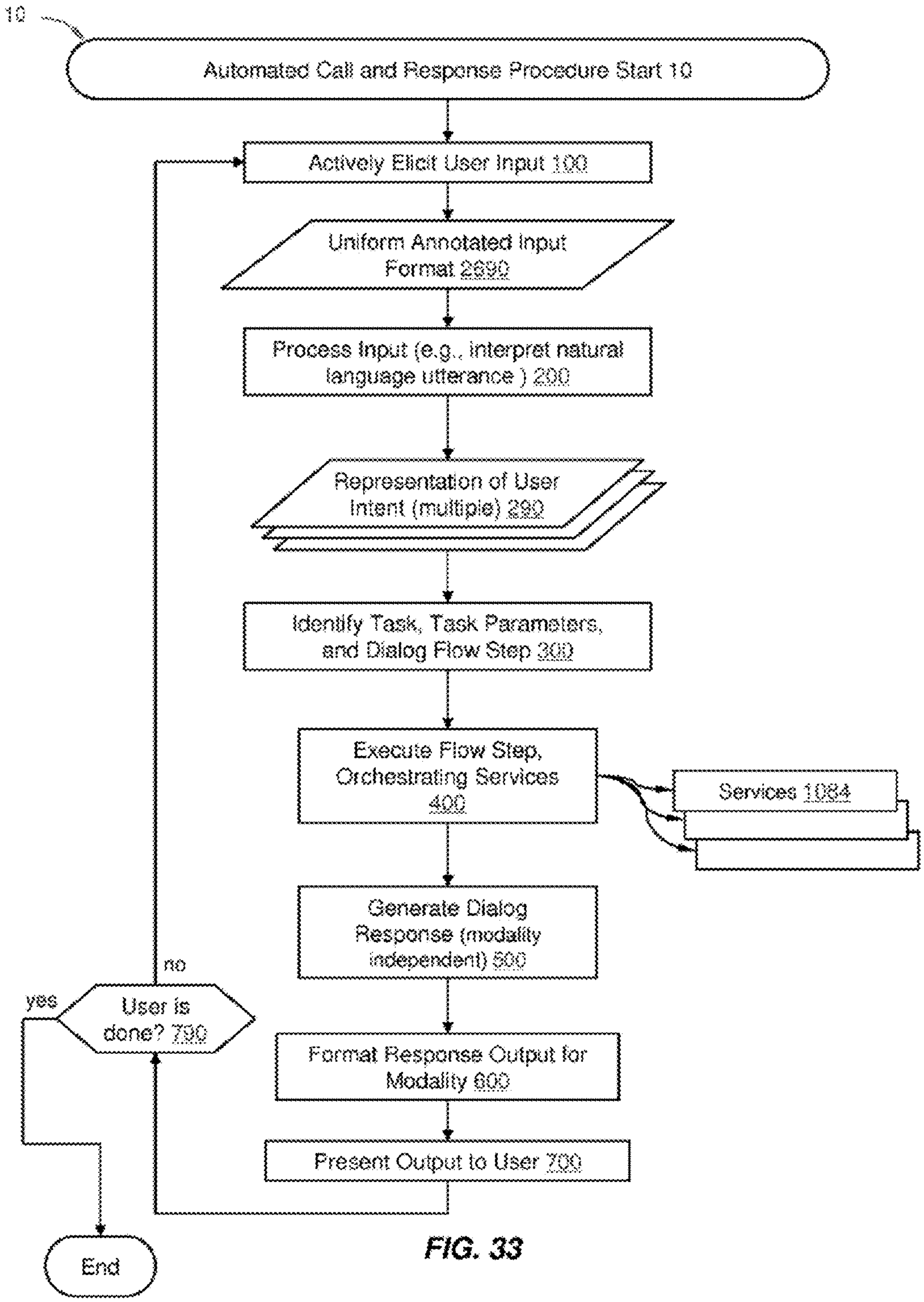
FIG. 33 is a flow diagram depicting an automatic call and response procedure, according to one embodiment.

According to different embodiments, at least a portion of the various types of functions, operations, actions, and/or other features provided by assistant 1002 may implement by at least one embodiment of an automated call and response procedure, such as that illustrated and described, for example, with respect to FIG. 33.

Additionally, various embodiments of assistant 1002 described herein may include or provide a number of different advantages and/or benefits over currently existing intelligent automated assistant technology such as, for example, one or more of the following (or combinations thereof):

- The integration of speech-to-text and natural language understanding technology that is constrained by a set of explicit models of domains, tasks, services, and dialogs. Unlike assistant technology that attempts to implement a general-purpose artificial intelligence system, the embodiments described herein may apply the multiple sources of constraints to reduce the number of solutions to a more tractable size. This results in fewer ambiguous interpretations of language, fewer relevant domains or tasks, and fewer ways to operationalize the intent in services. The focus on specific domains, tasks, and dialogs also makes it feasible to achieve coverage over domains and tasks with human-managed vocabulary and mappings from intent to services parameters.
- The ability to solve user problems by invoking services on their behalf over the Internet, using APIs, albeit utilizing licensed surfaces or the like (e.g., the auto clinician technology according to the teachings detailed herein and/or variations thereof). Unlike search engines which only return links and content, some embodiments of automated assistants 1002 described herein may automate diagnostic activities.
- The application of personal information and/or personal interaction history, and/or personal medical history and/or personal diagnostic history/prosthesis diagnostic history in the interpretation and execution of user requests. The embodiments described herein use information from history, personal physical context (e.g., user's location and time), and personal information gathered in the context of interaction (e.g., name, email addresses, physical addresses, phone numbers, account numbers, preferences, and the like). Using these sources of information enables, for example,
  - better interpretation of user input (e.g., using personal history and physical context when interpreting language);
  - more personalized results (e.g., that bias toward preferences or recent selections);
  - improved efficiency for the user (e.g., by automating steps involving the auto clinician).
- The use of dialog history in interpreting the natural language of user inputs. Because the embodiments may keep personal history and apply natural language understanding on user inputs, they may also use dialog context such as current location, time, domain, task step, and task parameters to interpret the new inputs. Conventional search engines and command processors interpret at least one query independent of a dialog history. The ability to use dialog history may make a more natural interaction possible, one which resembles normal human conversation.
- Active input elicitation, in which assistant 1002 actively guides and constrains the input from the user, based on the same models and information used to interpret their input. For example, assistant 1002 may apply dialog models to suggest next steps in a dialog with the user in which they are refining a request; offer completions to partially typed input based on domain and context specific possibilities; or use semantic interpretation to select from among ambiguous interpretations of speech as text or text as intent.
- The explicit modeling and dynamic management of services, with dynamic and robust services/actions orchestration. The architecture of embodiments described enables assistant 1002 to interface with many external services, dynamically determine which services may provide information for a specific user request, map parameters of the user request to different service APIs, call multiple services at once, integrate results from multiple services, fail over gracefully on failed services, and/or efficiently maintain the implementation of services as their APIs and capabilities evolve.
- The use of active ontologies as a method and apparatus for building assistants 1002, which simplifies the software engineering and data maintenance of automated assistant systems. Active ontologies are an integration of data modeling and execution environments for assistants. They provide a framework to tie together the various sources of models and data (domain concepts, task flows, vocabulary, language pattern recognizers, dialog context, user personal information, and mappings from domain and task requests to external services. Active ontologies and the other architectural innovations described herein make it practical to build deep functionality within domains, unifying multiple sources of information and services, and to do this across a set of domains.

In at least one embodiment, intelligent automated assistant 1002 may be operable to utilize and/or generate various different types of data and/or other types of information when performing specific tasks and/or operations. This may include, for example, input data/information and/or output data/information. For example, in at least one embodiment, intelligent automated assistant 1002 may be operable to access, process, and/or otherwise utilize information from one or more different types of sources, such as, for example, one or more local and/or remote memories, devices and/or systems. Additionally, in at least one embodiment, intelligent automated assistant 1002 may be operable to generate one or more different types of output data/information, which, for example, may be stored in memory of one or more local and/or remote devices and/or systems.

Examples of different types of input data/information which may be accessed and/or utilized by intelligent automated assistant 1002 may include, but are not limited to, one or more of the following (or combinations thereof):

- Voice input: from mobile devices such as mobile telephones and tablets, computers with microphones, Bluetooth headsets, automobile voice control systems, over the telephone system, recordings on answering services, audio voicemail on integrated messaging services, consumer applications with voice input such as clock radios, telephone station, home entertainment control systems, and game consoles.

Text input from keyboards on computers or mobile devices, keypads on remote controls or other consumer electronics devices, email messages sent to the assistant, instant messages or similar short messages sent to the assistant, text received from players in multiuser game environments, and text streamed in message feeds.

Location information coming from sensors or location-based systems. Examples include Global Positioning System (GPS) and Assisted GPS (A-GPS) on mobile phones. In one embodiment, location information is combined with explicit user input. In one embodiment, the system of the present invention is able to detect when a user is at home, based on known address information and current location determination. In this manner, certain inferences may be made about the auto clinician features that could have utilitarian value when at home as opposed to outside the home, as well as the type of services and actions that should be invoked on behalf of the user depending on whether or not he or she is at home.

Time information from clocks on client devices. This may include, for example, time from telephones or other client devices indicating the local time and time zone. In addition, time may be used in the context of user requests, such as for instance, to interpret phrases such as "in an hour" and "tonight".

Compass, accelerometer, gyroscope, and/or travel velocity data, as well as other sensor data from mobile or handheld devices or embedded systems such as automobile control systems. This may also include device positioning data from remote controls to appliances and game consoles.

Clicking and menu selection and other events from a graphical user interface (GUI) on any device having a GUI. Further examples include touches to a touch screen.

Events from sensors and other data-driven triggers, such as alarm clocks, calendar alerts, price change triggers, location triggers, push notification onto a device from servers, and the like.

The input to the embodiments described herein also includes the context of the user interaction history, including dialog and request history.

Examples of different types of output data/information which may be generated by intelligent automated assistant 1002 may include, but are not limited to, one or more of the following (or combinations thereof):

Text output sent directly to an output device and/or to the user interface of a device Text and graphics sent to a user over email Text and graphics send to a user over a messaging service Speech output, may include one or more of the following (or combinations thereof):

- Synthesized speech
- Sampled speech
- Recorded messages

Graphical layout of information with photos, rich text, videos, sounds, and hyperlinks. For instance, the content rendered in a web browser.

Actuator output to control physical actions on a device, such as causing it to turn on or off, make a sound, change color, vibrate, control a light, or the like.

Invoking other applications on a device, such as calling a mapping application, voice dialing a telephone, sending an email or instant message, playing media, making entries in calendars, task managers, and note applications, and other applications.

Actuator output to control physical actions to devices attached or controlled by a device, such as operating a remote camera, controlling a wheelchair, playing music on remote speakers, playing videos on remote displays, and the like.

It may be appreciated that the intelligent automated assistant 1002 of FIG. 7 is but one example from a wide range of intelligent automated assistant system embodiments which may be implemented. Other embodiments of the intelligent automated assistant system (not shown) may include additional, fewer and/or different components/features than those illustrated, for example, in the example intelligent automated assistant system embodiment of FIG. 7.

User Interaction

The following is an example of an interaction between a user and at least one embodiment of an intelligent automated assistant 1002. In this example, it assumes that a user is speaking to intelligent automated assistant 1002 using input device 1206, which may be a speech input mechanism, and the output is graphical layout to output device 1207, which may be a scrollable screen (e.g., screen 242 of 200). A conversation screen features a conversational user interface showing what the user said ("I am having problems hearing my partner in this restaurant") and assistant's 1002 response, which is a summary of its findings ("OK, move the remote microphone 45 degrees clockwise,") or ("your beam forming has just been automatically adjusted, is this better?") and a set of alternate changes/adjustments are also shown (adjust volume upward, increase noise cancellation feature by X, move seat a foot or two to the right). In this example, the user clicks on the first result in the list to indicate the action that he or she has undertaken or otherwise to indicate the action that he or she seeks to have automatically executed by the auto clinician. Information screen and conversation screen may appear on the same output device, such as a touchscreen or other display device; the examples detailed above are two different output states for the same output device.

In one embodiment, an information screen can present information gathered and combined from a variety of services, including for example, any or all of the following:

Addresses and geolocations of businesses;

Distance from user's current location;

Reviews from a plurality of sources;

In one embodiment, assistant 1002 includes intelligence beyond simple database applications, such as, for example, Processing a statement of intent in a natural language, not just keywords;

Inferring semantic intent from that language input, such as interpreting "can't understand what she is saying" as "hearing prosthesis is not functioning usefully at this moment in time with respect to the goal of conveying speech intelligibly to the recipient";

Operationalizing semantic intent into a strategy for using the auto clinician and executing that strategy on behalf of the user (e.g., operationalizing the desire for the prosthesis to help the recipient to understand what is being spoken into the strategy of checking or otherwise identifying adjustments to improve speech intelligibility).

Intelligent Automated Assistant Components

According to various embodiments, intelligent automated assistant 1002 may include a plurality of different types of components, devices, modules, processes, systems, and the like, which, for example, may be implemented and/or instantiated via the use of hardware and/or combinations of hardware and software. For example, as illustrated in the example embodiment of FIG. 7, assistant 1002 may include one or more of the following types of systems, components, devices, processes, interfaces, and the like (or combinations thereof):

- One or more active ontologies 1050;
- Active input elicitation component(s) 1094 (may include client part 1094 *a* and server part 1094 *b*);
- Short term personal memory component(s) 1052 (may include master version 1052 *b* and cache 1052 *a*);
- Long-term personal memory component(s) 1054 (may include master version 1054 *b* and cache 1054 *a*);
- Domain models component(s) 1056;
- Vocabulary component(s) 1058 (may include complete vocabulary 1058 *b* and subset 1058 *a*);
- Language pattern recognizer(s) component(s) 1060 (may include full library 1060 *b* and subset 1060 *a*);
- Language interpreter component(s) 1070;
- Domain entity database(s) 1072;
- Dialog flow processor component(s) 1080;
- Services/actions orchestration component(s) 1082;
- Services component(s) 1084;
- Task flow models component(s) 1086;
- Dialog flow models component(s) 1087;
- Service models component(s) 1088;
- Output processor component(s) 1090.

As described in connection with FIG. 6, in certain client/server-based embodiments, some or all of these components may be distributed between client 1304 and server 1340.

For purposes of illustration, at least a portion of the different types of components of a specific example embodiment of intelligent automated assistant 1002 will now be described in greater detail with reference to the example intelligent automated assistant 1002 embodiment of FIG. 7.

Active Ontologies 1050

Active ontologies 1050 serve as a unifying infrastructure that integrates models, components, and/or data from other parts of embodiments of intelligent automated assistants 1002. In the field of computer and information science, ontologies provide structures for data and knowledge representation such as classes/types, relations, attributes/properties and their instantiation in instances. Ontologies are used, for example, to build models of data and knowledge. In some embodiments of the intelligent automated system 1002, ontologies are part of the modeling framework in which to build models such as domain models.

Within the context of the present invention, an "active ontology" 1050 may also serve as an execution environment, in which distinct processing elements are arranged in an ontology-like manner (e.g., having distinct attributes and relations with other processing elements). These processing elements carry out at least some of the tasks of intelligent automated assistant 1002. Any number of active ontologies 1050 can be provided.

In at least one embodiment, active ontologies 1050 may be operable to perform and/or implement various types of functions, operations, actions, and/or other features such as, for example, one or more of the following (or combinations thereof):

- Act as a modeling and development environment, integrating models and data from various model and data components, including but not limited to
  - Domain models 1056
  - Vocabulary 1058
  - Domain entity databases 1072
  - Task flow models 1086
  - Dialog flow models 1087
  - Service capability models 1088
- Act as a data-modeling environment on which ontology-based editing tools may operate to develop new models, data structures, database schemata, and representations.
- Act as a live execution environment, instantiating values for elements of domain 1056, task 1086, and/or dialog models 1087, language pattern recognizers 1060, and/or vocabulary 1058, and user-specific information such as that found in short term personal memory 1052, long term personal memory 1054, and/or the results of service/actions orchestration 1082. For example, some nodes of an active ontology may correspond to domain concepts such as sounds that should not be present and its property buzzing or hiss, etc. During live execution, these active ontology nodes may be instantiated with the identity of a particular causation of a phenomenon sensed by the recipient and its name, and how its name corresponds to words in a natural language input utterance. Thus, in this embodiment, the active ontology is serving as both a modeling environment specifying the concept that sounds are indicative of "failure modes" or "sub-optimal performance modes" with identities that have names, and for storing dynamic bindings of those modeling nodes with data from entity databases and parses of natural language.
- Enable the communication and coordination among components and processing elements of an intelligent automated assistant, such as, for example, one or more of the following (or combinations thereof):
  - Active input elicitation component(s) 1094
  - Language interpreter component(s) 1070
  - Dialog flow processor component(s) 1080
  - Services/actions orchestration component(s) 1082
  - Services component(s) 1084

In one embodiment, at least a portion of the functions, operations, actions, and/or other features of active ontologies 1050 described herein may be implemented, at least in part, using various methods and apparatuses described in U.S. patent application Ser. No. 11/518,292 for "Method and Apparatus for Building an Intelligent Automated Assistant", filed Sep. 8, 2006.

In at least one embodiment, a given instance of active ontology 1050 may access and/or utilize information from one or more associated databases. In at least one embodiment, at least a portion of the database information may be accessed via communication with one or more local and/or remote memory devices. Examples of different types of data which may be accessed by active ontologies 1050 may include, but are not limited to, one or more of the following (or combinations thereof):

- Static data that is available from one or more components of intelligent automated assistant 1002;
- Data that is dynamically instantiated per user session, for example, but not limited to, maintaining the state of the user-specific inputs and outputs exchanged among components of intelligent automated assistant 1002, the contents of short term personal memory, the inferences made from previous states of the user session, and the like.

In this manner, active ontologies 1050 are used to unify elements of various components in intelligent automated assistant 1002. An active ontology 1050 allows an author, designer, or system builder to integrate components so that the elements of one component are identified with elements of other components. The author, designer, or system builder can thus combine and integrate the components more easily.

As described above, active ontology 1050 can allow the author, designer, or system builder to integrate components; thus, for example, elements of a component such as constraint in dialog flow model 1087 can be identified with elements of other components.

Active ontologies 1050 may be embodied as, for example, configurations of models, databases, and components in which the relationships among models, databases, and components are any of:

- containership and/or inclusion;
- relationship with links and/or pointers;
- interface over APIs, both internal to a program and between programs.

Figure 9:
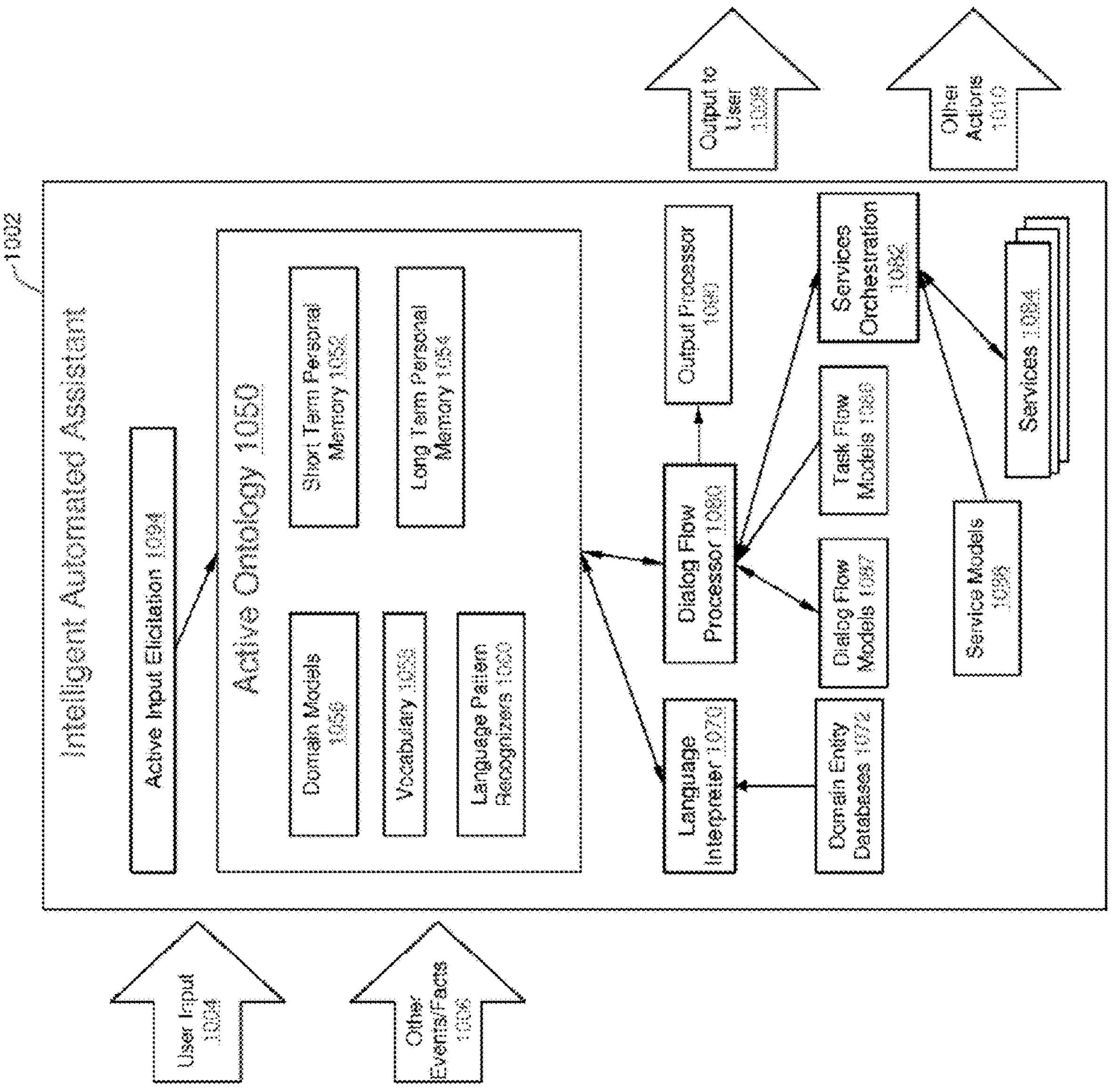
FIG. 9 is a block diagram depicting an example of an alternative embodiment of an intelligent automated assistant system.
Figure 10:
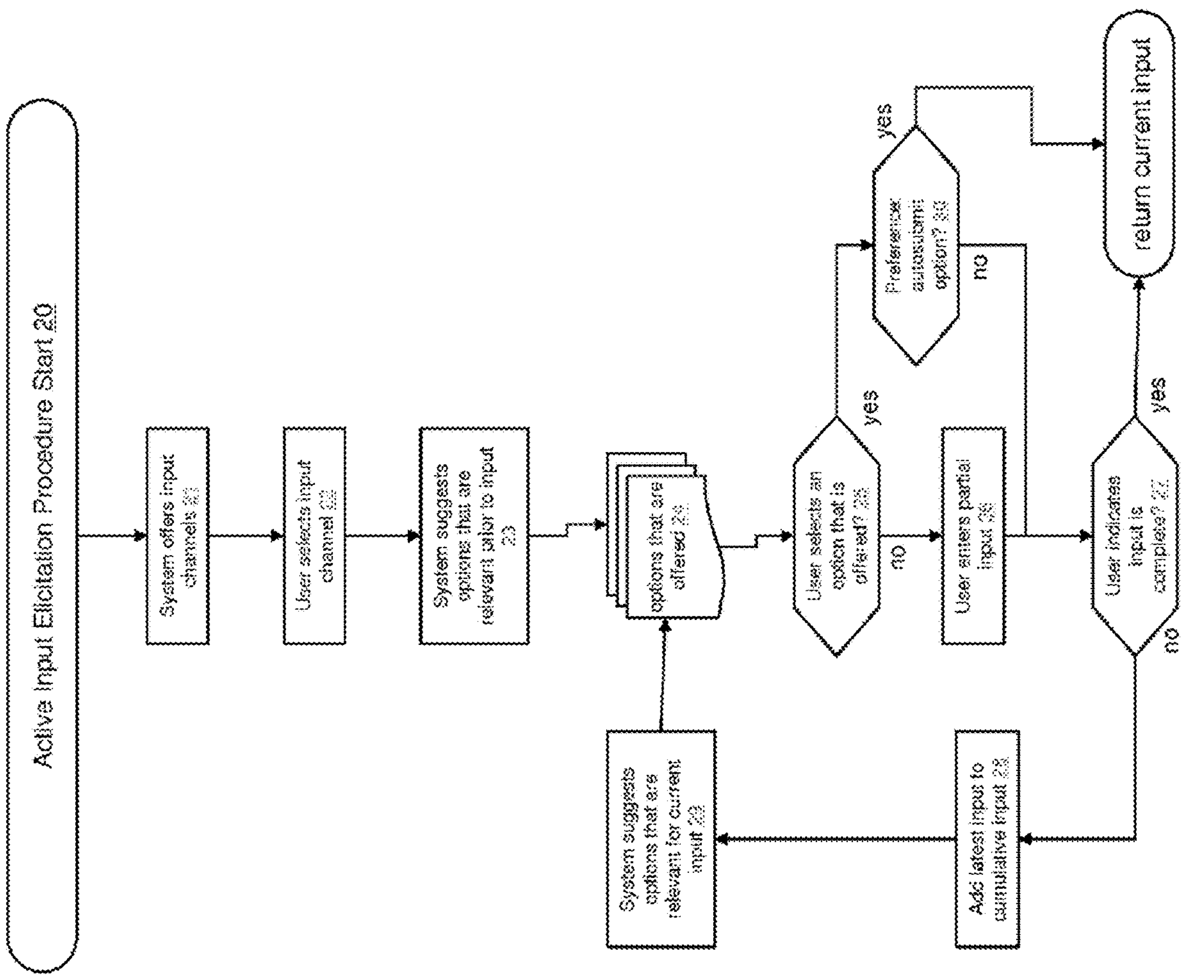
FIG. 10 is a flow diagram depicting a method of operation for active input elicitation component(s) according to one embodiment.

For example, referring now to FIG. 9, there is shown an example of an alternative embodiment of intelligent automated assistant system 1002, wherein domain models 1056, vocabulary 1058, language pattern recognizers 1060, short term personal memory 1052, and long term personal memory 1054 components are organized under a common container associated with active ontology 1050, and other components such as active input elicitation component(s) 1094, language interpreter 1070 and dialog flow processor 1080 are associated with active ontology 1050 via API relationships.

Active Input Elicitation Component(s) 1094

In at least one embodiment, active input elicitation component(s) 1094 (which, as described above, may be implemented in a stand-alone configuration or in a configuration including both server and client components) may be operable to perform and/or implement various types of functions, operations, actions, and/or other features such as, for example, one or more of the following (or combinations thereof):

- Elicit, facilitate and/or process input from the user or the user's environment, and/or information about their need(s) or request(s). For example, if the user is looking to better hear his or her partner, the input elicitation module may get information about the current location (e.g., indoors, where an echo/reverberation may occur, outdoors, where wind noise or the like may be present, proximity to a construction site/worksite where there is significant background noise, etc.), type of restaurant (e.g., fast food with short period transient customers walking past the user frequently, restaurant or bar with a band playing in the background, a romantic restaurant with dim lights where the recipient may have difficulty "lip reading" his or her partners lips so as to provide a supplement to the evoke a hearing percept based on the partner speech), possibility that the recipient is proximate a source of electromagnetic interference (which could result in a buzzing or the like), possibility that the recipient is at a rock concert or the like (which could result in a ringing), and so forth.
- Facilitate different kinds of input from various sources, such as for example, one or more of the following (or combinations thereof):
  - input from keyboards or any other input device that generates text
  - input from keyboards in user interfaces that offer dynamic suggested completions of partial input
  - input from voice or speech input systems
  - input from Graphical User Interfaces (GUIs) in which users click, select, or otherwise directly manipulate graphical objects to indicate choices
  - input from other applications that generate text and send it to the automated assistant, including email, text messaging, or other text communication platforms By performing active input elicitation, assistant 1002 is able to disambiguate intent at an early phase of input processing. For example, in an embodiment where input is provided by speech, the waveform might be sent to a server 1340 where words are extracted, and semantic interpretation performed. The results of such semantic interpretation can then be used to drive active input elicitation, which may offer the user alternative candidate words to choose among based on their degree of semantic fit as well as phonetic match.

Figure 18:
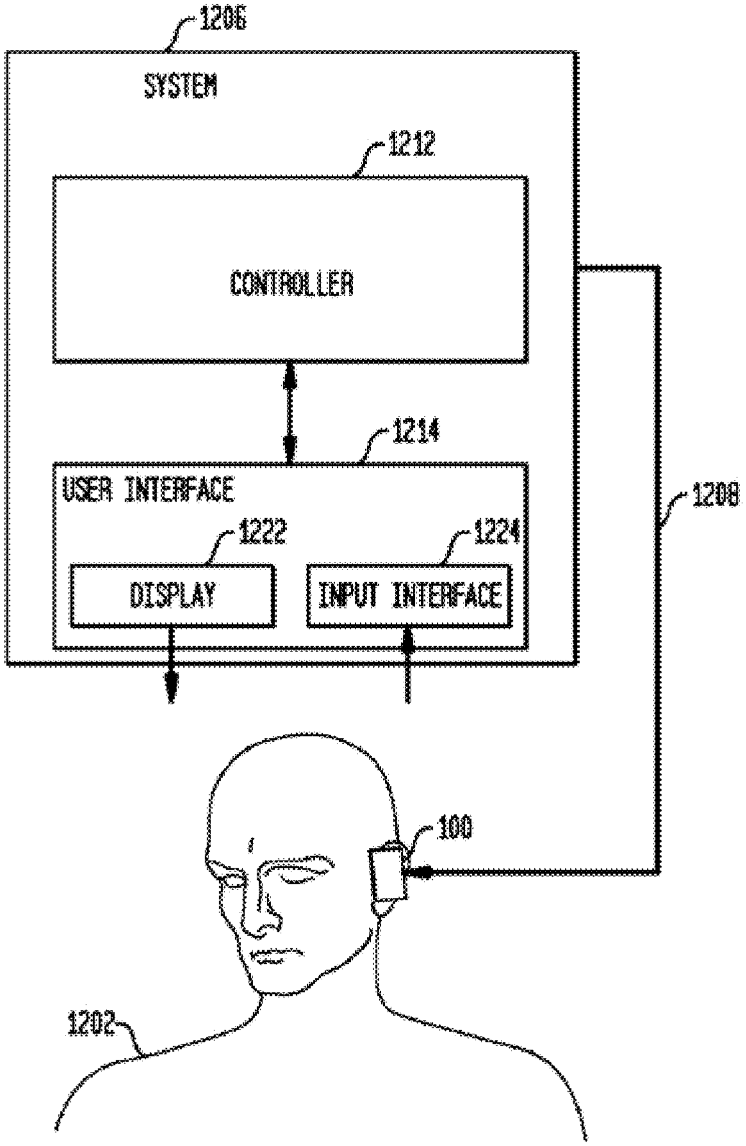
FIG. 18 presents an exemplary functional schematic of an exemplary system according to an exemplary embodiment.

In at least one embodiment, active input elicitation component(s) 1094 actively, automatically, and dynamically guide the user toward inputs that may be acted upon by one or more of the services offered by embodiments of assistant 1002. Referring now to FIG. 18, there is shown a flow diagram depicting a method of operation for active input elicitation component(s) 1094 according to one embodiment.

The procedure begins 20. In step 21, assistant 1002 may offer interfaces on one or more input channels. For example, a user interface may offer the user options to speak or type or tap at any stage of a conversational interaction. In step 22, the user selects an input channel by initiating input on one modality, such as pressing a button to start recording speech or to bring up an interface for typing.

In at least one embodiment, assistant 1002 offers default suggestions for the selected modality 23. That is, it offers options 24 that are relevant in the current context prior to the user entering any input on that modality. For example, in a text input modality, assistant 1002 might offer a list of common words that would begin textual requests or commands such as, for example, one or more of the following (or combinations thereof): imperative verbs and variations thereof (e.g., louder, lower, want to hear speech, want to hear music, and the like), nouns and variations thereof (e.g., buzzing noise, loud noise, low noise, music, and the like), or menu-like options naming domains of discourse (e.g., music listening, speech understanding, television watching, and the like). It is also noted that the aforementioned word phrases can also be represented by single words. For example, loud noise could be loud, low noise could be low, music listening could be music, speech understanding could be speech, etc.

If the user selects one of the default options in 25, and a preference to autosubmit 30 is set, the procedure may return immediately. This is similar to the operation of a conventional menu selection.

However, the initial option may be taken as a partial input, or the user may have started to enter a partial input 26. At any point of input, in at least one embodiment, the user may choose to indicate that the partial input is complete 27, which causes the procedure to return.

In 28, the latest input, whether selected or entered, is added to the cumulative input.

In 29, the system suggestions next possible inputs that are relevant given the current input and other sources of constraints on what constitutes relevant and/or meaningful input.

In at least one embodiment, the sources of constraints on user input (for example, which are used in steps 23 and 29) are one or more of the various models and data sources that may be included in assistant 1002, which may include, but are not limited to, one or more of the following (or combinations thereof):

- Vocabulary 1058. For example, words or phrases that match the current input may be suggested. In at least one embodiment, vocabulary may be associated with any or one or more nodes of active ontologies, domain models, task models, dialog models, and/or service models.
- Domain models 1056, which may constrain the inputs that may instantiate or otherwise be consistent with the domain model. For example, in at least one embodiment, domain models 1056 may be used to suggest concepts, relations, properties, and/or instances that would be consistent with the current input.
- Language pattern recognizers 1060, which may be used to recognize idioms, phrases, grammatical constructs, or other patterns in the current input and be used to suggest completions that fill out the pattern.
- Domain entity databases 1072, which may be used to suggest possible entities in the domain that match the input (e.g., adjustments to settings for a given input, actions that will be taken automatically for the given input, etc.).
- Short term memory 1052, which may be used to match any prior input or portion of prior input, and/or any other property or fact about the history of interaction with a user. For example, partial input may be matched against cities that the user has encountered in a session, whether hypothetically (e.g., mentioned in queries) and/or physically (e.g., as determined from location sensors).
- In at least one embodiment, semantic paraphrases of recent inputs, request, or results may be matched against the current input. For example, if the user had previously indicated the inability to hear his or her partner and obtained a recommendation from the auto clinician to adjust a beamforming to be directed directly ahead of the recipient, and then typed "cannot hear" in an active input elicitation environment, suggestions may include "adjust beamforming" and/or "utilize remote microphone instead?" (where the latter was something that was not being used at the occurrence of the previous indication, which lack of use could be determined by the auto clinician system, where the use of this remote microphone could result in the placement of the microphone proximate the lips of the partner speaking, thus enhancing the sound capture capability of the hearing prosthesis).
- Long term personal memory 1054, which may be used to suggest matching items from long term memory. Such matching items may include, for example, one or more or any combination of: domain entities that are saved (e.g., settings or other adjustments to the prosthesis that previously were received with favorable results by the recipient in a given scenario, and the like).
- Task flow models 1086, which may be used to suggest inputs based on the next possible steps of in a task flow.
- Dialog flow models 1087, which may be used to suggest inputs based on the next possible steps of in a dialog flow.
- Service capability models 1088, which may be used to suggest possible services to employ, by name, category, capability, or any other property in the model. For example, a user may type part of the name of a preferred review site, and assistant 1002 may suggest a complete command for querying that review site for review.

In at least one embodiment, active input elicitation component(s) 1094 present to the user a conversational interface, for example, an interface in which the user and assistant communicate by making utterances back and forth in a conversational manner. Active input elicitation component(s) 1094 may be operable to perform and/or implement various types of conversational interfaces.

In at least one embodiment, active input elicitation component(s) 1094 may be operable to perform and/or implement various types of conversational interfaces in which assistant 1002 uses plies of the conversation to prompt for information from the user according to dialog models. Dialog models may represent a procedure for executing a dialog, such as, for example, a series of steps required to elicit the information needed to perform a service.

In at least one embodiment, active input elicitation component(s) 1094 offer constraints and guidance to the user in real time, while the user is in the midst of typing, speaking, or otherwise creating input. For example, active elicitation may guide the user to type text inputs that are recognizable by an embodiment of assistant 1002 and/or that may be serviced by one or more services offered by embodiments of assistant 1002. This is an advantage over passively waiting for unconstrained input from a user because it enables the user's efforts to be focused on inputs that may or might be useful, and/or it enables embodiments of assistant 1002 to apply its interpretations of the input in real time as the user is inputting it.

At least a portion of the functions, operations, actions, and/or other features of active input elicitation described herein may be implemented, at least in part, using various methods and apparatuses described in U.S. patent application Ser. No. 11/518,292 for "Method and Apparatus for Building an Intelligent Automated Assistant", filed Sep. 8, 2006.

According to specific embodiments, multiple instances or threads of active input elicitation component(s) 1094 may be concurrently implemented and/or initiated via the use of one or more processors 63 and/or other combinations of hardware and/or hardware and software.

According to different embodiments, one or more different threads or instances of active input elicitation component(s) 1094 may be initiated in response to detection of one or more conditions or events satisfying one or more different types of minimum threshold criteria for triggering initiation of at least one instance of active input elicitation component(s) 1094. Various examples of conditions or events which may trigger initiation and/or implementation of one or more different threads or instances of active input elicitation component(s) 1094 may include, but are not limited to, one or more of the following (or combinations thereof):

- Start of user session. For example, when the user session starts up an application that is an embodiment of assistant 1002, the interface may offer the opportunity for the user to initiate input, for example, by pressing a button to initiate a speech input system or clicking on a text field to initiate a text input session.
- User input detected.
- When assistant 1002 explicitly prompts the user for input, as when it requests a response to a question or offers a menu of next steps from which to choose.
- When assistant 1002 is helping the user identify a utilitarian setting adjustment to the prosthesis and/or other type of action and is gathering data for that transaction.

In at least one embodiment, a given instance of active input elicitation component(s) 1094 may access and/or utilize information from one or more associated databases. In at least one embodiment, at least a portion of the database information may be accessed via communication with one or more local and/or remote memory devices. Examples of different types of data which may be accessed by active input elicitation component(s) 1094 may include, but are not limited to, one or more of the following (or combinations thereof):

- database of possible words to use in a textual input;
- grammar of possible phrases to use in a textual input utterance;
- database of possible interpretations of speech input;
- database of previous inputs from a user or from other users;
- data from any of the various models and data sources that may be part of embodiments of assistant 1002, which may include, but are not limited to, one or more of the following (or combinations thereof):
  - Domain models 1056;
  - Vocabulary 1058;
  - Language pattern recognizers 1060;
  - Domain entity databases 1072;
  - Short term memory 1052;
  - Long term personal memory 1054;
  - Task flow models 1086;
  - Dialog flow models 1087;
  - Service capability models 1088.

According to different embodiments, active input elicitation component(s) 1094 may apply active elicitation procedures to, for example, one or more of the following (or combinations thereof):

- typed input;
- speech input;
- input from graphical user interfaces (GUIs), including gestures;
- input from suggestions offered in a dialog; and
- events from the computational and/or sensed environments.

Active Typed Input Elicitation

Figure 11:
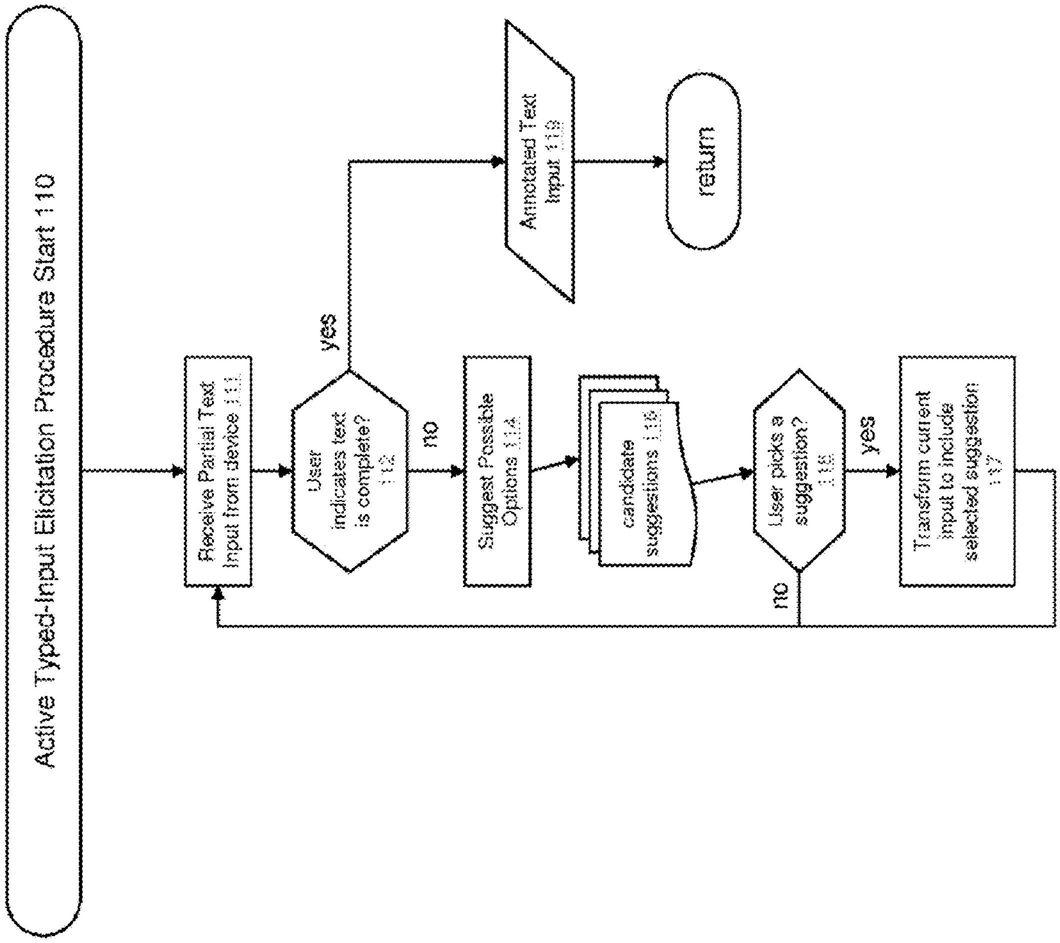
FIG. 11 is a flow diagram depicting a method for active typed-input elicitation according to one embodiment.

Referring now to FIG. 11, there is shown a flow diagram depicting a method for active typed input elicitation according to one embodiment.

The method begins 110. Assistant 1002 receives 111 partial text input, for example via input device 1206. Partial text input may include, for example, the characters that have been typed so far in a text input field. At any time, a user may indicate that the typed input is complete 112, as, for example, by pressing an Enter key. If not complete, a suggestion generator generates 114 candidate suggestions 116. These suggestions may be syntactic, semantic, and/or other kinds of suggestion based any of the sources of information or constraints described herein. If the suggestion is selected 118, the input is transformed 117 to include the selected suggestion.

In at least one embodiment, the suggestions may include extensions to the current input. For example, a suggestion for "buzz" may be "buzzing".

In at least one embodiment, the suggestions may include replacements of parts of the current input. For example, a suggestion for "buzz" may be "tinnitus symptom".

In at least one embodiment, the suggestions may include replacing and rephrasing of parts of the current input. For example, if the current input is "hear speech better" a suggestion may be "beamforming adjustment" or "use remote microphone" and when the suggestion is chosen, the entire input may be rewritten as "place remote microphone as close as possible to lips of speaker, and deactivate or reduce output from head mic".

In at least one embodiment, the resulting input that is returned is annotated 119, so that information about which choices were made in 118 is preserved along with the textual input. This enables, for example, the semantic concepts or entities underlying a string to be associated with the string when it is returned, which improves accuracy of subsequent language interpretation.

Active Speech Input Elicitation

Figure 22:
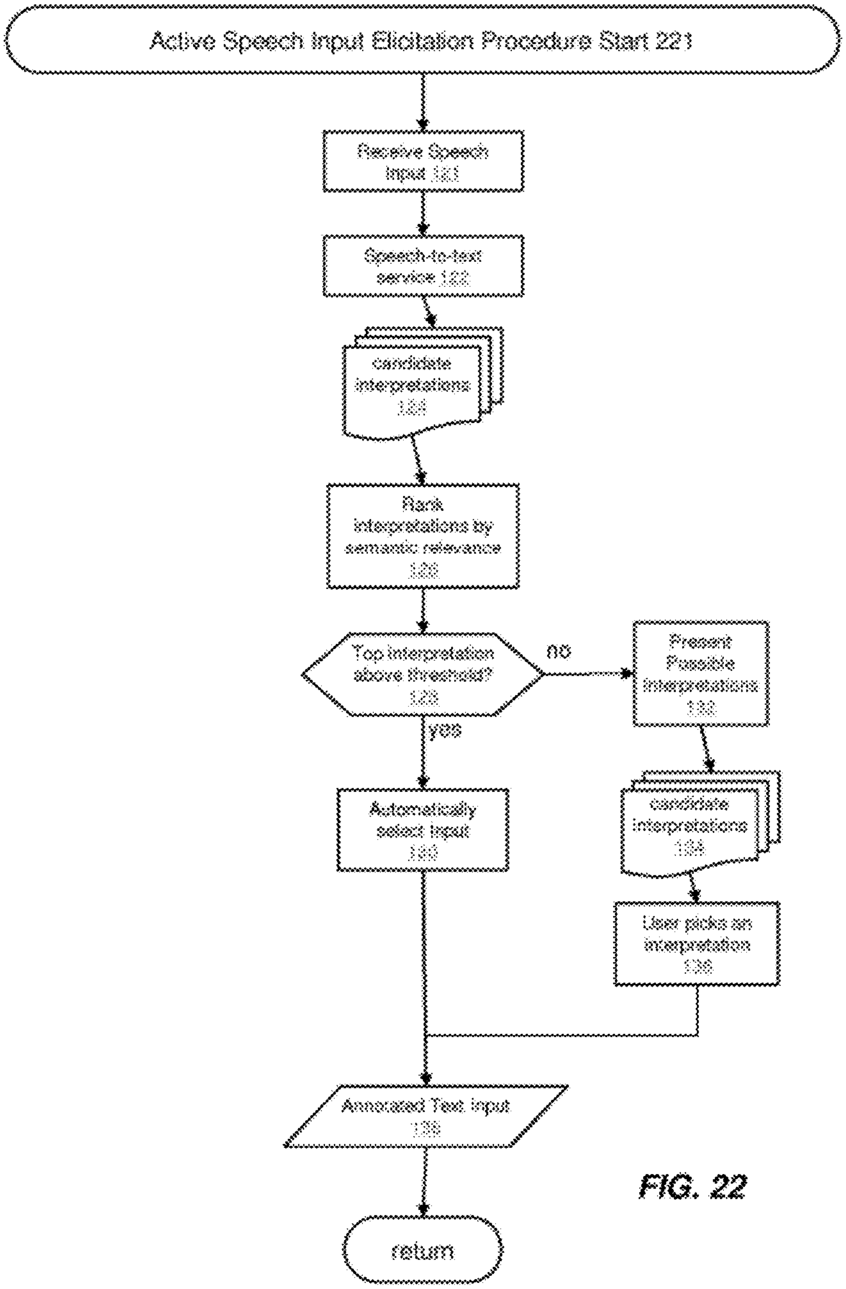
FIG. 22 is a flow diagram depicting a method for active input elicitation for voice or speech input according to one embodiment.

Referring now to FIG. 22, there is shown a flow diagram depicting a method for active input elicitation for voice or speech input according to one embodiment.

The method begins 221. Assistant 1002 receives 121 voice or speech input in the form of an auditory signal. A speech-to-text service 122 or processor generates a set of candidate text interpretations 124 of the auditory signal. In one embodiment, speech-to-text service 122 is implemented using, for example, Nuance Recognizer, available from Nuance Communications, Inc. of Burlington, Mass.

In one embodiment, assistant 1002 employs statistical language models to generate candidate text interpretations 124 of speech input 121.

In addition, in one embodiment, the statistical language models are tuned to look for words, names, and phrases that occur in the various models of assistant 1002. For example, in at least one embodiment the statistical language models are given words, names, and phrases from some or all of: domain models 1056 (e.g., words and phrases relating to a hearing prosthesis problem scenario), task flow models 1086 (e.g., words and phrases relating to improving speech comprehension), dialog flow models 1087 (e.g., words and phrases related to the constraints that are needed to gather the inputs for improving prosthesis interaction with other electronic products (e.g., a television, and MP3 player, a telecoil system, etc. —it is noted that while the embodiments detailed herein are often directed towards problems with the recipient hearing per se, it is noted that any of the teachings detailed herein can also be directed towards the scenario where the recipient is simply having problems having the prosthesis function in a certain manner-thus, in some exemplary embodiments, the problem can be related to, in some instances, even turning the prosthesis on or recharging a battery of the prosthesis, etc. Any problem related to a hearing prosthesis can be the problem that is addressed according to the teachings detailed herein and/or variations thereof), domain entity databases 1072, vocabulary databases 1058, service models 1088, and/or any words, names, or phrases associated with any node of active ontology 1050.

In one embodiment, the statistical language models are also tuned to look for words, names, and phrases from long-term personal memory 1054. For example, statistical language models can be given text from to-do items, list items, personal notes, calendar entries, people names in contacts/address books, email addresses, street or city names mentioned in contact/address books, and the like.

A ranking component analyzes the candidate interpretations 124 and ranks 126 them according to how well they fit syntactic and/or semantic models of intelligent automated assistant 1002. Any sources of constraints on user input may be used. For example, in one embodiment, assistant 1002 may rank the output of the speech-to-text interpreter according to how well the interpretations parse in a syntactic and/or semantic sense, a domain model, task flow model, and/or dialog model, and/or the like: it evaluates how well various combinations of words in the text interpretations 124 would fit the concepts, relations, entities, and properties of active ontology 1050 and its associated models. For example, if speech-to-text service 122 generates the two candidate interpretations "hear speech better" and "hear each better", the ranking by semantic relevance 126 might rank "hear speech better" higher if it better matches the nodes assistant's 1002 active ontology 1050 (e.g., the words "hear", "speech" and "better" all match nodes in ontology 1050 and they are all connected by relationships in ontology 1050, whereas the word "each" does not match ontology 1050 or matches a node that is not part of the hearing prosthesis domain network).

Figure 28:
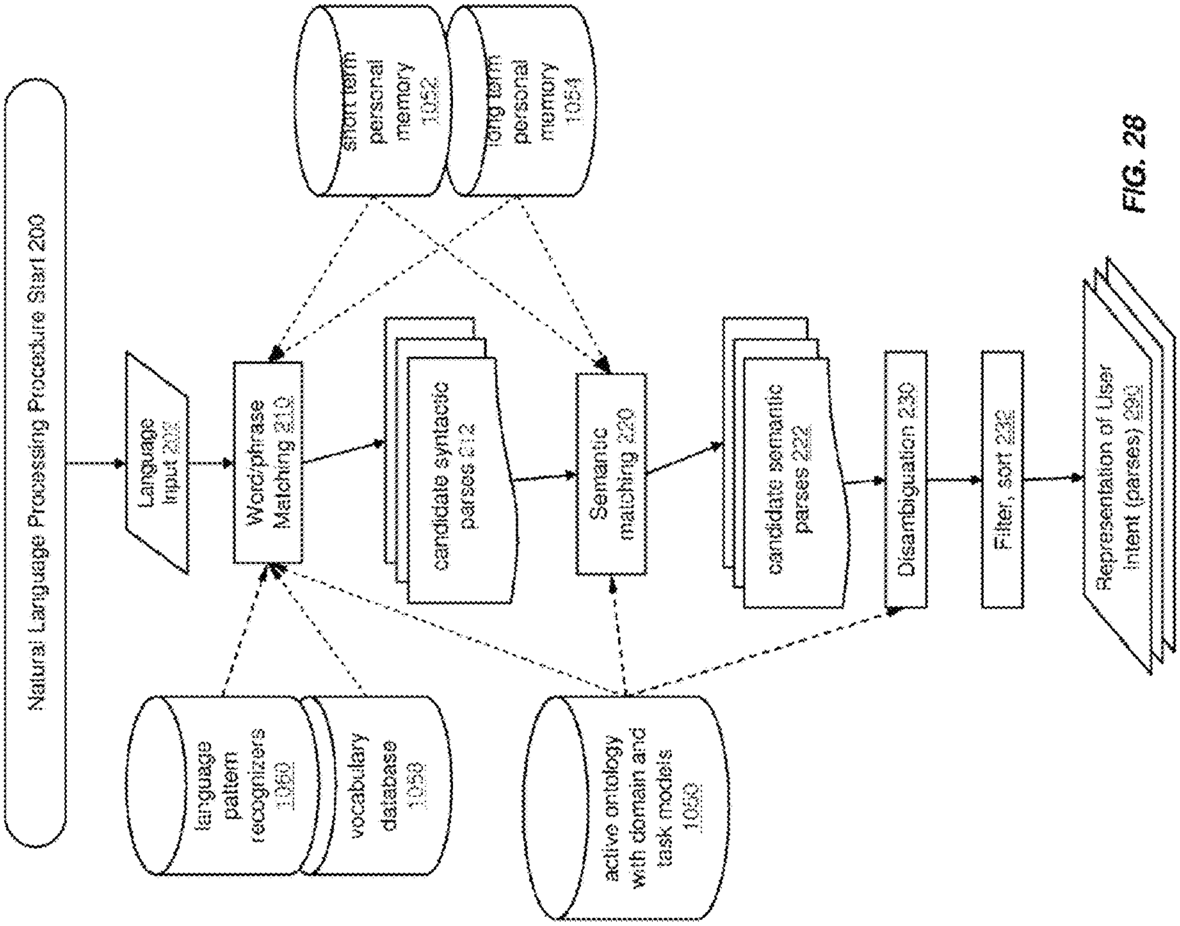
FIG. 28 is a flow diagram depicting an example of a method for natural language processing according to one embodiment.

In various embodiments, algorithms or procedures used by assistant 1002 for interpretation of text inputs, including any embodiment of the natural language processing procedure shown in FIG. 28, can be used to rank and score candidate text interpretations 124 generated by speech-to-text service 122.

In one embodiment, if ranking component 126 determines 128 that the highest-ranking speech interpretation from interpretations 124 ranks above a specified threshold, the highest-ranking interpretation may be automatically selected 130. If no interpretation ranks above a specified threshold, possible candidate interpretations of speech 134 are presented 132 to the user. The user can then select 136 among the displayed choices.

Figure 16:
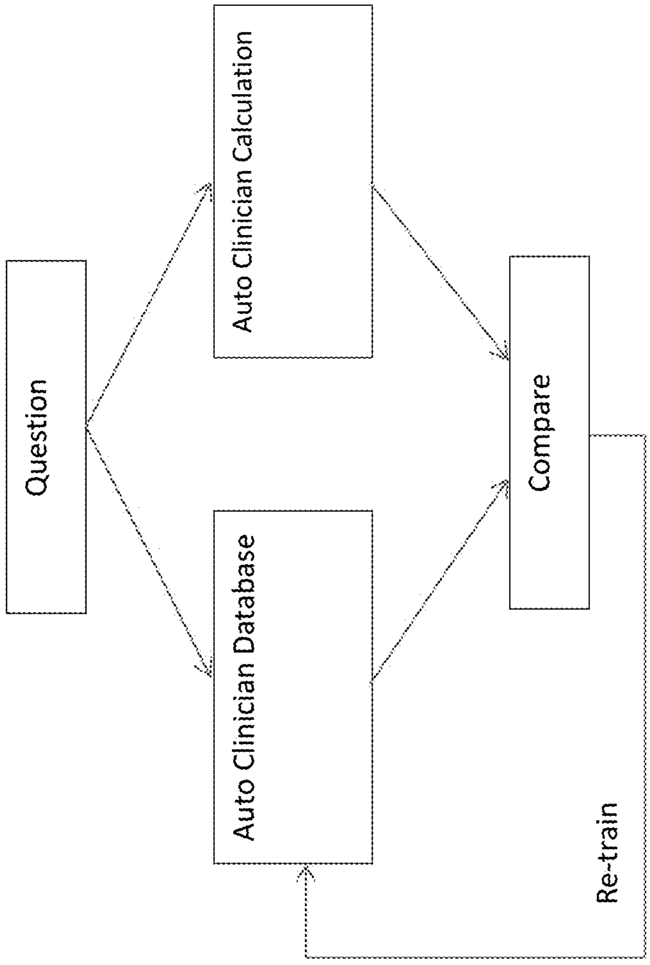

In various embodiments, user selection 136 among the displayed choices can be achieved by any mode of input, including for example any of the modes of multimodal input described in connection with FIG. 16. Such input modes include, without limitation, actively elicited typed input 2610, actively elicited speech input 2620, actively presented GUI for input 2640, and/or the like. In one embodiment, the user can select among candidate interpretations 134, for example by tapping or speaking. In the case of speaking, the possible interpretation of the new speech input is highly constrained by the small set of choices offered 134. For example, if offered "Did you mean hear speech better or hear each better?" the user can just say "speech" and the assistant can match this to the phrase "hear speech" and not get it confused with other global interpretations of the input.

Whether input is automatically selected 130 or selected 136 by the user, the resulting input 138 is returned. In at least one embodiment, the returned input is annotated 138, so that information about which choices were made in step 136 is preserved along with the textual input. This enables, for example, the semantic concepts or entities underlying a string to be associated with the string when it is returned, which improves accuracy of subsequent language interpretation.

In at least one embodiment, candidate text interpretations 124 are generated based on speech interpretations received as output of speech-to-text service 122.

In at least one embodiment, candidate text interpretations 124 include offers to correct substrings.

In at least one embodiment, candidate text interpretations 124 include offers to correct substrings of candidate interpretations using syntactic and semantic analysis as described herein.

In at least one embodiment, when the user selects a candidate interpretation, it is returned.

In at least one embodiment, the user is offered an interface to edit the interpretation before it is returned.

In at least one embodiment, the user is offered an interface to continue with more voice input before input is returned. This enables one to incrementally build up an input utterance, getting syntactic and semantic corrections, suggestions, and guidance at one iteration.

In at least one embodiment, the user is offered an interface to proceed directly from 136 to step 111 of a method of active typed input elicitation (described above in connection with FIG. 11). This enables one to interleave typed and spoken input, getting syntactic and semantic corrections, suggestions, and guidance at one step.

In at least one embodiment, the user is offered an interface to proceed directly from step 111 of an embodiment of active typed input elicitation to an embodiment of active speech input elicitation. This enables one to interleave typed and spoken input, getting syntactic and semantic corrections, suggestions, and guidance at one step.

Active GUI-Based Input Elicitation

Figure 23:
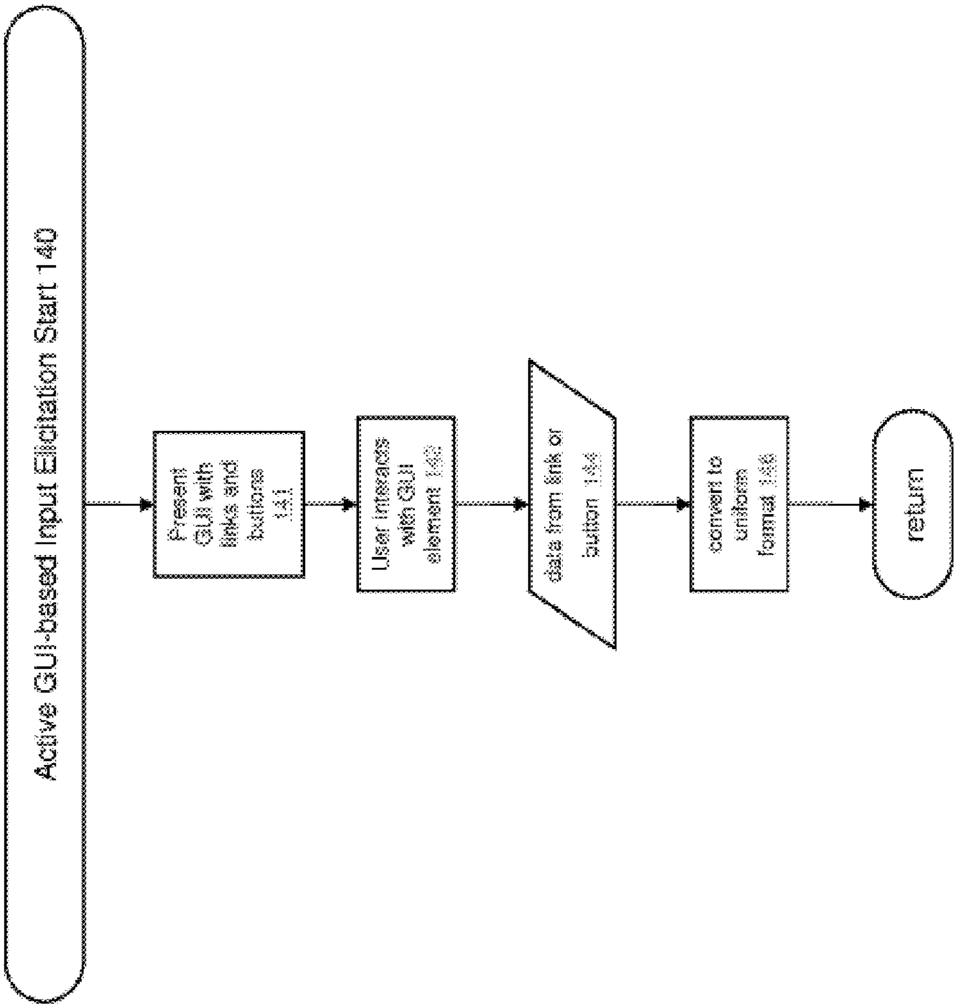
FIG. 23 is a flow diagram depicting a method for active input elicitation for GUI-based input according to one embodiment.

Referring now to FIG. 23, there is shown a flow diagram depicting a method for active input elicitation for GUI-based input according to one embodiment.

The method begins 140. Assistant 1002 presents 141 graphical user interface (GUI) on output device 1207, which may include, for example, links and buttons. The user interacts 142 with at least one GUI element. Data 144 is received, and converted 146 to a uniform format. The converted data is then returned.

In at least one embodiment, some of the elements of the GUI are generated dynamically from the models of the active ontology, rather than written into a computer program.

Active Dialog Suggestion Input Elicitation

Figure 24:
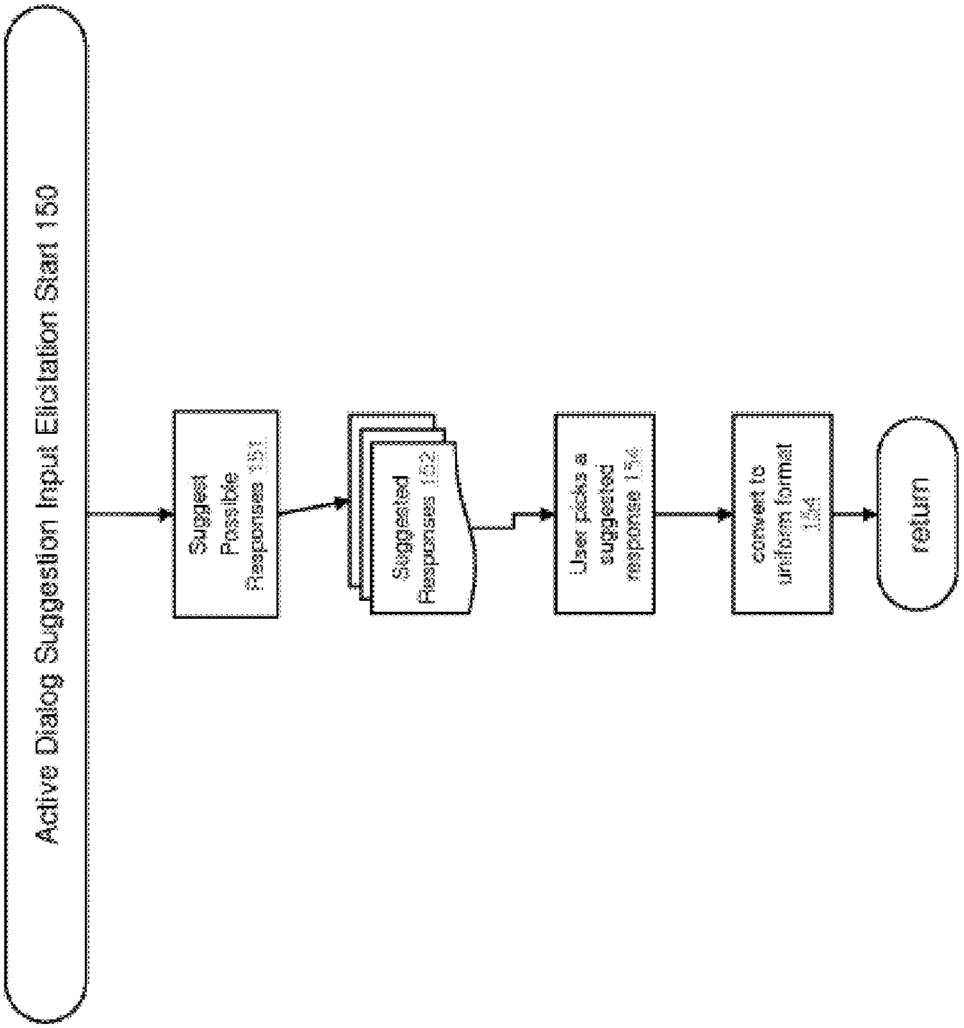
FIG. 24 is a flow diagram depicting a method for active input elicitation at the level of a dialog flow according to one embodiment.

FIG. 24 is a flow diagram depicting a method for active input elicitation at the level of a dialog flow according to one embodiment. Assistant 1002 suggests 151 possible responses 152. The user selects 154 *a* suggested response. The received input is converted 154 to a uniform format. The converted data is then returned.

In at least one embodiment, the suggestions offered in step 151 are offered as follow-up steps in a dialog and/or task flow.

In at least one embodiment, the suggestions offer options to refine a query, for example using parameters from a domain and/or task model. For example, one may be offered to change the assumed location or time of a request.

In at least one embodiment, the suggestions offer options to choose among ambiguous alternative interpretations given by a language interpretation procedure or component.

In at least one embodiment, the suggestions offer options to choose among ambiguous alternative interpretations given by a language interpretation procedure or component.

In at least one embodiment, the suggestions offer options to choose among next steps in a workflow associated dialog flow model 1087. For example, dialog flow model 1087 may suggest that after gathering the constrained for one domain, assistant 1002 should suggest other related domains.

Active Monitoring for Relevant Events

In at least one embodiment, asynchronous events may be treated as inputs in an analogous manner to the other modalities of active elicited input. Thus, such events may be provided as inputs to assistant 1002. Once interpreted, such events can be treated in a manner similar to any other input.

Figure 25:
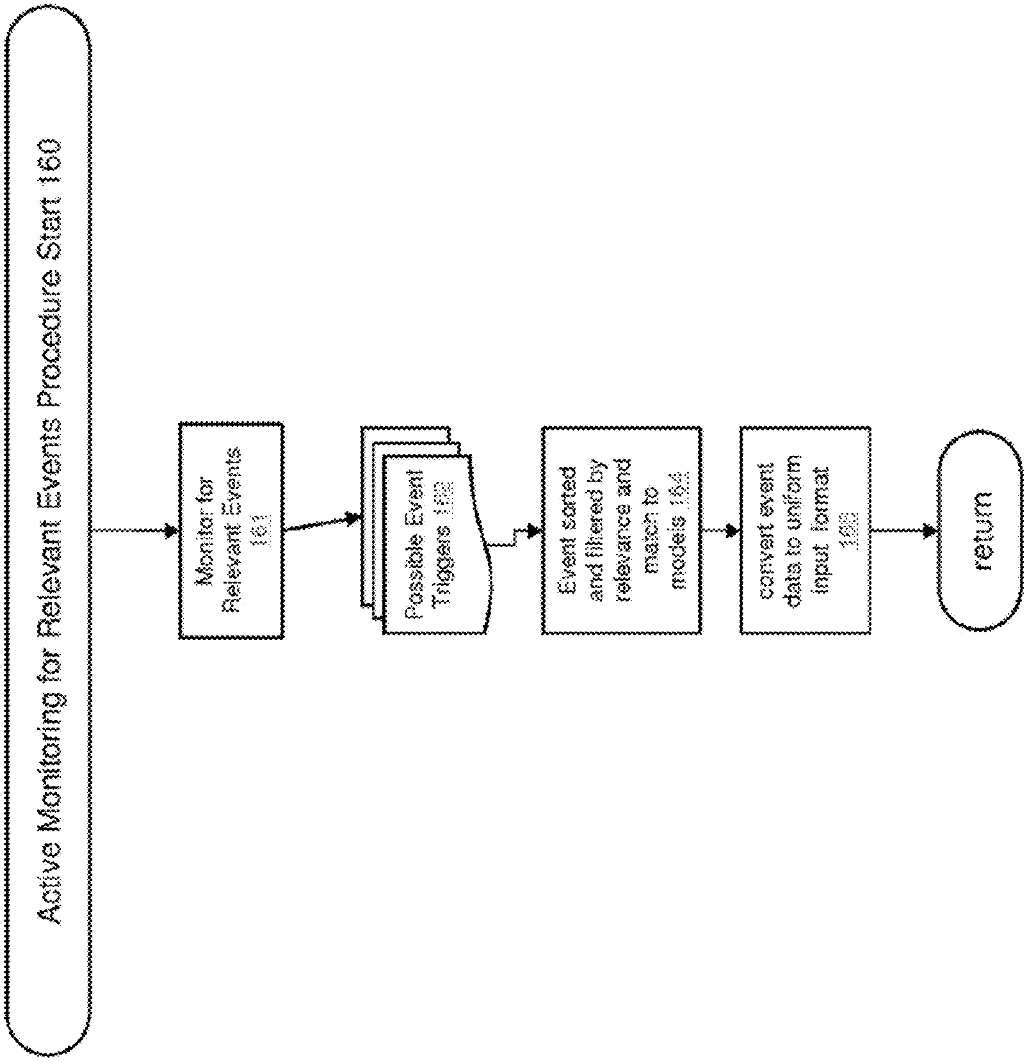
FIG. 25 is a flow diagram depicting a method for active monitoring for relevant events according to one embodiment.

Referring now to FIG. 25, there is shown a flow diagram depicting a method for active monitoring for relevant events according to one embodiment. In this example, event trigger events are sets of input 162. Assistant 1002 monitors 161 for such events. Detected events may be filtered and sorted 164 for semantic relevance using models, data and information available from other components in intelligent automated assistant 1002. For example, an event that reports a telecoil that is in communication range with the recipient's hearing prosthesis has been activated and/or is otherwise outputting a signal having content may be given higher relevance if the short-term or long-term memory records for a user indicate that the user plans on being at that location for a certain amount of time have made inquiries about it to assistant 1002. This sorting and filtering may then present only the top events for review by the user, who may then choose to pick one or more and act on them.

Event data is converted 166 to a uniform input format, and returned.

In at least one embodiment, assistant 1002 may proactively offer services associated with events that were suggested for user attention.

Multimodal Active Input Elicitation

In at least one embodiment, active input elicitation component(s) 1094 may process input from a plurality of input modalities. At least one modality might be implemented with an active input elicitation procedure that takes advantages of the particular kinds of inputs and methods for selecting from suggested options. A described herein, they may be embodiments of procedures for active input elicitation for text input, speech input, GUI-based input, input in the context of a dialog, and/or input resulting from event triggers.

In at least one embodiment, for a single instance of intelligent automated assistant 1002, there may be support for one or more (or any combination of) typed input, speech input, GUI input, dialog input, and/or event input.

Figure 26:
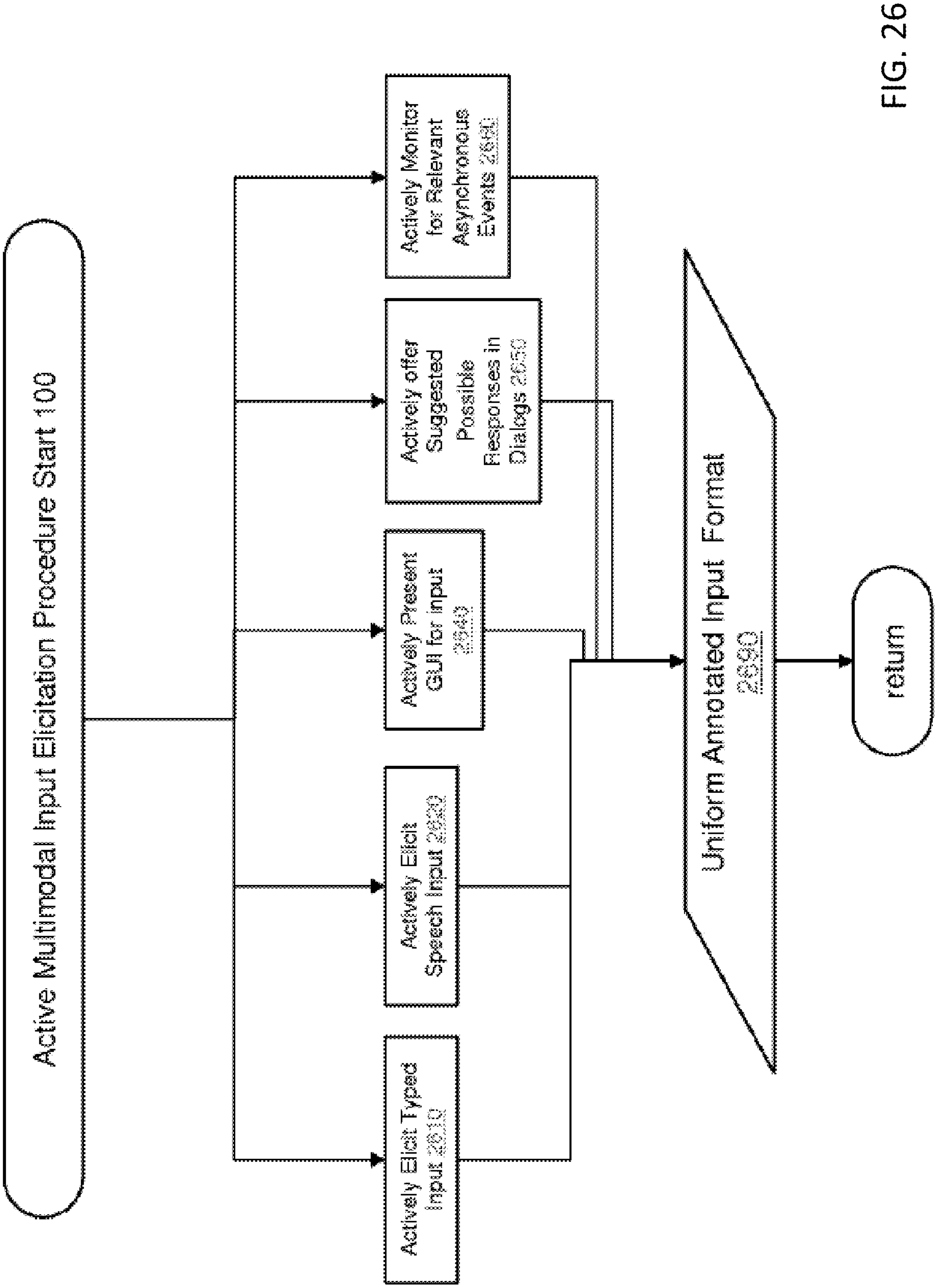
FIG. 26 is a flow diagram depicting a method for multimodal active input elicitation according to one embodiment.

Referring now to FIG. 26, there is shown a flow diagram depicting a method for multimodal active input elicitation according to one embodiment. The method begins 100. Inputs may be received concurrently from one or more or any combination of the input modalities, in any sequence. Thus, the method includes actively eliciting typed input 2610, speech input 2620, GUI-based input 2640, input in the context of a dialog 2650, and/or input resulting from event triggers 2660. Any or all of these input sources are unified into unified input format 2690 and returned. Unified input format 2690 enables the other components of intelligent automated assistant 1002 to be designed and to operate independently of the particular modality of the input.

Offering active guidance for multiple modalities and levels enables constraint and guidance on the input beyond those available to isolated modalities. For example, the kinds of suggestions offered to choose among speech, text, and dialog steps are independent, so their combination is a significant improvement over adding active elicitation techniques to individual modalities or levels.

Combining multiple sources of constraints as described herein (syntactic/linguistic, vocabulary, entity databases, domain models, task models, service models, and the like) and multiple places where these constraints may be actively applied (speech, text, GUI, dialog, and asynchronous events) provides a new level of functionality for human-machine interaction.

Domain Models Component(s) 1056

Domain models 1056 component(s) include representations of the concepts, entities, relations, properties, and instances of a domain.

In at least one embodiment, domain models component(s) 1056 of assistant 1002 may be operable to perform and/or implement various types of functions, operations, actions, and/or other features such as, for example, one or more of the following (or combinations thereof):

- Domain model component(s) 1056 may be used by automated assistant 1002 for several processes, including: eliciting input 100, interpreting natural language 200, dispatching to services 400, and generating output 600.
- Domain model component(s) 1056 may provide lists of words that might match a domain concept or entity, which may be used for active elicitation of input 100 and natural language processing 200.
- Domain model component(s) 1056 may classify candidate words in processes.
- Domain model component(s) 1056 may show the relationship between partial information for interpreting natural language.
- Domain model component(s) 1056 may organize information about services used in service/actions orchestration 1082.
- Domain model component(s) 1056 may provide the information for generating natural language paraphrases and other output formatting, for example, by providing canonical ways of describing concepts, relations, properties and instances.

According to specific embodiments, multiple instances or threads of the domain models component(s) 1056 may be concurrently implemented and/or initiated via the use of one or more processors 63 and/or other combinations of hardware and/or hardware and software. For example, in at least some embodiments, various aspects, features, and/or functionalities of domain models component(s) 1056 may be performed, implemented and/or initiated by one or more of the following types of systems, components, systems, devices, procedures, processes, and the like (or combinations thereof):

- Domain models component(s) 1056 may be implemented as data structures that represent concepts, relations, properties, and instances. These data structures may be stored in memory, files, or databases.
- Access to domain model component(s) 1056 may be implemented through direct APIs, network APIs, database query interfaces, and/or the like.
- Creation and maintenance of domain models component(s) 1056 may be achieved, for example, via direct editing of files, database transactions, and/or through the use of domain model editing tools.
- Domain models component(s) 1056 may be implemented as part of or in association with active ontologies 1050, which combine models with instantiations of the models for servers and users.

According to various embodiments, one or more different threads or instances of domain models component(s) 1056 may be initiated in response to detection of one or more conditions or events satisfying one or more different types of minimum threshold criteria for triggering initiation of at least one instance of domain models component(s) 1056. For example, trigger initiation and/or implementation of one or more different threads or instances of domain models component(s) 1056 may be triggered when domain model information is required, including during input elicitation, input interpretation, task and domain identification, natural language processing, service/action orchestration, and/or formatting output for users.

In at least one embodiment, a given instance of domain models component(s) 1056 may access and/or utilize information from one or more associated databases. In at least one embodiment, at least a portion of the database information may be accessed via communication with one or more local and/or remote memory devices. For example, data from domain model component(s) 1056 may be associated with other model modeling components including vocabulary 1058, language pattern recognizers 1060, dialog flow models 1087, task flow models 1086, service capability models 1088, domain entity databases 1072, and the like.

Domain Models Component(s) Example

In at least one embodiment, domain models component(s) 1056 are the unifying data representation that enables the presentation of information, which combines data from several distinct data sources and services.

Language Interpreter Component(s) 1070

In at least one embodiment, language interpreter component(s) 1070 of assistant 1002 may be operable to perform and/or implement various types of functions, operations, actions, and/or other features such as, for example, one or more of the following (or combinations thereof):

- Analyze user input and identify a set of parse results.
  - User input can include any information from the user and his/her device context that can contribute to understanding the user's intent, which can include, for example one or more of the following (or combinations thereof): sequences of words, the identity of gestures or GUI elements involved in eliciting the input, current context of the dialog, current device application and its current data objects, and/or any other personal dynamic data obtained about the user such as location, time, and the like. For example, in one embodiment, user input is in the form of the uniform annotated input format 2690 resulting from active input elicitation 1094.
  - Parse results are associations of data in the user input with concepts, relationships, properties, instances, and/or other nodes and/or data structures in models, databases, and/or other representations of user intent and/context. Parse result associations can be complex mappings from sets and sequences of words, signals, and other elements of user input to one or more associated concepts, relations, properties, instances, other nodes, and/or data structures described herein.
- Analyze user input and identify a set of syntactic parse results, which are parse results that associate data in the user input with structures that represent syntactic parts of speech, clauses and phrases including multiword names, sentence structure, and/or other grammatical graph structures. Syntactic parse results are described in element 212 of natural language processing procedure described in connection with FIG. 28.
- Analyze user input and identify a set of semantic parse results, which are parse results that associate data in the user input with structures that represent concepts, relationships, properties, entities, quantities, propositions, and/or other representations of meaning and user intent. In one embodiment, these representations of meaning and intent are represented by sets of and/or elements of and/or instances of models or databases and/or nodes in ontologies, as described in element 220 of natural language processing procedure described in connection with FIG. 28.
- Disambiguate among alternative syntactic or semantic parse results as described in element 230 of natural language processing procedure described in connection with FIG. 28.
- Determine whether a partially typed input is syntactically and/or semantically meaningful in an autocomplete procedure such as one described in connection with FIG. 11.
- Help generate suggested completions 114 in an autocomplete procedure such as one described in connection with FIG. 11.
- Determine whether interpretations of spoken input are syntactically and/or semantically meaningful in a speech input procedure such as one described in connection with FIG. 22.

According to specific embodiments, multiple instances or threads of language interpreter component(s) 1070 may be concurrently implemented and/or initiated via the use of one or more processors 63 and/or other combinations of hardware and/or hardware and software.

According to different embodiments, one or more different threads or instances of language interpreter component(s) 1070 may be initiated in response to detection of one or more conditions or events satisfying one or more different types of minimum threshold criteria for triggering initiation of at least one instance of language interpreter component(s) 1070. Various examples of conditions or events which may trigger initiation and/or implementation of one or more different threads or instances of language interpreter component(s) 1070 may include, but are not limited to, one or more of the following (or combinations thereof):

- while eliciting input, including but not limited to
  - Suggesting possible completions of typed input 114 (FIG. 11);
  - Ranking interpretations of speech;
  - When offering ambiguities as suggested responses in dialog;
- when the result of eliciting input is available, including when input is elicited by any mode of active multimodal input elicitation.

In at least one embodiment, a given instance of language interpreter component(s) 1070 may access and/or utilize information from one or more associated databases. In at least one embodiment, at least a portion of such database information may be accessed via communication with one or more local and/or remote memory devices. Examples of different types of data which may be accessed by the Language Interpreter component(s) may include, but are not limited to, one or more of the following (or combinations thereof):

- Domain models 1056;
- Vocabulary 1058;
- Domain entity databases 1072;
- Short term memory 1052;
- Long term personal memory 1054;
- Task flow models 1086;
- Dialog flow models 1087;
- Service capability models 1088.

In some embodiments, there is natural language processing. The user has entered (via voice or text) language input consisting of a given phrase, and the phrase is echoed back to the user on screen 242. Language interpreter component(s) component process input and generates a parse result. The parse result associates that input with a request to show the results that are associated with the input. A paraphrase of the parse results can also be shown or shown in the alternative.

Referring now also to FIG. 28, there is shown a flow diagram depicting an example of a method for natural language processing according to one embodiment.

The method begins 200. Language input 202 is received, such as the string "I hear buzzing in my ear". In one embodiment, the input is augmented by current context information, such as the current user location and local time. In word/phrase matching 210, language interpreter component(s) 1070 find associations between user input and concepts. In this example, associations are found between the string "buzzing" and the concept of addressing tinnitus; the string "in my ear" and an instantiation of possible scenarios that could be causing such buzzing=. Word/phrase matching 210 may use data from, for example, language pattern recognizers 1060, vocabulary database 1058, active ontology 1050, short term personal memory 1052, and long term personal memory 1054.

Language interpreter component(s) 1070 generate candidate syntactic parses 212 which include the chosen parse result but may also include other parse results. For example, other parse results may include those wherein "buzzing" is associated with other domains such as EMI (electromagnetic interference) or with a category of event such as near AC current source?.

Short- and/or long-term memory 1052, 1054 can also be used by language interpreter component(s) 1070 in generating candidate syntactic parses 212. Thus, input that was provided previously in the same session, and/or known information about the user, can be used, to improve performance, reduce ambiguity, and reinforce the conversational nature of the interaction. Data from active ontology 1050, domain models 1056, and task flow models 1086 can also be used, to implement evidential reasoning in determining valid candidate syntactic parses 212.

In semantic matching 220, language interpreter component(s) 1070 consider combinations of possible parse results according to how well they fit semantic models such as domain models and databases. In this case, the parse includes the associations (1) "loud" (a word in the user input) as "volume too high" (part of a domain model 1056 represented by a cluster of nodes in active ontology 1050) and (2) "noise" (another word in the input) as a match to an entity name in a domain entity database 1072 for non-speech sounds, which is represented by a domain model element and active ontology node.

Semantic matching 220 may use data from, for example, active ontology 1050, short term personal memory 1052, and long term personal memory 1054. For example, semantic matching 220 may use data from previous references to venues or local events in the dialog (from short term personal memory 1052) or personal favorite settings (from long term personal memory 1054).

A set of candidate, or potential, semantic parse results is generated 222.

In disambiguation step 230, language interpreter component(s) 1070 weigh the evidential strength of candidate semantic parse results 222. In this example, the combination of the parse of "loud" as "volume too high" and the match of "noise" as a non-speech sounds is a stronger match to a domain model than alternative combinations where, for instance, "loud" is associated with a domain model for music (e.g., where the recipient likes loud music) but there is no association in the music for "noise".

Disambiguation 230 may use data from, for example, the structure of active ontology 1050. In at least one embodiment, the connections between nodes in an active ontology provide evidential support for disambiguating among candidate semantic parse results 222. For example, in one embodiment, if three active ontology nodes are semantically matched and are all connected in active ontology 1050, this indicates higher evidential strength of the semantic parse than if these matching nodes were not connected or connected by longer paths of connections in active ontology 1050. For example, in one embodiment of semantic matching 220, the parse that matches both words of input is given increased evidential support because the combined representations of these aspects of the user intent are connected by links and/or relations in active ontology 1050.

In at least one embodiment, the connections between nodes in an active ontology that provide evidential support for disambiguating among candidate semantic parse results 222 are directed arcs, forming an inference lattice, in which matching nodes provide evidence for nodes to which they are connected by directed arcs.

In 232, language interpreter component(s) 1070 sort and select 232 the top semantic parses as the representation of user intent 290.

Domain Entity Database(s) 1072

In at least one embodiment, domain entity database(s) 1072 may be operable to perform and/or implement various types of functions, operations, actions, and/or other features.

According to specific embodiments, multiple instances or threads of domain entity database(s) 1072 may be concurrently implemented and/or initiated via the use of one or more processors 63 and/or other combinations of hardware and/or hardware and software. For example, in at least some embodiments, various aspects, features, and/or functionalities of domain entity database(s) 1072 may be performed, implemented and/or initiated by database software and/or hardware residing on client(s) 1304 and/or on server(s) 1340.

One example of a domain entity database 1072 that can be used in connection with the present invention according to one embodiment is a database. The database might be used, for example, to look up words contained in an input request. One skilled in the art will recognize that many other arrangements and implementations are possible.

Vocabulary Component(s) 1058

In at least one embodiment, vocabulary component(s) 1058 may be operable to perform and/or implement various types of functions, operations, actions, and/or other features such as, for example, one or more of the following (or combinations thereof):

- Provide databases associating words and strings with concepts, properties, relations, or instances of domain models or task models;
- Vocabulary from vocabulary components may be used by automated assistant 1002 for several processes, including for example: eliciting input, interpreting natural language, and generating output.

According to specific embodiments, multiple instances or threads of vocabulary component(s) 1058 may be concurrently implemented and/or initiated via the use of one or more processors 63 and/or other combinations of hardware and/or hardware and software. For example, in at least some embodiments, various aspects, features, and/or functionalities of vocabulary component(s) 1058 may be implemented as data structures that associate strings with the names of concepts, relations, properties, and instances. These data structures may be stored in memory, files, or databases. Access to vocabulary component(s) 1058 may be implemented through direct APIs, network APIs, and/or database query interfaces. Creation and maintenance of vocabulary component(s) 1058 may be achieved via direct editing of files, database transactions, or through the use of domain model editing tools. Vocabulary component(s) 1058 may be implemented as part of or in association with active ontologies 1050. One skilled in the art will recognize that many other arrangements and implementations are possible.

According to different embodiments, one or more different threads or instances of vocabulary component(s) 1058 may be initiated in response to detection of one or more conditions or events satisfying one or more different types of minimum threshold criteria for triggering initiation of at least one instance of vocabulary component(s) 1058. In one embodiment, vocabulary component(s) 1058 are accessed whenever vocabulary information is required, including, for example, during input elicitation, input interpretation, and formatting output for users. One skilled in the art will recognize that other conditions or events may trigger initiation and/or implementation of one or more different threads or instances of vocabulary component(s) 1058.

In at least one embodiment, a given instance of vocabulary component(s) 1058 may access and/or utilize information from one or more associated databases. In at least one embodiment, at least a portion of the database information may be accessed via communication with one or more local and/or remote memory devices. In one embodiment, vocabulary component(s) 1058 may access data from external databases, for instance, from a data warehouse or dictionary.

Language Pattern Recognizer Component(s) 1060

In at least one embodiment, language pattern recognizer component(s) 1060 may be operable to perform and/or implement various types of functions, operations, actions, and/or other features such as, for example, looking for patterns in language or speech input that indicate grammatical, idiomatic, and/or other composites of input tokens. These patterns correspond to, for example, one or more of the following (or combinations thereof): words, names, phrases, data, parameters, commands, and/or signals of speech acts.

According to specific embodiments, multiple instances or threads of pattern recognizer component(s) 1060 may be concurrently implemented and/or initiated via the use of one or more processors 63 and/or other combinations of hardware and/or hardware and software. For example, in at least some embodiments, various aspects, features, and/or functionalities of language pattern recognizer component(s) 1060 may be performed, implemented and/or initiated by one or more files, databases, and/or programs containing expressions in a pattern matching language. In at least one embodiment, language pattern recognizer component(s) 1060 are represented declaratively, rather than as program code; this enables them to be created and maintained by editors and other tools other than programming tools. Examples of declarative representations may include, but are not limited to, one or more of the following (or combinations thereof): regular expressions, pattern matching rules, natural language grammars, parsers based on state machines and/or other parsing models.

One skilled in the art will recognize that other types of systems, components, systems, devices, procedures, processes, and the like (or combinations thereof) can be used for implementing language pattern recognizer component(s) 1060.

According to different embodiments, one or more different threads or instances of language pattern recognizer component(s) 1060 may be initiated in response to detection of one or more conditions or events satisfying one or more different types of minimum threshold criteria for triggering initiation of at least one instance of language pattern recognizer component(s) 1060. Various examples of conditions or events which may trigger initiation and/or implementation of one or more different threads or instances of language pattern recognizer component(s) 1060 may include, but are not limited to, one or more of the following (or combinations thereof):

- during active elicitation of input, in which the structure of the language pattern recognizers may constrain and guide the input from the user;
- during natural language processing, in which the language pattern recognizers help interpret input as language;
- during the identification of tasks and dialogs, in which the language pattern recognizers may help identify tasks, dialogs, and/or steps therein.

In at least one embodiment, a given instance of language pattern recognizer component(s) 1060 may access and/or utilize information from one or more associated databases. In at least one embodiment, at least a portion of the database information may be accessed via communication with one or more local and/or remote memory devices. Examples of different types of data which may be accessed by language pattern recognizer component(s) 1060 may include, but are not limited to, data from any of the models various models and data sources that may be part of embodiments of assistant 1002, which may include, but are not limited to, one or more of the following (or combinations thereof):

- Domain models 1056;
- Vocabulary 1058;
- Domain entity databases 1072;
- Short term memory 1052;
- Long term personal memory 1054;
- Task flow models 1086;
- Dialog flow models 1087;
- Service capability models 1088.

In one embodiment, access of data from other parts of embodiments of assistant 1002 may be coordinated by active ontologies 1050.

An example of some of the various types of functions, operations, actions, and/or other features which may be provided by language pattern recognizer component(s) 1060. Language patterns that language pattern recognizer component(s) may recognize can be analogous to, by way of conceptual example, the idiom "cannot hear woman in front of me" at a restaurant may be associated with the task of beamforming and the domain of adjustments they can be made to the hearing prosthesis.

Dialog Flow Processor Component(s) 1080

In at least one embodiment, dialog flow processor component(s) 1080 may be operable to perform and/or implement various types of functions, operations, actions, and/or other features such as, for example, one or more of the following (or combinations thereof):

- Given a representation of the user intent from language interpretation, identify the task a user wants performed and/or a problem the user wants solved. For example, a task might be to eliminate a buzzing perception.
- For a given problem or task, given a representation of user intent, identify parameters to the task or problem. For example, the user might be looking to make an adjustment to the hearing prosthesis to obtain a given result. The constraints that the results cannot be too loud, the ability to perceive speech cannot be diminished are parameters to the task.
- Given the task interpretation and current dialog with the user, such as that which may be represented in personal short term memory 1052, select an appropriate dialog flow model and determine a step in the flow model corresponding to the current state.

According to specific embodiments, multiple instances or threads of dialog flow processor component(s) 1080 may be concurrently implemented and/or initiated via the use of one or more processors 63 and/or other combinations of hardware and/or hardware and software. In an exemplary embodiment, the dialogue flow processor is a microprocessor (any disclosure of a processor herein corresponds to a disclosure of a microprocessor, and any disclosure herein of a microprocessor also corresponds to a non-microprocessor processor). In an exemplary embodiment, the processors detailed herein are processors that include software and/or firmware or otherwise have access to software and/or firmware that enable the functionalities detailed herein and/or variations thereof to be practiced.

In at least one embodiment, a given instance of dialog flow processor component(s) 1080 may access and/or utilize information from one or more associated databases. In at least one embodiment, at least a portion of the database information may be accessed via communication with one or more local and/or remote memory devices. Examples of different types of data which may be accessed by dialog flow processor component(s) 1080 may include, but are not limited to, one or more of the following (or combinations thereof):

- task flow models 1086;
- domain models 1056;
- dialog flow models 1087.

In one embodiment, such a dialog is implemented as follows. Dialog flow processor component(s) 1080 are given a representation of user intent from language interpreter component 1070 and determine that the appropriate response is to ask the user for information required to perform the next step in a task flow. This dialog step is exemplified by prompt 3003 of screen 3001.

Figure 32:
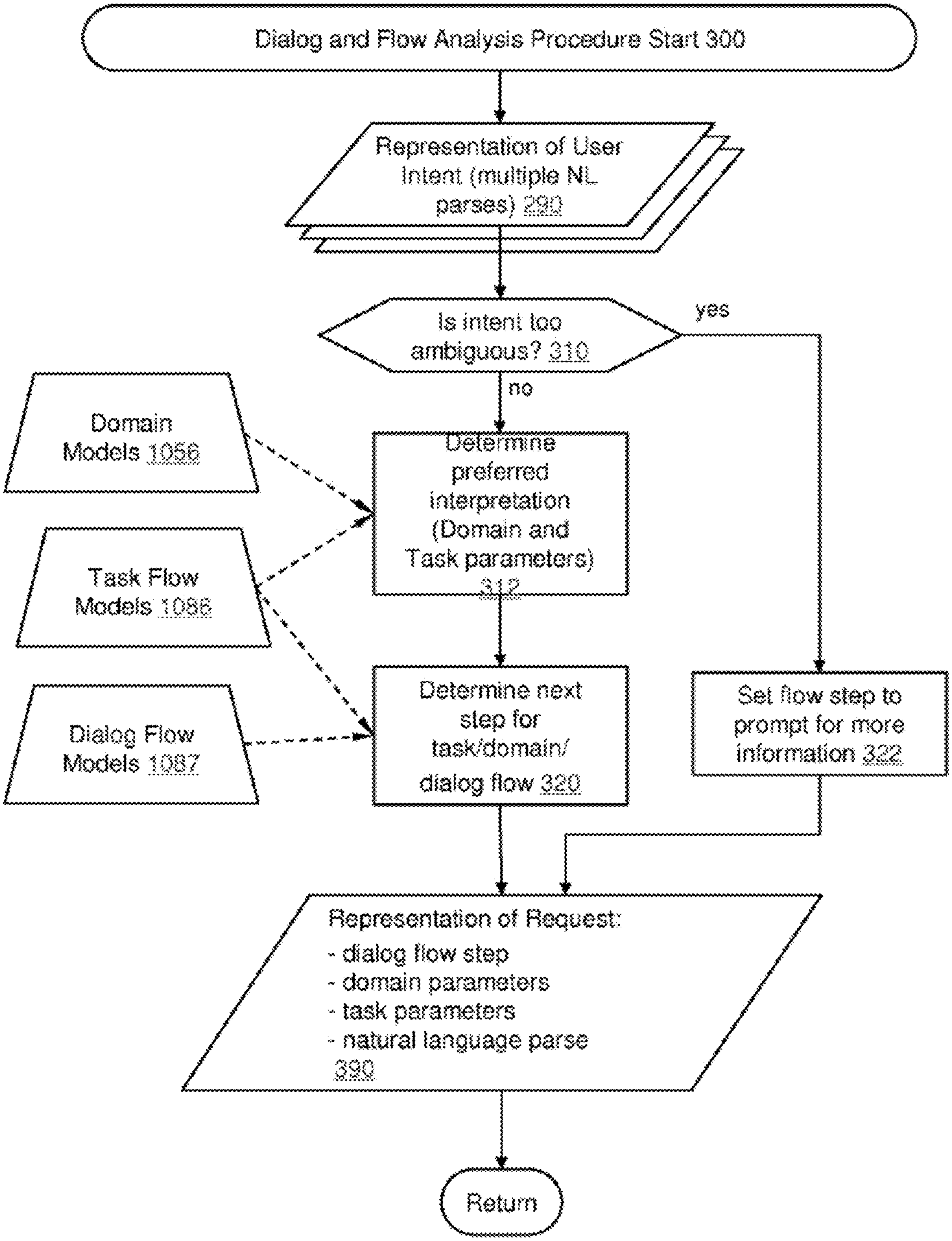
FIG. 32 is a flow diagram depicting a method of operation for dialog flow processor component(s) according to one embodiment.

Referring now also to FIG. 32, there is shown a flow diagram depicting a method of operation for dialog flow processor component(s) 1080 according to one embodiment.

Dialog Flow Models Component(s) 1087

In at least one embodiment, dialog flow models component(s) 1087 may be operable to provide dialog flow models, which represent the steps one takes in a particular kind of conversation between a user and intelligent automated assistant 1002. For example, the dialog flow for the generic task of performing a transaction includes steps for getting the necessary data for the transaction and confirming the transaction parameters before committing it.

Task Flow Models Component(s) 1086

In at least one embodiment, task flow models component(s) 1086 may be operable to provide task flow models, which represent the steps one takes to solve a problem or address a need. For example, the task flow for eliminating buzzing can entail applying a masker for the tinnitus, checking whether a given frequency is present in the audio line, and making an adjustment to the hearing prosthesis to obtain a result.

According to specific embodiments, multiple instances or threads of task flow models component(s) 1086 may be concurrently implemented and/or initiated via the use of one or more processors 63 and/or other combinations of hardware and/or hardware and software. For example, in at least some embodiments, various aspects, features, and/or functionalities of task flow models component(s) 1086 may be may be implemented as programs, state machines, or other ways of identifying an appropriate step in a flow graph.

In at least one embodiment, task flow models component(s) 1086 may use a task modeling framework called generic tasks. Generic tasks are abstractions that model the steps in a task and their required inputs and generated outputs, without being specific to domains. For example, a generic task for transactions might include steps for gathering data required for the transaction, executing the transaction, and outputting results of the transaction—all without reference to any particular transaction domain or service for implementing such.

At least a portion of the functions, operations, actions, and/or other features associated with task flow models component(s) 1086 and/or procedure(s) described herein may be implemented, at least in part, using concepts, features, components, processes, and/or other aspects disclosed herein in connection with generic task modeling framework.

Additionally, at least a portion of the functions, operations, actions, and/or other features associated with task flow models component(s) 1086 and/or procedure(s) described herein may be implemented, at least in part, using concepts, features, components, processes, and/or other aspects relating to constrained selection tasks, as described herein. For example, one embodiment of generic tasks may be implemented using a constrained selection task model.

In at least one embodiment, a given instance of task flow models component(s) 1086 may access and/or utilize information from one or more associated databases. In at least one embodiment, at least a portion of the database information may be accessed via communication with one or more local and/or remote memory devices. Examples of different types of data which may be accessed by task flow models component(s) 1086 may include, but are not limited to, one or more of the following (or combinations thereof):

- Domain models 1056;
- Vocabulary 1058;
- Domain entity databases 1072;
- Short term memory 1052;
- Long term personal memory 1054;
- Dialog flow models 1087;
- Service capability models 1088.

Figure 34:
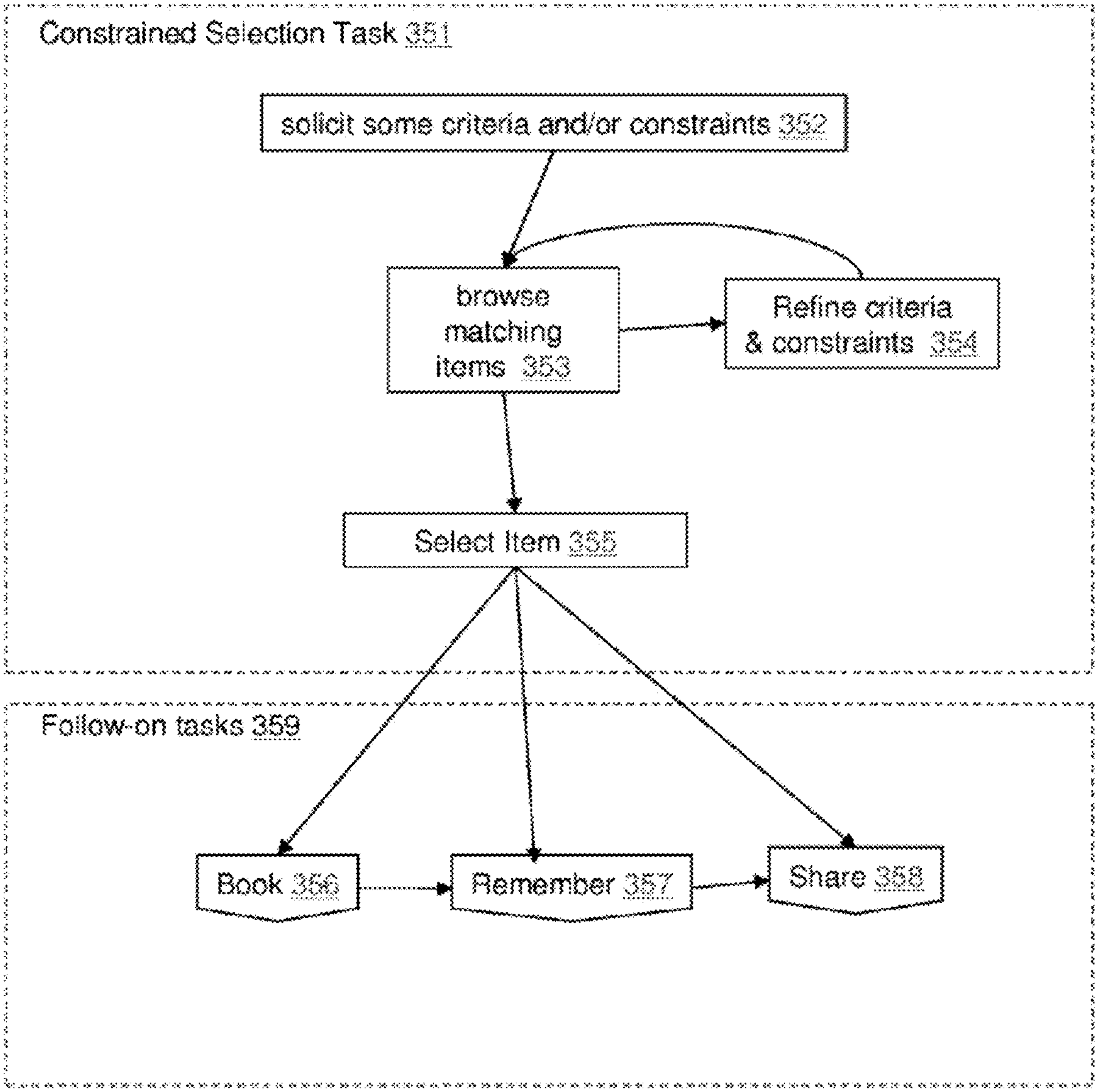
FIG. 34 is a flow diagram depicting an example of task flow for a constrained selection task according to one embodiment.

Referring now to FIG. 34, there is shown a flow diagram depicting an example of task flow for a constrained selection task 351 according to one embodiment.

Constrained selection is a kind of generic task in which the goal is to select some item from a set of items in the world based on a set of constraints. Constrained selection task 351 starts by soliciting criteria and constraints from the user 352. For example, the user might be interested in improving speech perception where the speech is from a child.

In step 353, assistant 1002 presents items that meet the stated criteria and constraints for the user to browse.

In step 354, the user is given an opportunity to refine criteria and constraints. For example, the user might refine the request by saying "child's voice". The system would then present a new set of results in step 353.

In various embodiments, the flow steps may be offered to the user in any of several input modalities, including but not limited to any combination of explicit dialog prompts and GUI links.

Services Component(s) 1084

Services component(s) 1084 represent the set of services that intelligent automated assistant 1002 might call on behalf of the user. Any service that can be called may be offered in a services component 1084.

In at least one embodiment, services component(s) 1084 may be operable to perform and/or implement various types of functions, operations, actions, and/or other features such as, for example, one or more of the following (or combinations thereof):

- Provide the functions over an API that would normally be provided by a web-based user interface to a service. For example, a review website might provide a service API that would return reviews of a given entity automatically when called by a program. The API offers to intelligent automated assistant 1002 the services that a human would otherwise obtain by operating the user interface of the website.
- Provide the functions over an API that would normally be provided by a user interface to an application. For example, a beamforming application might provide a service API that would return options for beamforming automatically when called by a program. The API offers to intelligent automated assistant 1002 the services that a human would otherwise obtain by operating the user interface of the application. In one embodiment, assistant 1002 is able to initiate and control any of a number of different functions available on the device. For example, if assistant 1002 is installed on a smartphone, personal digital assistant, tablet computer, or other device, assistant 1002 can perform functions such as: initiate applications, adjust beamforming setting, adjust location and/or direction of remote microphone. In one embodiment, such functions are activated using services component(s) 1084.

Provide services that are not currently implemented in a user interface, but that are available through an API to assistant in larger tasks. For example, in one embodiment, an API to take a street address and return machine-readable geo-coordinates might be used by assistant 1002 as a service component 1084 even if it has no direct user interface on the web or a device.

According to specific embodiments, multiple instances or threads of services component(s) 1084 may be concurrently implemented and/or initiated via the use of one or more processors 63 and/or other combinations of hardware and/or hardware and software. For example, in at least some embodiments, various aspects, features, and/or functionalities of services component(s) 1084 may be performed, implemented and/or initiated by one or more of the following types of systems, components, systems, devices, procedures, processes, and the like (or combinations thereof):

implementation of an API exposed by a service, locally or remotely or any combination;

inclusion of a database within automated assistant 1002 or a database service available to assistant 1002.

For example, a website that offers users an interface for browsing options for an adjustment to a given hearing prosthesis might be used by an embodiment of intelligent automated assistant 1002 as a copy of the database used by the website. Services component(s) 1084 would then offer an internal API to the data, as if it were provided over a network API, even though the data is kept locally.

As another example, services component(s) 1084 for an intelligent automated assistant 1002 that helps with adjustment setting selection and hearing environment forecasting might include any or all of the following set of services which are available from third parties over the network:

a set of possible locations that the recipient may find himself or herself in the future;

a set of potential deleterious sound scenarios that could occur in the given setting (e.g., a bar can have a band or otherwise be playing music loudly);

a set of reviews which returns written reviews for given locations (e.g., similarly situated recipients may have had similar problems at similar locations and/or the same locations under similar and/or the same environments, and found that certain settings and/or adjustments or other behavioral modifications had utilitarian value, which can be presented or otherwise proffered or otherwise utilized by the auto clinician when the recipient is in such location and/or environment);

a service that enables the presentation of various settings and/or scenarios to the recipient prior to arriving at the location or otherwise entering in the environment (e.g., the auto clinician presents possible problems the recipient may find when at the location and/or environment and/or presents possible changes to settings and/or changes to behavior that the recipient may find to have utilitarian value once the recipient arrives at or otherwise is exposed to the environment (in an exemplary embodiment, the auto clinician can be configured to ask the recipient for authorization to automatically make adjustments to the settings upon a detection of a given sound scenario and/or, in some and embodiments, the auto clinician can indicate to the recipient that the auto clinician will serially vary settings and indicate to the recipient that such is been done so that the recipient can provide input as to which setting which was automatically implemented was the most utilitarian, and then the auto clinician can adopt that setting).

Services/Actions Orchestration Component(s) 1082

Services/actions orchestration component(s) 1082 of intelligent automated assistant 1002 executes a service/actions orchestration procedure (which can correspond to an action orchestration procedure, and thus 1082 can be an action orchestration component—and disclosure herein of service orchestration corresponds to a disclosure of action orchestration). The service orchestration component(s)/action orchestration components can be based in a processor, based in a lookup table with a predetermined algorithm utilizing if, then, else, etc.

In at least one embodiment, services/actions orchestration component(s) 1082 may be operable to perform and/or implement various types of functions, operations, actions, and/or other features such as, for example, one or more of the following (or combinations thereof):

Dynamically and automatically determine which services may meet the user's request and/or specified domain(s) and task(s);

Dynamically and automatically call multiple services, in any combination of concurrent and sequential ordering;

Dynamically and automatically transform task parameters and constraints to meet input requirements of service APIs;

Dynamically and automatically monitor for and gather results from multiple services;

Dynamically and automatically merge service results data from various services into to a unified result model;

Orchestrate a plurality of services and/or actions to meet the constraints of a request;

Orchestrate a plurality of services and/or actions to annotate an existing result set with auxiliary information;

Output the result of calling a plurality of services in a uniform, service independent representation that unifies the results from the various services.

For example, in some situations, there may be several ways to accomplish a particular task/action. For example, user input such as help me hear the person in front of me better specifies an action that can be accomplished in at least three ways: increased volume, beamforming, and/or the utilization of a remote microphone placed proximate to the lips of the person in front of the recipient In one embodiment, services/actions orchestration component(s) 1082 makes the determination as to which way to best satisfy the request.

Services/actions orchestration component(s) 1082 can also make determinations as to which combination of several services would be best to invoke in order to perform a given overall task. For example, to hear a person speaking better, services/actions orchestration component(s) 1082 would make determinations as to which services to call in order to perform such functions as determining what components should be adjusted, etc. Determination of which services to use may depend on any of a number of different factors. For example, in at least one embodiment, information about reliability, ability of service to handle certain types of requests, user feedback, and the like, can be used as factors in determining which service(s) is/are appropriate to invoke.

According to specific embodiments, multiple instances or threads of services/actions orchestration component(s) 1082 may be concurrently implemented and/or initiated via the use of one or more processors and/or other combinations of hardware and/or hardware and software.

In at least one embodiment, a given instance of services/actions orchestration component(s) 1082 may use explicit service capability models 1088 to represent the capabilities and other properties of external services, and reason about these capabilities and properties while achieving the features of services/actions orchestration component(s) 1082. This affords advantages over manually programming a set of services that may include, for example, one or more of the following (or combinations thereof):

- Ease of development;
- Robustness and reliability in execution;
- The ability to dynamically add and remove services without disrupting code;
- The ability to implement general distributed query optimization algorithms that are driven by the properties and capabilities rather than hard coded to specific services or APIs.

In at least one embodiment, a given instance of services/actions orchestration component(s) 1082 may access and/or utilize information from one or more associated databases. In at least one embodiment, at least a portion of the database information may be accessed via communication with one or more local and/or remote memory devices. Examples of different types of data which may be accessed by services/actions orchestration component(s) 1082 may include, but are not limited to, one or more of the following (or combinations thereof):

- Instantiations of domain models;
- Syntactic and semantic parses of natural language input;
- Instantiations of task models (with values for parameters);
- Dialog and task flow models and/or selected steps within them;
- Service capability models 1088;
- Any other information available in an active ontology 1050.

Figure 8:
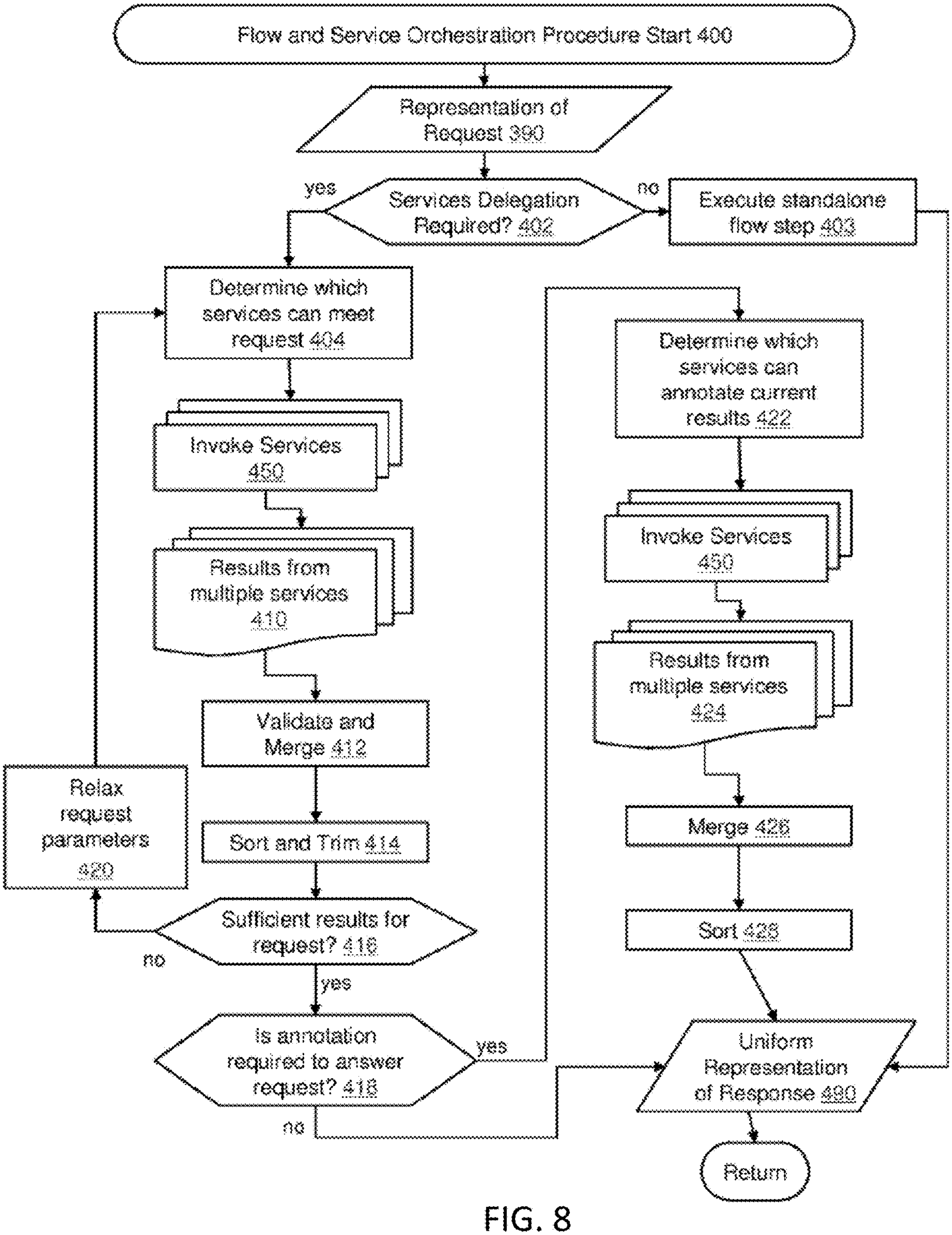
FIG. 8 is a flow diagram depicting an example of a procedure for executing a service orchestration procedure according to one embodiment.

Referring now to FIG. 8, there is shown an example of a procedure for executing a service/action orchestration procedure according to one embodiment.

Consider the task of having the auto clinician identify settings that provide speech percept at the near exclusion of all other percepts, even though the speaker is in a noisy environment, and speaks at a frequency higher than that to which the recipient is used to (e.g., speaker is French). These domain and task parameters are given as input 390.

The method begins 400. At 402, it is determined whether the given request may require any services. In some situations, services delegation may not be required, for example if assistant 1002 is able to perform the desired task itself. For example, in one embodiment, assistant 1002 may be able to answer a factual question without invoking services delegation. Accordingly, if the request does not require services, then standalone flow step is executed in 403 and its result 490 is returned. For example, if the task request was to ask for information about automated assistant 1002 itself, then the dialog response may be handled without invoking any external services.

If, in step 402, it is determined that services delegation is required, services/actions orchestration component(s) 1082 proceed to step 404. In 404, services/actions orchestration component(s) 1082 may match up the task requirements with declarative descriptions of the capabilities and properties of services in service capability models 1088. At least one service provider that might support the instantiated operation provides declarative, qualitative metadata detailing, for example, one or more of the following (or combinations thereof):

- the data fields that are returned with results;
- which classes of parameters the service provider is statically known to support;
- policy functions for parameters the service provider might be able to support after dynamic inspection of the parameter values;
- a performance rating defining how the service performs (e.g. relational DB, web service, triple store, full-text index, or some combination thereof);
- property quality ratings statically defining the expected quality of property values returned with the result object;
- an overall quality rating of the results the service may expect to return.

For example, reasoning about the classes of parameters that service may support, a service model may state that services 1, 2, 3, and 4 may provide adjustments to settings that typically result in improved hearing with respect to almost any given environment/location services 2 and 3 may provide adjustments to settings that typically results in improved hearing with respect to speech, services 3, 4, and 5 may return adjustments to settings that typically results in improved hearing with respect to streamed audio to the hearing prostheses (e.g., from a radio, a television, a CD or MP3 player, etc.), service 6 may return adjustments to settings that typically results in improvement of hearing with respect to music, and service 7 may return adjustments to settings that typically results in improvement of hearing in a reverberant environment. Services 8 through 99 offer capabilities that are not required for this particular domain and task.

Using this declarative, qualitative metadata, the task, the task parameters, and other information available from the runtime environment of the assistant, services/actions orchestration component(s) 1082 determines 404 an optimal set of service providers to invoke. The optimal set of service providers may support one or more task parameters (returning results that satisfy one or more parameters) and also considers the performance rating of at least one service provider and the overall quality rating of at least one service provider.

The result of step 404 is a dynamically generated list of services to call for this particular user and request.

In at least one embodiment, services/actions orchestration component(s) 1082 considers the reliability of services as well as their ability to answer specific information requests.

In at least one embodiment, services/actions orchestration component(s) 1082 hedges against unreliability by calling overlapping or redundant services.

In at least one embodiment, services/actions orchestration component(s) 1082 considers personal information about the user (from the short term personal memory component) to select services. For example, the user may prefer some prostheses and settings versus other prosthesis settings in different scenarios.

In step 450, services/actions orchestration component(s) 1082 dynamically and automatically invokes multiple services on behalf of a user. In at least one embodiment, these are called dynamically while responding to a user's request. According to specific embodiments, multiple instances or threads of the services may be concurrently called. In at least one embodiment, these are called over a network using APIs, or over a network using web service APIs, or over the Internet using web service APIs, or any combination thereof.

In at least one embodiment, the rate at which services are called is programmatically limited and/or managed.

Figure 35:
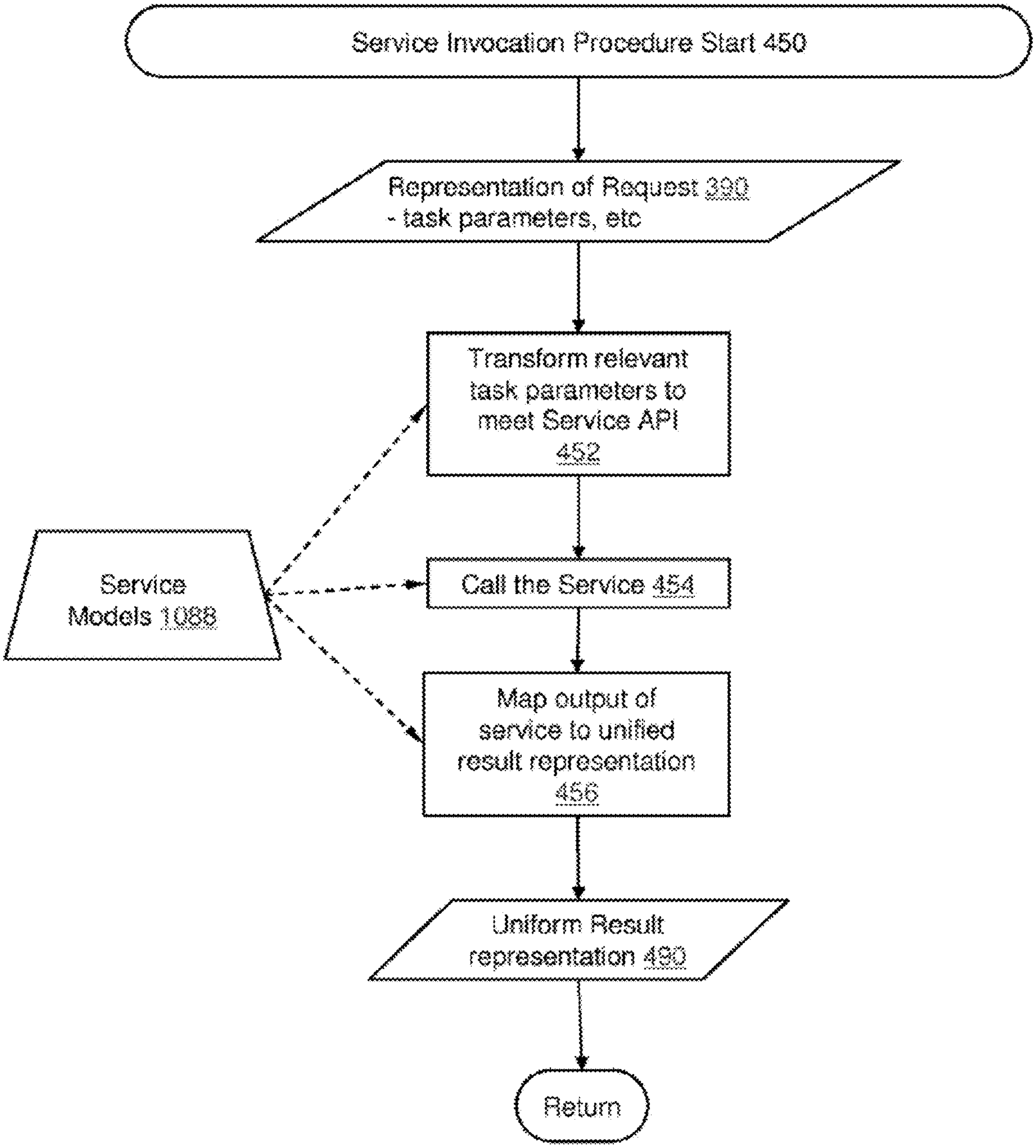
FIG. 35 is a flow diagram depicting an example of a service invocation procedure according to one embodiment.

Referring now also to FIG. 35, there is shown an example of a service invocation procedure 450 according to one embodiment. Service invocation is used, for example, to obtain additional information or to perform tasks by the use of external services. In one embodiment, request parameters are transformed as appropriate for the service's API. Once results are received from the service, the results are transformed to a results representation for presentation to the user within assistant 1002.

In at least one embodiment, services invoked by service invocation procedure 450 can be a web service, application running on the device, operating system function, or the like.

Representation of request 390 is provided, including for example task parameters and the like. For at least one service available from service capability models 1088, service invocation procedure 450 performs transformation 452, calling 454, and output-mapping 456 steps.

In transformation step 452, the current task parameters from request representation 390 are transformed into a form that may be used by at least one service. Parameters to services, which may be offered as APIs or databases, may differ from the data representation used in task requests, and also from at least one other. Accordingly, the objective of step 452 is to map at least one task parameter in the one or more corresponding formats and values in at least one service being called.

The service is called 454 over an API and its data gathered. In at least one embodiment, the results are cached. In at least one embodiment, the services that do not return within a specified level performance (e.g., as specified in Service Level Agreement or SLA) are dropped.

In output mapping step 456, the data returned by a service is mapped back onto unified result representation 490. This step may include dealing with different formats, units, and so forth.

In step 412, results from multiple services are validated and merged. In one embodiment, if validated results are collected, an equality policy function—defined on a per-domain basis—is then called pair-wise across one or more results to determine which results represent identical concepts in the real world. When a pair of equal results is discovered, a set of property policy functions—also defined on a per-domain basis—are used to merge property values into a merged result. The property policy function may use the property quality ratings from the service capability models, the task parameters, the domain context, and/or the long-term personal memory 1054 to decide the optimal merging strategy.

In step 414, the results are sorted and trimmed to return a result list of the desired length.

In at least one embodiment, a request relaxation loop is also applied. If, in step 416, services/actions orchestration component(s) 1082 determines that the current result list is not sufficient (e.g., it has fewer than the desired number of matching items), then task parameters may be relaxed 420 to allow for more results.

In at least one embodiment, the service/actions orchestration method is applied in a second pass to "annotate" results with auxiliary data that is useful to the task.

In step 418, services/actions orchestration component(s) 1082 determines whether annotation is required. It may be required if, for example, if the task may require a plot of the results on a map, but the primary services did not return geo-coordinates required for mapping.

In 422, service capability models 1088 are consulted again to find services that may return the desired extra information. In one embodiment, the annotation process determines if additional or better data may be annotated to a merged result. It does this by delegating to a property policy function—defined on a per-domain basis—for at least one property of at least one merged result. The property policy function may use the merged property value and property quality rating, the property quality ratings of one or more other service providers, the domain context, and/or the user profile to decide if better data may be obtained. If it is determined that one or more service providers may annotate one or more properties for a merged result, a cost function is invoked to determine the optimal set of service providers to annotate.

At least one service provider in the optimal set of annotation service providers is then invoked 450 with the list of merged results, to obtain results 424. The changes made to at least one merged result by at least one service provider are tracked during this process, and the changes are then merged using the same property policy function process as was used in step 412. Their results are merged 426 into the existing result set.

The resulting data is sorted 428 and unified into a uniform representation 490.

It may be appreciated that one advantage of the methods and systems described above with respect to services/actions orchestration component(s) 1082 is that they may be advantageously applied and/or utilized in various fields of technology other than those specifically relating to intelligent automated assistants. Examples of such other areas of technologies where aspects and/or features of service/actions orchestration procedures include, for example, one or more of the following:

- Dynamic "mash ups" on websites and web-based applications and services;
- Distributed database query optimization;
- Dynamic service oriented architecture configuration.

Service Capability Models Component(s) 1088

In at least one embodiment, service capability models component(s) 1088 may be operable to perform and/or implement various types of functions, operations, actions, and/or other features such as, for example, one or more of the following (or combinations thereof):

- Provide machine readable information about the capabilities of services to perform certain classes of computation;
- Provide machine readable information about the capabilities of services to answer certain classes of queries;
- Provide machine readable information about which classes of transactions are provided by various services;
- Provide machine readable information about the parameters to APIs exposed by various services;
- Provide machine readable information about the parameters that may be used in database queries on databases provided by various services.

Output Processor Component(s) 1090

In at least one embodiment, output processor component(s) 1090 may be operable to perform and/or implement various types of functions, operations, actions, and/or other features such as, for example, one or more of the following (or combinations thereof):

- Format output data that is represented in a uniform internal data structure into forms and layouts that render it appropriately on different modalities. Output data may include, for example, communication in natural language between the intelligent automated assistant and the user; data about domain entities, such as properties of settings resulting from different auto clinician actions, properties of settings resulting from specific recipient requests, and the like; domain specific data results from information services, such as current prosthesis settings and what those settings mean, and the like; and/or interactive links and buttons that enable the user to respond by directly interacting with the output presentation.
- Render output data for modalities that may include, for example, any combination of: graphical user interfaces; text messages; email messages; sounds; animations; and/or speech output.
- Dynamically render data for different graphical user interface display engines based on the request. For example, use different output processing layouts and formats depending on which web browser and/or device is being used.
- Render output data in different speech voices dynamically.
- Dynamically render to specified modalities based on user preferences.
- Dynamically render output using user-specific "skins" that customize the look and feel.
- Send a stream of output packages to a modality, showing intermediate status, feedback, or results throughout phases of interaction with assistant 1002.

According to specific embodiments, multiple instances or threads of output processor component(s) 1090 may be concurrently implemented and/or initiated via the use of one or more processor(s) 63 and/or other combinations of hardware and/or hardware and software. For example, in at least some embodiments, various aspects, features, and/or functionalities of output processor component(s) 1090 may be performed, implemented and/or initiated by one or more of the following types of systems, components, systems, devices, procedures, processes, and the like (or combinations thereof):

- software modules within the client or server of an embodiment of an intelligent automated assistant;
- remotely callable services;
- using a mix of templates and procedural code.

Figure 31:
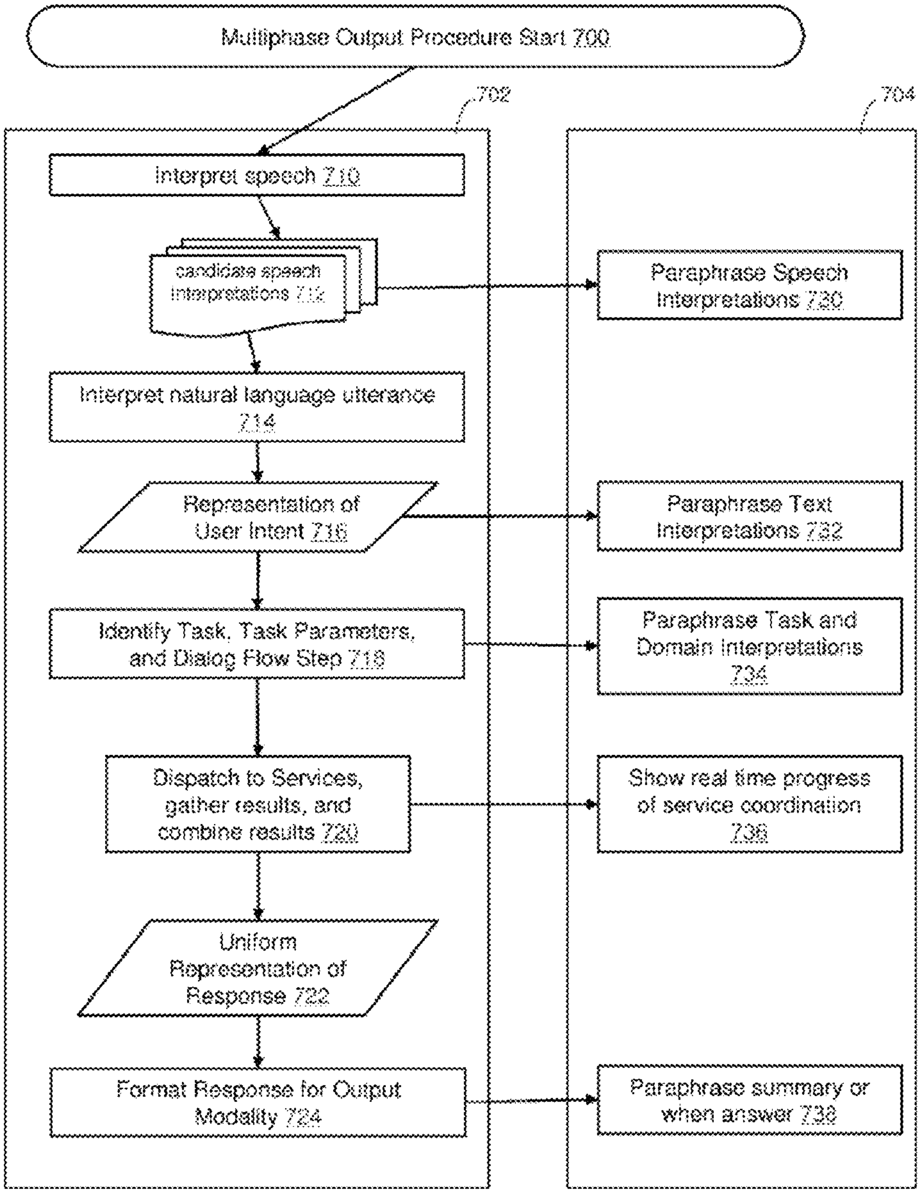
FIG. 31 is a flow diagram depicting an example of a multiphase output procedure according to one embodiment.

Referring now to FIG. 31, there is shown a flow diagram depicting an example of a multiphase output procedure according to one embodiment. The multiphase output procedure includes automated assistant 1002 processing steps 702 and multiphase output steps 704

In step 710, a speech input utterance is obtained and a speech-to-text component interprets the speech to produce a set of candidate speech interpretations 712. In one embodiment, speech-to-text component is implemented using, for example, Nuance Recognizer, available from Nuance Communications, Inc. of Burlington, Mass. Candidate speech interpretations 712 may be shown to the user in 730, for example in paraphrased form. For example, the interface might show "did you say?" alternatives listing a few possible alternative textual interpretations of the same speech sound sample.

In at least one embodiment, a user interface is provided to enable the user to interrupt and choose among the candidate speech interpretations.

In step 714, the candidate speech interpretations 712 are sent to a language interpreter 1070, which may produce representations of user intent 716 for at least one candidate speech interpretation 712. In step 732, paraphrases of these representations of user intent 716 are generated and presented to the user. (See related step 132 of procedure 120 in FIG. 22).

In at least one embodiment, the user interface enables the user to interrupt and choose among the paraphrases of natural language interpretations 732.

In step 718, task and dialog analysis is performed. In step 734, task and domain interpretations are presented to the user using an intent paraphrasing algorithm.

Returning to FIG. 31, as requests are dispatched 720 to services and results are dynamically gathered, intermediate results may be displayed in the form of real-time progress 736.

A uniform representation of response 722 is generated and formatted 724 for the appropriate output modality. After the final output format is completed, a different kind of paraphrase may be offered in 738. In this phase, the entire result set may be analyzed and compared against the initial request. A summary of results or answer to a question may then be offered.

The method begins 600. Output processor 1090 takes uniform representation of response 490 and formats 612 the response according to the device and modality that is appropriate and applicable. Step 612 may include information from device and modality models 610 and/or domain data models 614.

Figure 30:
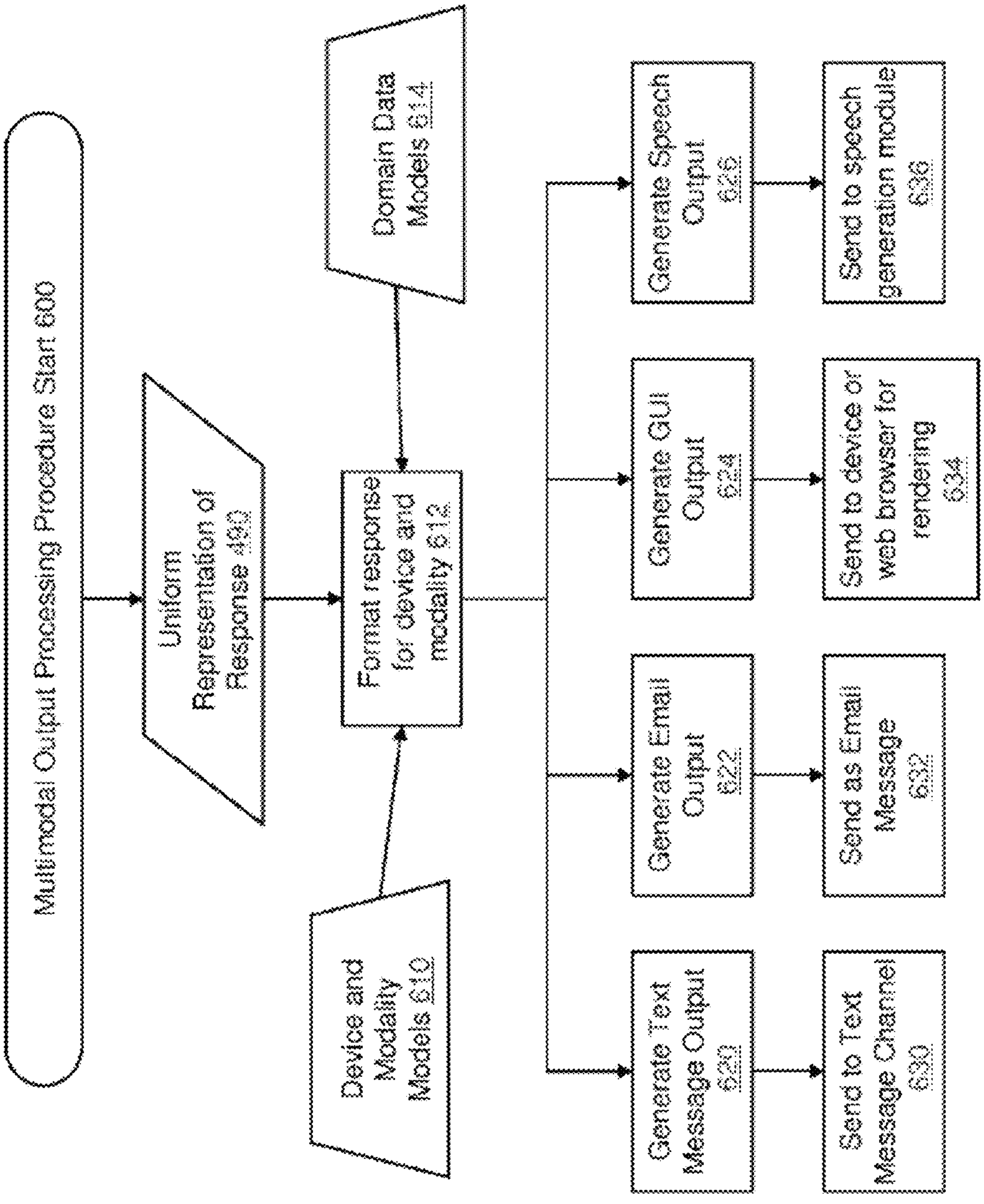
FIG. 30 is a flow diagram depicting an example of multimodal output processing according to one embodiment.

Once response 490 has been formatted 612, any of a number of different output mechanisms can be used, in any combination. Examples depicted in FIG. 30 include:

- Generating 620 text message output, which is sent 630 to a text message channel;
- Generating 622 email output, which is sent 632 as an email message;
- Generating 624 GUI output, which is sent 634 to a device or web browser for rendering;
- Generating 626 speech output, which is sent 636 to a speech generation module.

In one embodiment, the content of output messages generated by multiphase output procedure 700 is tailored to the mode of multimodal output processing 600. For example, if the output modality is speech 626, the language of used to paraphrase user input 730, text interpretations 732, task and domain interpretations 734, progress 736, and/or result summaries 738 may be more or less verbose or use sentences that are easier to comprehend in audible form than in written form. In one embodiment, the language is tailored in the steps of the multiphase output procedure 700; in other embodiments, the multiphase output procedure 700 produces an intermediate result that is further refined into specific language by multimodal output processing 600.

Short Term Personal Memory Component(s) 1052

In at least one embodiment, short term personal memory component(s) 1052 may be operable to perform and/or implement various types of functions, operations, actions, and/or other features such as, for example, one or more of the following (or combinations thereof):

- Keep a history of the recent dialog between the embodiment of the assistant and the user, including the history of user inputs and their interpretations;
- Keep a history of recent selections by the user in the GUI;

- Store the history of the dialog and user interactions in a database on the client, the server in a user-specific session, or in client session state such as web browser cookies or RAM used by the client;
- Store the list of recent user requests;
- Store the sequence of results of recent user requests;
- Store the click-stream history of UI events, including button presses, taps, gestures, voice activated triggers, and/or any other user input.
- Store device sensor data (such as location, time, positional orientation, motion, light level, sound level, and the like) which might be correlated with interactions with the assistant.

According to specific embodiments, multiple instances or threads of short term personal memory component(s) 1052 may be concurrently implemented and/or initiated via the use of one or more processors 63 and/or other combinations of hardware and/or hardware and software.

According to different embodiments, one or more different threads or instances of short term personal memory component(s) 1052 may be initiated in response to detection of one or more conditions or events satisfying one or more different types of minimum threshold criteria for triggering initiation of at least one instance of short term personal memory component(s) 1052. For example, short term personal memory component(s) 1052 may be invoked when there is a user session with the embodiment of assistant 1002, on at least one input form or action by the user or response by the system.

In at least one embodiment, a given instance of short term personal memory component(s) 1052 may access and/or utilize information from one or more associated databases. In at least one embodiment, at least a portion of the database information may be accessed via communication with one or more local and/or remote memory devices. For example, short term personal memory component(s) 1052 may access data from long-term personal memory components(s) 1054 (for example, to obtain user identity and personal preferences) and/or data from the local device about time and location, which may be included in short term memory entries.

Long-Term Personal Memory Component(s) 1054

In at least one embodiment, long-term personal memory component(s) 1054 may be operable to perform and/or implement various types of functions, operations, actions, and/or other features.

According to specific embodiments, multiple instances or threads of long-term personal memory component(s) 1054 may be concurrently implemented and/or initiated via the use of one or more processors 63 and/or other combinations of hardware and/or hardware and software. For example, in at least some embodiments, various aspects, features, and/or functionalities of long-term personal memory component(s) 1054 may be performed, implemented and/or initiated using one or more databases and/or files on (or associated with) clients 1304 and/or servers 1340, and/or residing on storage devices.

According to different embodiments, one or more different threads or instances of long-term personal memory component(s) 1054 may be initiated in response to detection of one or more conditions or events satisfying one or more different types of minimum threshold criteria for triggering initiation of at least one instance of long-term personal memory component(s) 1054. Various examples of conditions or events which may trigger initiation and/or implementation of one or more different threads or instances of long-term personal memory component(s) 1054 may include, but are not limited to, one or more of the following (or combinations thereof):

- Long term personal memory entries may be acquired as a side effect of the user interacting with an embodiment of assistant 1002. Any kind of interaction with the assistant may produce additions to the long term personal memory.
- Long term personal memory may also be accumulated as a consequence of users signing up for an account or service, enabling assistant 1002 access to accounts on other services, using an assistant 1002 service on a client device with access to other personal information databases such as calendars, to-do lists, contact lists, and the like.

In at least one embodiment, a given instance of long-term personal memory component(s) 1054 may access and/or utilize information from one or more associated databases. In at least one embodiment, at least a portion of the database information may be accessed via communication with one or more local and/or remote memory devices, which may be located, for example, at client(s) 1304 and/or server(s) 1340. Examples of different types of data which may be accessed by long-term personal memory component(s) 1054 may include, but are not limited to data from other personal information databases provided by external services 1360, and the like.

Automated Call and Response Procedure

Referring now to FIG. 33, there is shown a flow diagram depicting an automatic call and response procedure, according to one embodiment. The procedure of FIG. 33 may be implemented in connection with one or more embodiments of intelligent automated assistant 1002. It may be appreciated that intelligent automated assistant 1002 as depicted in FIG. 7 is merely one example from a wide range of intelligent automated assistant system embodiments which may be implemented. Other embodiments of intelligent automated assistant systems (not shown) may include additional, fewer and/or different components/features than those illustrated, for example, in the example intelligent automated assistant 1002 depicted in FIG. 7.

In at least one embodiment, the automated call and response procedure of FIG. 33 may be operable to perform and/or implement various types of functions, operations, actions, and/or other features such as, for example, one or more of the following (or combinations thereof):

- The automated call and response procedure of FIG. 33 may provide an interface control flow loop of a conversational interface between the user and intelligent automated assistant 1002. At least one iteration of the automated call and response procedure may serve as a ply in the conversation. A conversational interface is an interface in which the user and assistant 1002 communicate by making utterances back and forth in a conversational manner.
- The automated call and response procedure of FIG. 33 may provide the executive control flow for intelligent automated assistant 1002. That is, the procedure controls the gathering of input, processing of input, generation of output, and presentation of output to the user.
- The automated call and response procedure of FIG. 33 may coordinate communications among components of intelligent automated assistant 1002. That is, it may direct where the output of one component feeds into another, and where the overall input from the environment and action on the environment may occur.

In at least some embodiments, portions of the automated call and response procedure may also be implemented at other devices and/or systems of a computer network.

According to specific embodiments, multiple instances or threads of the automated call and response procedure may be concurrently implemented and/or initiated via the use of one or more processors 63 and/or other combinations of hardware and/or hardware and software. In at least one embodiment, one or more or selected portions of the automated call and response procedure may be implemented at one or more client(s) 1304, at one or more server(s) 1340, and/or combinations thereof.

For example, in at least some embodiments, various aspects, features, and/or functionalities of the automated call and response procedure may be performed, implemented and/or initiated by software components, network services, databases, and/or the like, or any combination thereof.

According to different embodiments, one or more different threads or instances of the automated call and response procedure may be initiated in response to detection of one or more conditions or events satisfying one or more different types of criteria (such as, for example, minimum threshold criteria) for triggering initiation of at least one instance of automated call and response procedure. Examples of various types of conditions or events which may trigger initiation and/or implementation of one or more different threads or instances of the automated call and response procedure may include, but are not limited to, one or more of the following (or combinations thereof):

- a user session with an instance of intelligent automated assistant 1002, such as, for example, but not limited to, one or more of:
  - a mobile device application starting up, for instance, a mobile device application that is implementing an embodiment of intelligent automated assistant 1002;
  - a computer application starting up, for instance, an application that is implementing an embodiment of intelligent automated assistant 1002;
  - a dedicated button on a mobile device pressed, such as a "speech input button";
  - a button on a peripheral device attached to a computer or mobile device, such as a headset, telephone handset or base station, a GPS navigation system, consumer appliance, remote control, or any other device with a button that might be associated with invoking assistance;
  - a web session started from a web browser to a website implementing intelligent automated assistant 1002;
  - an interaction started from within an existing web browser session to a website implementing intelligent automated assistant 1002, in which, for example, intelligent automated assistant 1002 service is requested;
  - an email message sent to a modality server 1426 that is mediating communication with an embodiment of intelligent automated assistant 1002;
  - a text message is sent to a modality server 1426 that is mediating communication with an embodiment of intelligent automated assistant 1002;
  - a phone call is made to a modality server 1434 that is mediating communication with an embodiment of intelligent automated assistant 1002;
  - an event such as an alert or notification is sent to an application that is providing an embodiment of intelligent automated assistant 1002.
- when a device that provides intelligent automated assistant 1002 is turned on and/or started.

According to different embodiments, one or more different threads or instances of the automated call and response procedure may be initiated and/or implemented manually, automatically, statically, dynamically, concurrently, and/or combinations thereof. Additionally, different instances and/or embodiments of the automated call and response procedure may be initiated at one or more different time intervals (e.g., during a specific time interval, at regular periodic intervals, at irregular periodic intervals, upon demand, and the like).

In at least one embodiment, a given instance of the automated call and response procedure may utilize and/or generate various different types of data and/or other types of information when performing specific tasks and/or operations. This may include, for example, input data/information and/or output data/information. For example, in at least one embodiment, at least one instance of the automated call and response procedure may access, process, and/or otherwise utilize information from one or more different types of sources, such as, for example, one or more databases. In at least one embodiment, at least a portion of the database information may be accessed via communication with one or more local and/or remote memory devices. Additionally, at least one instance of the automated call and response procedure may generate one or more different types of output data/information, which, for example, may be stored in local memory and/or remote memory devices.

In at least one embodiment, initial configuration of a given instance of the automated call and response procedure may be performed using one or more different types of initialization parameters. In at least one embodiment, at least a portion of the initialization parameters may be accessed via communication with one or more local and/or remote memory devices. In at least one embodiment, at least a portion of the initialization parameters provided to an instance of the automated call and response procedure may correspond to and/or may be derived from the input data/information.

In the particular example of FIG. 33, it is assumed that a single user is accessing an instance of intelligent automated assistant 1002 over a network from a client application with speech input capabilities.

In step 100, the user is prompted to enter a request. The user interface of the client offers several modes of input, as described in connection with FIG. 26. These may include, for example:

- an interface for typed input, which may invoke an active typed-input elicitation procedure as illustrated in FIG. 11;
- an interface for speech input, which may invoke an active speech input elicitation procedure as illustrated in FIG. 22.
- an interface for selecting inputs from a menu, which may invoke active GUI-based input elicitation as illustrated in FIG. 23.

In one embodiment, step 100 may include presenting options remaining from a previous conversation with assistant 1002, for example using the techniques described in the active dialog suggestion input elicitation procedure described in connection with FIG. 24.

An embodiment of language interpreter component 1070 is then called in step 200. Language interpreter component 1070 parses the text input and generates a list of possible interpretations of the user's intent 290.

In step 300, the representation of the user's intent 290 is passed to dialog flow processor 1080, which implements an embodiment of a dialog and flow analysis procedure as described in connection with FIG. 32. Dialog flow processor 1080 determines which interpretation of intent is most likely, maps this interpretation to instances of domain models and parameters of a task model, and determines the next flow step in a dialog flow.

In step 400, an embodiment of the flow and service/actions orchestration procedure 400 is invoked, via services/actions orchestration component 1082. It invokes a set of services 1084 on behalf of the user's request. In one embodiment, these services 1084 contribute some data to a common result. Their data are merged and the resulting list is represented in a uniform, service-independent form.

In step 500, output processor 1092 generates a dialog summary of the results, such as, "I have identified some changes to the hearing prosthesis settings that may be helpful." Output processor 1092 combines this summary with the output result data, and then sends the combination to a module that formats the output for the user's particular mobile device in step 600.

In step 700, this device-specific output package is sent to the mobile device, and the client software on the device renders it on the screen (or other output device) of the mobile device.

The user browses this presentation, and decides to explore different options. If the user is done 790, the method ends. If the user is not done 490, another iteration of the loop is initiated by returning to step 100.

The automatic call and response procedure may be applied, for example to a user's query "why cannot I hear my baby crying?" Such input may be elicited in step 100. In step 200, the input is interpreted as difficulty in hearing speech related noise that is not in the form of words, and combined with the other state (held in short term personal memory 1052) to support the interpretation of the same intent as the last time, with one change in the adjustment parameter(s). In step 300, this updated intent produces a refinement of the request, which is given to service/actions orchestration component(s) 1082 in step 400.

In step 400 the updated request is dispatched to multiple services 1084, resulting in a new set of settings/adjustments/actions which can be taken by the recipient to alleviate a given sound scenario/improve such which are summarized in dialog in 500, formatted for the device in 600, and sent over the network to show new information on the user's mobile device in step 700.

One skilled in the art will recognize that different embodiments of the automated call and response procedure (not shown) may include additional features and/or operations than those illustrated in the specific embodiment of FIG. 33, and/or may omit at least a portion of the features and/or operations of automated call and response procedure illustrated in the specific embodiment of FIG. 33.

Constrained Selection

In one embodiment, intelligent automated assistant 1002 uses constrained selection in its interactions with the user, so as to more effectively identify and present items that are likely to be of interest to the user.

Constrained selection is a kind of generic task. Generic tasks are abstractions that characterize the kinds of domain objects, inputs, outputs, and control flow that are common among a class of tasks. A constrained selection task is performed by selecting items from a choice set of domain objects based on selection constraints (such as a desired hearing outcome). In one embodiment, assistant 1002 helps the user explore the space of possible choices, eliciting the user's constraints and preferences, presenting choices, and offering actions to perform on those choices. The task is complete when the user selects one or more items on which to perform the action.

Constrained selection is useful in many contexts: for example, picking given setting, picking an ultimate desired outcome of an auto clinician change (even if not known—that is, what the recipient wants as the end result however that result is accomplished) or the like. In general, constrained selection is useful when one knows the category and needs to select an instance of the category with some desired properties.

One conventional approach to constrained selection is a directory service. The user picks a category and the system offers a list of choices. In a local directory, one may constrain the directory to a species of a given genus. For instance, in a stop buzzing service, users select a tinnitus remedy (as opposed to an EMI remedy or a prosthesis adjustment (e.g., eliminate a given frequency) from a plurality of remedies for tinnitus, and the device 240 shows one or more possibilities for that category.

Another conventional approach is a database application, which provides a way to generate a choice set by eliciting a query from the user, retrieving matching items, and presenting the items in some way that highlights salient features. The user browses the rows and columns of the result set, possibly sorting the results or changing the query until he or she finds some suitable candidates. The problem with the database service is that it may require the user to operationalize their human need as a formal query and to use the abstract machinery of sort, filter, and browse to explore the resulting data. These are difficult for most people to do, even with graphical user interfaces.

A third conventional approach is open-ended search, such as "local search". Search is easy to do, but there are several problems with search services that make them difficult for people to accomplish the task of constrained selection. Specifically:

- As with directory search, the user may not just enter a category and look at one or more possible choice, but must narrow down the list.
- If the user can narrow the selection by constraints, it is not obvious what constraints may be used (e.g., may I search for adjustments and actions to be taken for lack of speech perception?)
- It is not clear how to state constraints (e.g., is your problem speech perception, and what are the symptoms?)
- Multiple preferences conflict; there is usually no objectively "best" answer to a given situation (e.g., I want to hear like I used to hear before I lost my hearing).
- Preferences are relative, and they depend on what is available. For example, if the user can have the auto clinician remedy a problem in the first instance to a heightened level of performance, he or she might choose it even though it will eliminate other performance features of the prosthesis. In general, though, the user would prefer a more level/even based regime.

In various embodiments, assistant 1002 of the present invention helps streamline the task of constrained selection. In various embodiments, assistant 1002 employs database and search services, as well as other functionality, to reduce the effort, on the part of the user, of stating what he or she is seeking as an outcome to the problem and/or the problem in the first instance, considering what is available as a solution, and deciding on a satisfactory solution.

In various embodiments, assistant 1002 helps to make constrained selection simpler for humans in any of a number of different ways.

For example, in one embodiment, assistant 1002 may operationalize properties into constraints. The user states what he or she wants in terms of properties of the desired outcome. Assistant 1002 operationalizes this input into formal constraints. For example, instead of saying "permit me to hear sounds at 70 dB SPL in a noisy environment" the user may just say "hear soft sounds where it is noisy." Assistant 1002 may also operationalize qualities requested by the user that are not parameters to a database.

In one embodiment, assistant 1002 may suggest useful selection criteria, and the user need only say which criteria are important at the moment. For example, assistant 1002 may ask "which of these matter: speech perception (speech perception is most important), ambient noise (ambient noise is most important)"??" Assistant 1002 may also suggest criteria that may require specific values; for example, "you can say what kind of resulting volume you would like".

In one embodiment, assistant 1002 may help the user make a decision among choices that differ on a number of competing criteria.

By providing such guidance, assistant 1002 may help users in making multiparametric decisions in any of several ways:

- One is to reduce the dimensionality of the space, combining raw data such as ratings from multiple sources into a composite "recommendation" score. The composite score may take into account domain knowledge about the sources of data.
- Another approach is to focus on a subset of criteria, turning a problem of "what are all the possible criteria to consider and how to they combine?" into a selection of the most important criteria in a given situation (e.g., "which is more important"?)
- Another way to simplify the decision making is to assume default values and preference orders (e.g., all things being equal, speech perception is better). The system may also remember users' previous responses that indicate their default values and preferences.
- Fourth, the system may offer salient properties of items in the choice set that were not mentioned in the original request. For example, the user may have asked for improved speech perception. The system may offer a choice set of different settings that can be adjusted in the recipient, and with them, a list of tags indicating which settings previously provided useful results as deemed by the recipient or based on statistical data. This could let people pick out a specific item and complete the task. Research shows that most people make decisions by evaluating specific instances rather than deciding on criteria and rationally accepting the one that pops to the top. It also shows that people learn about features from concrete cases.

Conceptual Data Model

In one embodiment, assistant 1002 offers assistance with the constrained selection task by simplifying the conceptual data model. The conceptual data model is the abstraction presented to users in the interface of assistant 1002. To overcome the psychological problems described above, in one embodiment assistant 1002 provides a model that allows users to describe what they want in terms of a few easily recognized and recalled properties of suitable choices rather than constraint expressions. In this manner, properties can be made easy to compose in natural language requests (e.g., adjectives modifying keyword markers) and be recognizable in prompts ("you may also favor recommended certain settings . . . "). In one embodiment, a data model is used that allows assistant 1002 to determine the domain of interest (e.g., speech perception vs. music perception) and a general approach to guidance that may be instantiated with domain-specific properties.

In one embodiment, the conceptual data model used by assistant 1002 includes a selection class. This is a representation of the space of things from which to choose. For example, in the help me hear application, the selection class is the class of speakers (e.g., close proximity speaking directly to recipient, remote speaker speaking to a group of people including the recipient, etc.). The selection class may be abstract and have subclasses, such as "types of speakers" or types of speaking environments". In one embodiment, the conceptual data model assumes that, in a given problem solving situation, the user is interested in choosing from a single selection class. This assumption simplifies the interaction and also allows assistant 1002 to declare its boundaries of competence ("I know about maximizing speech perception, eliminating background noise, and eliminating EMI" as opposed to "I know about tinnitus remedies").

Given a selection class, in one embodiment the data model presented to the user for the constrained selection task includes, for example: items; item features; selection criteria; and constraints.

Items are Instances of the Selection Class.

Item features are properties, attributes, or computed values that may be presented and/or associated with at least one item. Features may be intrinsic or relational. They may be static or dynamic. They may be composite values computed from other data. Item features are abstractions for the user made by the domain modeler; they do not need to correspond to underlying data from backend services.

Selection criteria are item features that may be used to compare the value or relevance of items. That is, they are ways to say which items are preferred. Selection criteria are modeled as features of the items themselves, whether they are intrinsic properties or computed.

Selection criteria may have an inherent preference order. That is, the values of any particular criterion may be used to line up items in a best first order. For example, the body noise reduction (at least in the case of an implanted microphone) has an inherent preference that less body noise is better. Volume, on the other hand, has no inherent preference value. This restriction allows the system to make default assumptions and guide the selection if the user only mentions the criterion. For example, the user interface might offer to "sort by amount of background noise" and assume that lower amounts of background noise is better.

One or more selection criteria are also item features; they are those features related to choosing among possible items. However, item features are not necessarily related to a preference.

In at least one embodiment, constraints are restrictions on the desired values of the selection criteria. Formally, constraints might be represented as set membership, pattern matches, fuzzy inequalities (e.g., volume of less than loud), qualitative thresholds (e.g., the best volume for listing to rock music), or more complex functions (e.g., a good volume for comfortable listening). To make things simple enough for normal humans, this data model reduces at least one or more constraints to symbolic values that may be matched as words. Some data parameters may be excluded from this reduction. In one embodiment, the operators and threshold values used for implementing constraints are hidden from the user. For example, a constraint on the selection criteria called "ambient noise" may be represented as a symbolic value such as "speech" or "nature". A constraint on rating is "recommended" (a binary choice). For time and distance, in one embodiment assistant 1002 uses proprietary representations that handle a range of inputs and constraint values. For example, volume might be "perceived" instead of "normal perceived" and time might be "tonight"; in one embodiment, assistant 1002 uses special processing to match such input to more precise data.

In at least one embodiment, some constraints may be required constraints. This means that the task simply cannot be completed without this data. For example, it is hard to pick a control setting of the prosthesis without some notion of desired end result, even if one knows other information related thereto.

To summarize, a domain is modeled as selection classes with item features that are important to users. Some of the features are used to select and order items offered to the user—these features are called selection criteria. Constraints are symbolic limits on the selection criteria that narrow the set of items to those that match.

Often, multiple criteria may compete and constraints may match partially. The data model reduces the selection problem from an optimization (finding the best solution) to a matching problem (finding items that do well on a set of specified criteria and match a set of symbolic constraints). The algorithms for selecting criteria and constraints and determining an ordering are described in the next section.

Methodology for Constrained Selection

In one embodiment, assistant 1002 performs constrained selection by taking as input an ordered list of criteria, with implicit or explicit constraints on at least one, and generating a set of candidate items with salient features. Computationally, the selection task may be characterized as a nested search: first, identify a selection class, then identify the important selection criteria, then specify constraints (the boundaries of acceptable solutions), and search through instances in order of best-fit to find acceptable items.

In one embodiment, such a nested search is what assistant 1002 does once it has the relevant input data, rather than the flow for eliciting the data and presenting results. In one embodiment, such control flow is governed via a dialog between assistant 1002 and the user which operates by other procedures, such as dialog and task flow models. Constrained selection offers a framework for building dialog and task flow models at this level of abstraction (that is, suitable for constrained selection tasks regardless of domain).

Figure 29:
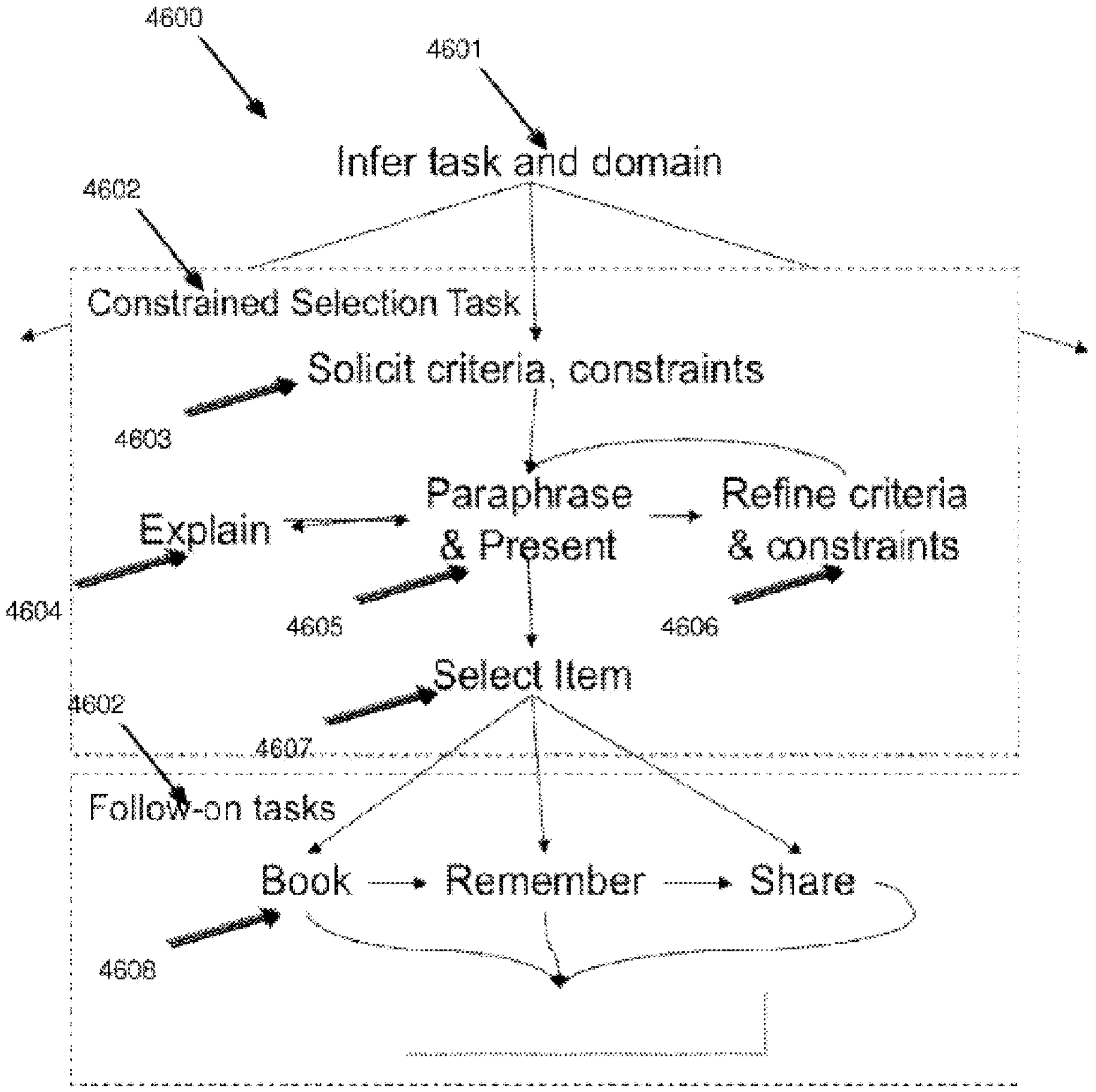
FIG. 29 depicts an example of a dialog flow model to help guide the user through a search process.

Referring now to FIG. 29, there is shown an example of a dialog 4600 to help guide the user through a search process, so that the relevant input data can be obtained.

In the example dialog 4600, the first step is for the user to state the kind of thing they are looking for, which is the selection class. This allows assistant 1002 to infer 4601 the task and domain.

Once assistant 1002 has understood the task and domain binding (selection class=hear better), the next step is to understand which selection criteria are important to this user, for example by soliciting 4603 criteria and/or constraints. Assistant 1002 explains what is needed, receives input. If there is enough information to constrain the choice set to a reasonable size, then assistant 1002 paraphrases the input and presents 4605 one or more solutions that meet the proximity constraint, sorted in some useful order. The user can then select 4607 from this list, or refine 4606 the criteria and constraints. Assistant 1002 reasons about the constraints already stated, and uses domain-specific knowledge to suggest other criteria that might help, soliciting constraints on these criteria as well.

The constrained selection task is complete when the user selects 4607 an instance of the selection class. In one embodiment, additional follow-on tasks 4602 are enabled by assistant 1002. Thus, assistant 1002 can offer services that indicate selection while providing some other value. Examples 4608 present some examples.

Figure 27:
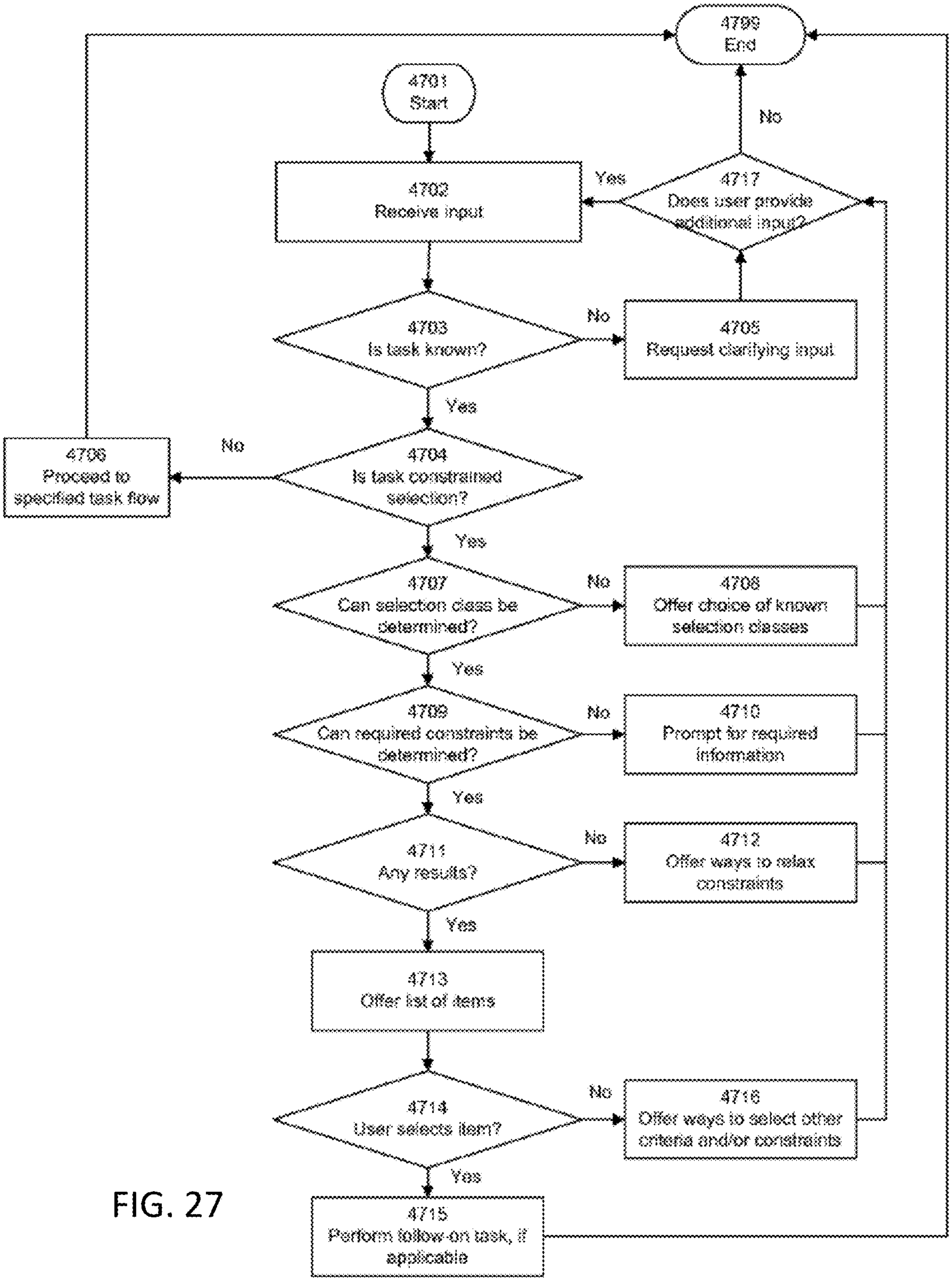
FIG. 27 is a flow diagram depicting a method of constrained selection according to one embodiment.

Referring now to FIG. 27, there is shown a flow diagram depicting a method of constrained selection according to one embodiment. In one embodiment, assistant 1002 operates in an opportunistic and mixed-initiative manner, permitting the user to jump to the inner loop, for instance, by stating task, domain, criteria, and constraints one or more at once in the input.

The method begins 4701. Input is received 4702 from the user, according to any of the modes described herein. If, based on the input, the task not known, assistant 1002 requests 4705 clarifying input from the user.

In step 4717, assistant 1002 determines whether the user provides additional input. If so, assistant 1002 returns to step 4702. Otherwise the method ends 4799.

If, in step 4703, the task is known, assistant 1002 determines 4704 whether the task is constrained selection. If not, assistant 1002 proceeds 4706 to the specified task flow.

If, in step 4704, the task is constrained selection, assistant 1002 determines 4707 whether the selection class can be determined. If not, assistant 1002 offers 4708 a choice of known selection classes, and returns to step 4717.

If, in step 4707, the selection class can be determined, assistant 1002 determines 4709 whether all required constraints can be determined. If not, assistant 1002 prompts 4710 for required information, and returns to step 4717.

If, in step 4709, all required constants can be determined, assistant 1002 determines 4711 whether any result items can be found, given the constraints. If there are no items that meet the constraints, assistant 1002 offers 4712 ways to relax the constraints. For example, assistant 1002 may relax the constraints from lowest to highest precedence, using a filter/sort algorithm. In one embodiment, if there are items that meet some of the constraints, then assistant 1002 may paraphrase the situation. In one embodiment, if there are no items that match any constraints, then assistant 1002 may paraphrase this situation and prompt for different constraints. Assistant 1002 returns to step 4717.

If, in step 4711, result items can be found, assistant 1002 offers 4713 a list of items. In one embodiment, assistant 1002 paraphrases the currently specified criteria and constraints. In one embodiment, assistant 1002 presents a sorted, paginated list of items that meet the known constraints. If an item only shows some of the constraints, such a condition can be shown as part of the item display. In one embodiment, assistant 1002 offers the user ways to select an item, for example by initiating another task on that item such as booking, remembering, scheduling, or sharing. In one embodiment, on any given item, assistant 1002 presents item features that are salient for picking instances of the selection class. In one embodiment, assistant 1002 shows how the item meets a constraint. In one embodiment, assistant 1002 allows the user to drill down for more detail on an item, which results in display of more item features.

Assistant 1002 determines 4714 whether the user has selected an item. If the user selects an item, the task is complete. Any follow-on task is performed 4715, if there is one, and the method ends 4799.

If, in step 4714, the user does not select an item, assistant 1002 offers 4716 the user ways to select other criteria and constraints and returns to step 4717. For example, given the currently specified criteria and constraints, assistant 1002 may offer criteria that are most likely to constrain the choice set to a desired size. If the user selects a constraint value, that constraint value is added to the previously determined constraints when steps 4703 to 4713 are repeated.

Since one or more criteria may have an inherent preference value, selecting the criteria may add information to the request. Such information can be taken into account when steps 4703 to 4713 are repeated.

In one embodiment, assistant 1002 allows the user to raise the importance of a criterion that is already specified, so that it would be higher in the precedence order. Some information can be taken into account when steps 4703 to 4713 are repeated.

In one embodiment, the user can provide additional input at any point while the method of FIG. 27 is being performed. In one embodiment, assistant 1002 checks periodically or continuously for such input, and, in response, loops back to step 4703 to process it.

In one embodiment, when outputting an item or list of items, assistant 1002 indicates, in the presentation of items, the features that were used to select and order them. This may include highlighting matches, as well as listing selection criteria that were involved in the presentation of an item.

In an exemplary embodiment, there is a method that utilizes one or more or all of the techniques detailed above. This method is depicted by way of the exemplary flowchart in FIG. 12, which represents method 12000. Method 12000 is a method comprising implementing a hearing prosthesis automated assistant on one or more computing devices having one or more processors and memory. Method 12000 comprises, at one or more computing devices, method actions 12010, 12020, 12030, and 12040 (and not exclusive of such). Method action 12010 includes, at an input device (e.g., display 242), receiving hearing prosthesis recipient input, the input invoking the automated assistant, the input being indicative of a problem associated with a hearing prosthesis of the recipient. In an exemplary embodiment, the problem is the recipient having difficulty hearing a person speaking directly to the recipient. In an exemplary embodiment, the problem is the recipient is having difficulty hearing a person speaking to a crowd of which the recipient is a part. In an exemplary embodiment, the problem is the recipient having difficulty or otherwise not finding the hearing percept evoked based on music to be as a feeling is that which he or she otherwise believes should be the case. In an exemplary embodiment, the problem is that the recipient is hearing too much background noise. In an exemplary embodiment, the problem is that the recipient is hearing too little background noise. In an exemplary embodiment, the problem is that the recipient perceives a sound or plurality of sounds that he or she perceives or otherwise believes should not be present (e.g., buzzing). In an exemplary embodiment, the problem is that the recipient generally perceives the hearing prosthesis to not be providing sufficient hearing percepts. In an exemplary embodiment, the problem is the recipient having difficulty distinguishing between machine produced sounds (e.g., a lawnmower vs. a motorbike). Any problem that can result from use of a hearing prosthesis can be a problem in at least some exemplary embodiments. It is also noted that the input can be a plurality of problems.

In an exemplary embodiment, the hearing prosthesis recipient input is a single audible statement of the problem that the recipient is having that is related to the hearing prosthesis, the single audible statement automatically invokes the automated assistant, and the derived representation of recipient intent is based on the single audible statement. By way of example only and not by way of limitation, the recipient input is a verbal statement, such as, "hearing device, I cannot hear the woman 4 feet away from me across from the dinner table." In an exemplary embodiment, the phrase "hearing device" is utilized as an indicator to the hearing device that the following statements are directed towards the hearing device (although, in actuality, in at least some instances, the following statements are directed towards the intelligent automated assistant that is based on the portable handheld electronic component, but the statements are about the hearing device). In an exemplary embodiment, there is no preamble. Instead, the automated assistant simply extrapolates from the statements that the recipient is directing the statements towards the assistant. For example, the statement can be "I cannot hear with the current settings." Because people do not typically refer to settings during normal conversation (unless they are explicitly talking about a hearing prosthesis, which is rare) the algorithm of the automated assistant can extrapolate that this is input for the automated assistant.

That said, it is noted that in other embodiments, the input can be inputted into display 242, or a keyboard. Any device, system, and/or method that can enable the input from the recipient to be provided can be utilized in at least some exemplary embodiments.

It is also noted that in an exemplary embodiment, the hearing prosthesis recipient input is bifurcated between a first input that initially invokes the automated assistant and a second input that conveys the problem to the input device. With respect to the example detailed above, in an exemplary embodiment, the phrase hearing device, can be that first input that initially invokes the automated assistant, and the remainder of the phrase is the second input that conveys the problem to the input device. With respect to the utilization of the display 242, in an exemplary embodiment, the first input can be the recipient touching his or her finger over the icon for the application for the automated assistant, and the second input can be the recipient typing in the problem (or speaking the problem, the action of touching the icon activating the automated assistant) or touching an icon representing the problem, etc.

Method 12000 further includes method action 12020, which includes interpreting the received recipient input to derive a representation of recipient intent. Method action 12020 can be executed using any of the devices, systems and/or methods detailed above. Method action 12020 can be executed utilizing a machine learning algorithm. Method action 12020 can be executed utilizing traditional lookup tables.

Method 12000 further includes method action 12030, which includes identifying at least one task based at least in part on the derived representation of user intent. In an exemplary embodiment, this at least one task that is identified can be a task of remedying the recipients problem. By way of example only and not by way limitation, the task can be permitting the recipient to better hear a speaker in front of him or her. The at least one task can be any task resulting from any of the problems detailed herein and variations thereof.

As can be seen, method 12000 also includes method 12040, which includes causing a first output to be provided, the first output providing an attempted solution to the problem. By way of example only and not by way of limitation, in the exemplary embodiment where the problem is the recipient's inability or otherwise difficulty in hearing a person in front of him or her 4 feet away from him or her, the output could be to the recipient to ask the recipient if he or she would like a beamforming feature to be engaged and, optionally, which direction the beamforming should be directed towards (e.g. directly ahead). In an exemplary embodiment, the output could be to ask the recipient to verify that the remote microphone that was provided to the person in front of him or her for the conversation is activated and/or is pointed towards the person's lips. In an exemplary embodiment, the output could be to simply remind the recipient to pay closer attention to the movements of the opposite person's lips. In an exemplary embodiment, the output could be a recommendation that the recipient move closer to the speaker and/or that the recipient change a body orientation relative to the speaker. In an exemplary embodiment the output could be that an adjustment was made to the noise cancellation system automatically by the auto clinician, and optionally, whether or not this is better. Indeed, in an exemplary embodiment, the output could be that an adjustment has been made (the output may or may not include the adjustment), with a query as to whether or not things are better. The output could be extended over temporal period of time. In an exemplary embodiment, the first output could be an adjustment has been made, and, five or ten seconds later, an output can be a query to the recipient asking him or her if things are better.

Figure 13:
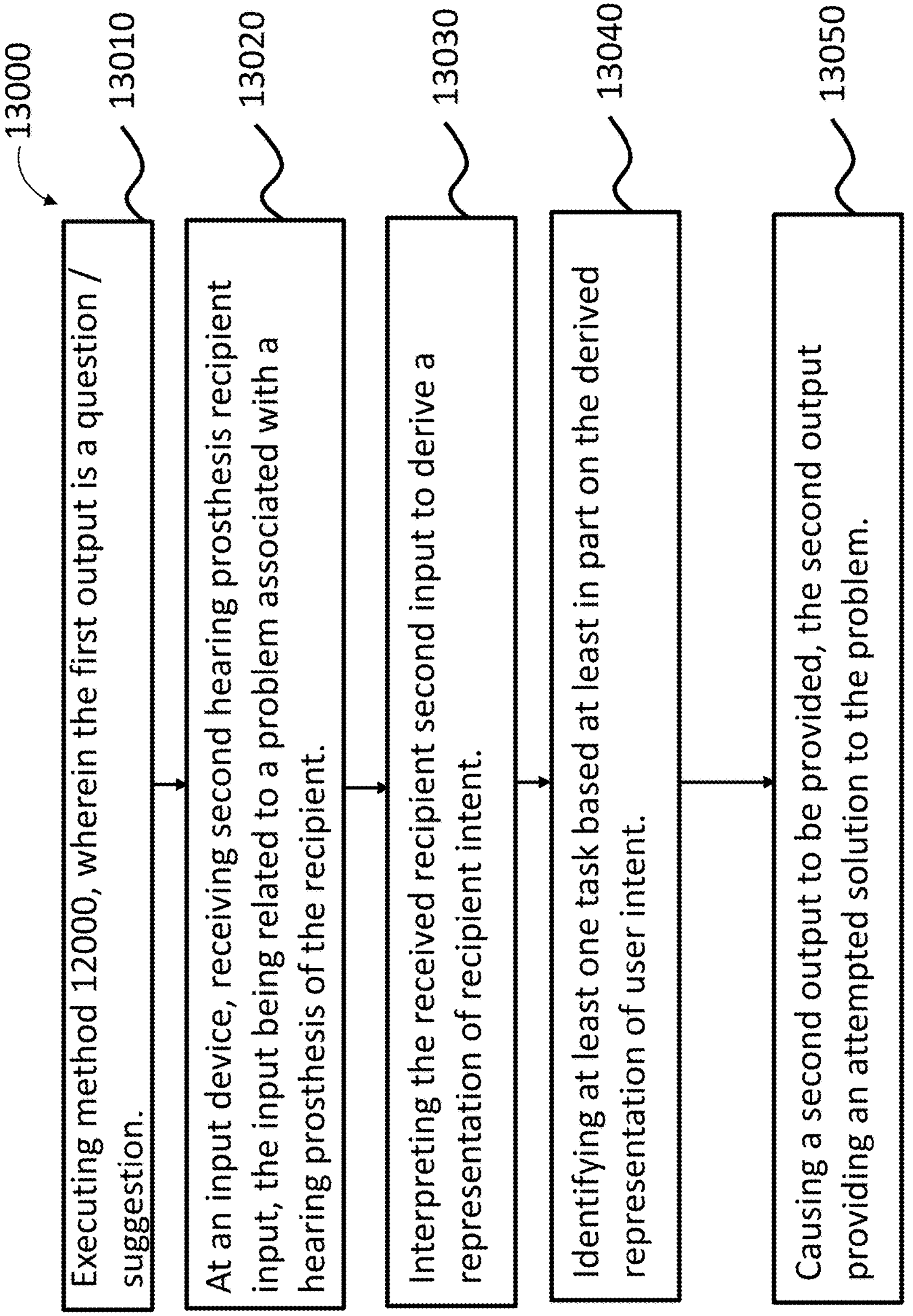

It is also noted that the inputs and outputs can build upon themselves. In this regard, FIG. 13 depicts an exemplary flowchart of an exemplary method, method 13000, which includes method action 13010, which corresponds to executing method 12000 as detailed above for example, where the first output is, for example a question/suggestion. In this regard, the actions associated with method 12000 can be related to the recipient having difficulty hearing a person speaking to is in front of himself or herself. The first output can be in the form of a question/suggestion, such as by way of example only and not by limitation, "is the directional sound capture function activated?" This is a question that is also a suggestion in that if the answer is no, implied as the suggestion that the recipient should activate the sound capture functionality. That said, in at least some exemplary embodiments, the auto clinician will be capable of identifying whether or not the sound capture functionality has been activated, and thus this may not necessarily be a scenario applicable to all such uses of the auto clinician (there would be no need to ask or suggest this if the auto clinician could know that such was not engaged and/or could engage such without the assistance of the recipient). Accordingly, in an alternate embodiment, the question/suggestion could be, by way of example only and not by way of limitation, "are you directly facing the speaker," or "can you see the speaker's lips well"? It is briefly noted that the question/suggestion could be delivered by the hearing prosthesis in a manner that would not result in the person who is speaking to the recipient to know the answer. By way of example only and not by way limitation, the prosthesis could evoke a hearing percept utilizing machine generated language/a signal directly inputted to the hearing prosthesis that bypasses the microphone.

In an event, method 13010 includes method action 13020, which includes, at an input device, receiving a second hearing prosthesis recipient input, the input being related to a problem associated with a hearing prosthesis of the recipient. In an exemplary embodiment, the second input can correspond to an answer to the question/suggestion or otherwise can be related to such. A yes or no answer can be provided to the recipient, again, which could be inputted to the automated assistant utilizing the screen 242 of the device 240, or in some alternate embodiments, could be spoken by the recipient in a manner that would enable the device 240 and/or the microphone of the hearing prosthesis to capture the spoken input, and thus convey this to the auto clinician. With respect to the scenario just detailed above, the recipient could indicate that the sound focusing application is or is not activated, or an indication in the affirmative or the negative that the recipient is directly facing the speaker or can see the speaker's lips well.

Method 13000 further includes method action 13030 which includes interpreting the received recipient second input to derive a representation of recipient intent, and method action 13040, which includes identifying at least one task based at least in part on the derived representation of user intent, and these method actions can be executed in a manner concomitant with method actions 12020 and 12030 detailed above, respectively. Method 13000 further includes method action 13050, which includes causing a second output to be provided, the second output providing an attempted solution to the problem. In an exemplary embodiment, the second output could be to direct the recipient to activate the sound focusing functionality (if such has not been done/if the recipient does not indicate that he or she will activate such), to direct the recipient to directly face the speaker and/or to move to a position or increase the lighting so that the speaker's lips can be seen better (again, if no input has been provided that the recipient has not yet done so). That said, in an alternate embodiment, in a scenario where the recipient indicates that the sound focusing function is activated and/or that the recipient is directly facing the speaker and/or the recipient can see the speaker's lips, the second input might be to execute another action, such as to utilize a remote microphone instead of the microphone on the BTE device, for example, of the hearing prosthesis, and/or to move the remote microphone closer to the speaker's lips, etc.

Figure 14:
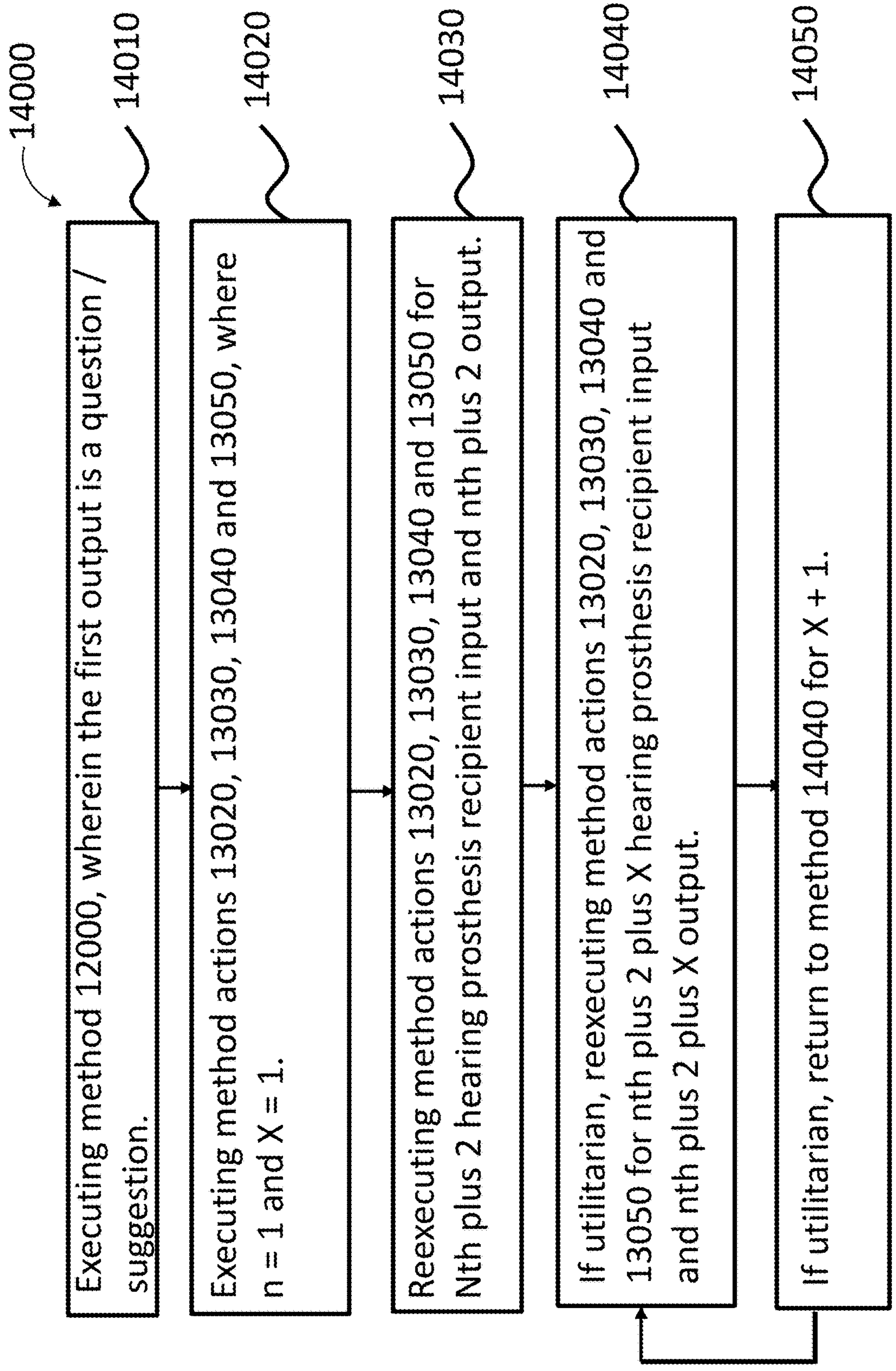

FIG. 14 presents an exemplary flowchart for an exemplary method, method 14000, where method action 14010 corresponds to executing method 12000 and method action 14020 corresponds to executing method actions 13020, 13030, 13040 and 13050. Method 14000 also includes method action 14030, which includes re-executing method actions 13020, 13030, 13040 and 13050 for nth plus 2 hearing prosthesis recipient input and nth plus 2 output (where n initially has a value of 1). Method 14000 further includes method action 14040, which includes, if utilitarian, re-executing method actions 13020, 13030, 13040, and 13050 for nth plus 2 plus X hearing prosthesis recipient input and nth plus 2 plus X output. As can be seen, X is initially 1. Optionally, if utilitarian, method action 14050 is executed, which includes returning to method action 14040 for X+1.

It is to be understood that method 14000 can be executed until X equals 2, 3, 4, 5, 6, 7, 8, 9, 10, 11, 12, 13, 14, 15, 16, 17, 18, 19, 20 or more, or any value or range of values that can have utilitarian value.

Figure 12:
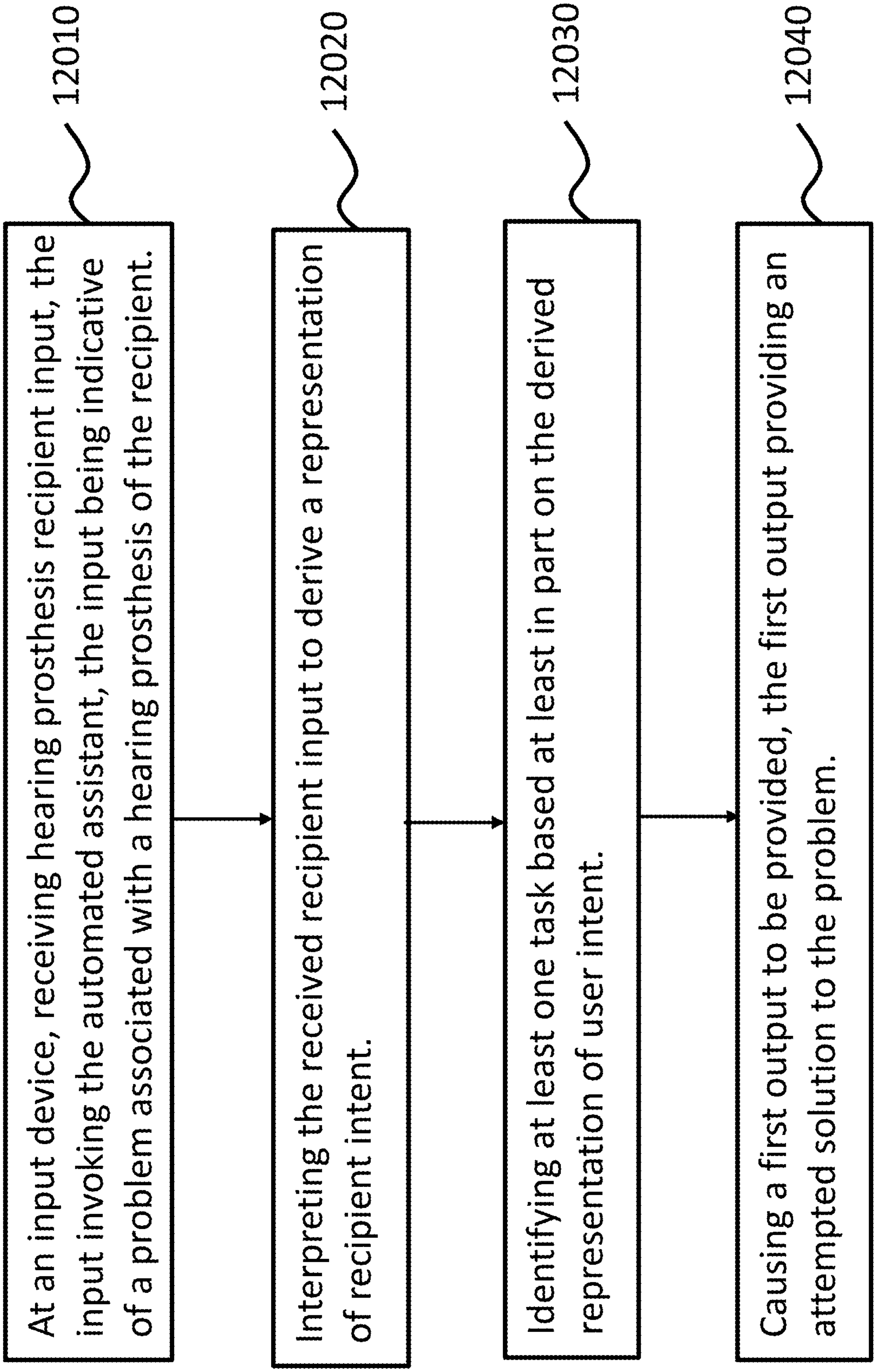
FIGS. 12-14 are exemplary flow charts according to exemplary methods.

In an exemplary embodiment, there is an automated assistant operating on one or more computing devices, such as any of those detailed herein and/or variations thereof, the automated assistant comprising by way of example and not by limitation an input device configured to receive first input (and/or nth plus X input, as detailed by way of example only and not by way limitation with respect to FIGS. 12 and 14), based at least in part on usage of a prosthesis of a recipient.

This input can be obtained by the automated assistant when the automated assistant is monitoring the operation of the hearing prosthesis and or monitoring an environment in which the recipient is utilizing the hearing prosthesis. In an exemplary embodiment of the former, this can correspond to input indicating that the recipient is frequently changing the volume and/or adjustments of the hearing prosthesis in a manner that indicates the recipient is not satisfied with the current performance of the hearing prosthesis. In an exemplary embodiment of the latter, this can correspond to input indicating that the recipient has, for example, repeatedly asked a speaker to speak louder otherwise indicated that he or she cannot hear the speaker. Still further, in an exemplary embodiment, the first input based at least in part on usage of a prosthesis of a recipient could be input by the recipient into the automated assistant indicating that he or she cannot hear the person speaking who is directly in front of him or her (which is based at least in part on usage of a prostheses when the recipient is utilizing a prostheses to help him or her hear the person in front of him or her). It is noted that while the example above has been directed towards a hearing prosthesis, it is noted that in at least some exemplary embodiments, the prosthesis is a different type of prosthesis, such as by way of example only and not by way limitation, a retinal implant, a sensory enhancing implant, a speech production implant, an artificial hand, foot or limb implant, a control implant (e.g., pacemaker, insulin pump, etc.). Any prosthesis that can be utilized with respect to the teachings detailed herein is a prosthesis where the teachings detailed herein are utilized in conjunction therewith.

In an exemplary embodiment, the automated assistant operating on one or more computing devices further comprises a dialog flow processor component, for identifying at least one prosthesis related task based least in part on the received first input. By way of example only, the dialog flow processor can correspond to any of the applicable teachings detailed herein and/or variations thereof, as well as other dialogue flow processor's that would be known in the art or otherwise later developed. Some exemplary embodiments of the prosthesis related tasks are described in greater detail below. Still further, in an exemplary embodiment, the automated assistant can further include an action orchestration component, for identifying at least one action for responding to the identified task. This can correspond to any of the applicable teachings detailed herein and/or variations thereof, as well as other action orchestration components that would be known in the art or otherwise later developed. The automated assistant also can include an output processor component configured to cause a first output to be provided based on the identified at least one action. The first output can correspond to any of those detailed above with respect to FIG. 12, FIG. 13 and/or FIG. 14 (and can include nth plus X output).

In an exemplary embodiment, the automated assistant includes a prosthesis interface configured to communicate with the prosthesis of the recipient. In an exemplary embodiment, this can be a wireless link, a wired link, etc. Any device, system, or method that can enable the components to communicate can be utilized in some embodiments. In an exemplary embodiment of this embodiment, the first input (or nth plus X input) is received directly from the prosthesis and the first input (or nth plus X input) is indicative of a change of a setting of the prosthesis. By way of example only and not by way of limitation, the first input can be indicative that the recipient has changed a setting of the hearing prosthesis, which change in settings could affect the performance of the hearing prosthesis in other areas, in the recipient may not necessarily be aware that such changes can result from the change in the setting. In an exemplary embodiment, setting of the hearing prosthesis in a given manner, such as a changed balance setting, could affect the performance of the hearing prostheses in an unexpected manner. Accordingly, in an exemplary embodiment, the prosthesis related task is an evaluation of the change of the setting, and the identified at least one action is a warning to the recipient indicating a consequence of the change of the setting. This warning could be provided to the recipient via the hearing prosthesis in the form of an evoked hearing percept that only the recipient can hear, can be provided via the portable handheld device 240 (verbally and/or visually), or any other manner that can enable such to be executed. In an exemplary embodiment, an electronic communication, such as email, text message, etc. can be sent to the recipient. In an exemplary embodiment, the first output is output to the recipient indicating the consequence of the change of the setting.

In an exemplary embodiment, the automated assistant further comprises a prosthesis interface configured to communicate with the prosthesis of the recipient, as detailed above and the first input (or nth plus X input) is received directly from a recipient of the prosthesis and the first input (or nth plus X input) is indicative of a problem that the recipient is having related to his or her use of the prosthesis. In an exemplary embodiment, this problem can correspond to any of the problems detailed herein and/or variations thereof, or any other problem that the recipient might have with the hearing prostheses or any other type of prosthesis (e.g., with respect to an artificial hand, that the hand is not gripping things as tightly or strongly as the recipient desires etc.). In an exemplary embodiment of this exemplary embodiment, the prosthesis related task is an evaluation of the problem. In an exemplary embodiment, the prosthesis related task can correspond to evaluating possible reasons as to recipient cannot hear the person in front of him or her, or possible reasons why the artificial hand is not gripping the component, etc. Still further, in an exemplary embodiment, the identified at least one action is a change that can be made to the prosthesis that might improve the problem. Here, in an exemplary embodiment, this can correspond to a change in the output volume, a change or otherwise an engagement of the beamforming system, etc. In an exemplary embodiment, the first output (or nth plus X output) is output to at least one of the recipient or the prosthesis that contains instructions on adjusting the prosthesis to alleviate the problem. In an exemplary embodiment, this can correspond to directing the prosthesis to make an adjustment to the hearing prosthesis (e.g. increase the volume, engage beamforming, etc.). In an exemplary embodiment, this can correspond to controlling the prosthesis such that the adjustment is executed by the auto clinician (e.g., the auto clinician can automatically adjust the hearing prostheses volume or automatically engage the beamforming algorithm, etc.).

In an exemplary embodiment, there is an automated assistant as detailed above, wherein, the first input (or nth plus X input) is indicative of a problem that the recipient is having related to his or her use of the prosthesis (which can be any of the problems detailed herein and/or variations thereof, as well as other problems). In an exemplary embodiment, the prosthesis related task is an evaluation of the problem. Still further, the automated assistant can further comprise an input orchestration component, for calling at least one second input in addition to the first input, the at least one second input having utility for performing the identified task. In an exemplary embodiment, the input orchestration component can be a processor or the like and/or can correspond to a lookup table utilizing if-then-else technology, etc.

In this exemplary embodiment, the action orchestration component is configured to evaluate the at least one second input and identify an action that is a change that can be made to the prosthesis that might improve the problem, and the first output is output to at least one of the recipient or the prosthesis that contains instructions on adjusting the prosthesis to alleviate the problem. In an exemplary embodiment with respect to the second input, the second input can be input that is based on statistical data that indicates that certain settings of the prosthesis have utilitarian value with respect to the given scenario of use or the problem. In an exemplary embodiment with respect to the second input, the second input can be input indicative of data associated with a recipient audiogram or the like. The second input can be input indicative of the sound environment in which the recipient is immersed when the recipient identifies that he or she has a given problem.

In an exemplary embodiment of the automated assistant, the input orchestration component is configured to select a particular kind of second input depending on the first input. By way of example, if the first input is indicative of a recipient hearing a buzzing or the like in his or her ear, the input orchestration component can utilize a lookup table and an if-then-else algorithm to select the second input as input indicative of the recipient having or not having tinnitus or second input as input indicative of the recipient being in a location of high EMI, etc. Still further by way of example, if the first input is indicative of the recipient not being able to hear a person in front of him or her speaking, the input orchestration component can select the second input as input indicative of the environment in which the recipient is located and/or input indicative of the current settings the hearing prostheses.

It is also noted that embodiments can include a non-transitory computer-readable medium for implementing an automated assistant on one or more computing devices, the computer-readable medium having instructions stored thereon, the instructions, when executed by one or more processors, cause the processors to perform operations comprising one or more of the method actions herein. In an exemplary embodiment, the instructions, when executed by one or more processors, cause the processes to perform operations comprising, at an input device, receiving input from a prosthesis recipient and/or the prosthesis (the input can be the nth plus X input). The processors can be further caused to perform the action of invoking the automated assistant. Thus, in an exemplary embodiment, the input received from the prosthesis recipient could correspond to the recipient touching the icon for the automated assistant, which invokes the automated assistant. Still further, in an exemplary embodiment, the input received from the prosthesis could be the fact that the prosthesis has been activated, which automatically invokes the automated assistant. Still further, the input need not necessarily be input that invokes the automated assistant. In this regard, the automated assistant can be invoked prior to the action of receiving the input.

The processor can further be caused to perform the action of identifying at least one of a plurality of core competencies of the automated assistant. In an exemplary embodiment, one of the pluralities of core competencies of the automated assistant can be ensuring that the recipient is warned of any changes made to the settings of the prosthesis that could have a deleterious impact on the performance thereof. In an exemplary embodiment, one of the pluralities of core competencies of the automated assistant can be maximizing speech perception. Some additional core competencies will be described in greater detail below.

The processor can further be caused to perform the action of interpreting the received recipient input, if present, to derive a representation of a recipient problem and analyzing data to develop a solution to the recipient problem. Again, the problems can be any of the problems detailed herein and/or the solutions can be any of the solutions detailed herein and variations thereof. The processor can further be caused to perform the action interpreting the received prosthesis input, if present, to identify a possible problem associated with operating the prosthesis in a manner indicated by the input.

The processor can further be caused to perform the action of causing a first output (or nth plus X output) to be provided via an output interface of the automated assistant, the first output providing the solution to the recipient problem and/or warning of the possible problem. This solution to the recipient problem can be a solution that is directly provided to the hearing prostheses to adjust the operation of the hearing prostheses. The solution to the recipient problem can be a solution that is directly provided to the recipient of the hearing prosthesis providing instructions to the hearing prosthesis on what he or she can do to alleviate the problem.

In an exemplary embodiment, the computer readable medium is such that the instructions stored thereon cause the processors to perform the additional operation(s) of initiating an action of automated obtaining of additional input beyond the received recipient input, wherein the additional input is included in the data analyzed to develop the solution to the recipient problem. Again, in an exemplary embodiment, this additional input can correspond to the nth plus X input detailed above. In an exemplary embodiment, the additional input is input indicative of the recipient's current sound environment or location. In an exemplary embodiment, the additional input is input indicative of the recipient's audiogram. In an exemplary embodiment, the additional input is input indicative of whether or not a speaker speaking to the recipient is a man or woman, whether or not the speaker speaking to the recipient is located near the recipient or far away from the recipient, etc. Thus, in an exemplary embodiment, the additional input includes ambient environment data of the recipient, the data automatically captured by the prosthesis, and in an exemplary embodiment, the additional input includes clinical data associated with the recipient's prosthesis related condition.

In an exemplary embodiment, the computer readable medium is such that the instructions stored thereon cause the processors to perform the additional operation(s) of, after deriving the representation of the recipient problem, identifying one or more data parameters that are relevant to the recipient problem. By way of example only and not by way of limitation, in an exemplary one or more data parameter could be the current volume setting of the prosthesis, the current age of the recipient, whether or not the recipient had the ability to hear prior to the utilization of the hearing prostheses, etc. Still further, in an exemplary embodiment, the action of analyzing data to develop a solution to the recipient problem is a diagnostic function. Additional details of this will be provided below. However, it is noted that at least some exemplary embodiments according to the teachings detailed herein provide a flexible hearing device diagnostic and/or counseling system that provides for the presentation of different types of inputs and combinations of such inputs into an intelligent personal assistant, and delivers utilitarian results. By way of example only and not by way of limitation, in some exemplary scenarios, the auto clinician not only receives input from the recipient, because further by selecting particular kinds of inputs depending on the recipient's initial query. By way of example only and not by way of limitation, the recipient could input that they are having hearing difficulty hearing a person who is speaking close by. In some exemplary embodiments, the auto clinician can then elect to measure certain ambient sound characteristics, and retrieve relevant clinical data which in this example can be the recipient's speech intelligibility curve. Such capabilities can provide a unique kind of diagnostic function. To be clear, in some exemplary embodiments, the recipient of a prostheses does not always know what kind of data parameters are relevant to the particular momentary problem (e.g. hearing problem). The auto clinician can, in some embodiments, make parameter selections for analysis/request or otherwise obtain additional input based on the analysis or otherwise based on the user's query.

To be clear, in some exemplary embodiments, the auto clinician seeks out additional inputs and/or obtains the input based on the initial recipient query and/or recipients input indicative of a problem. In some exemplary scenarios, the input is obtained automatically by the auto clinician without additional recipient input. Indeed, while the initial query or otherwise identification of a problem from the recipient has been treated is input, this is input indicative of the problem, and not input that is utilized or otherwise useful in solving the problem. Still further, while additional queries by the auto clinician to the recipient may have utility with respect to further identifying what exactly the recipient wants (i.e., the exact nature of the problem), the additional queries (or other non-recipient focused queries) can also have utilitarian value with respect to diagnosing what exactly is causing the problem in the first instance. This is different than mere refinement rather wise mere problem narrowing. That is, while in some instances, the auto clinician will seek additional input to further specify rather wise identify the nature of a given problem, in other instances, the auto clinician will seek additional input as a matter to diagnose what is causing the problem in the first instance. Indeed, in some exemplary scenarios, the recipient does not know what exactly is causing the problem, only that a problem exists, and likely does not understand how to remedy the problem. Thus, the recipient does not necessarily know what exactly he or she wants per se.

Note also that the additional input that is automatically sought by the auto clinician can be different kinds of input. For example, in the aforementioned example, medical records could be obtained by the auto clinician as well as a current hearing prosthesis setting input.

Cochlear implant users and, in some instances, other types of hearing prosthesis users rely on audiologists and clinicians to fit their device. The fitting procedure covers from the electrical mapping to technology enabling for the different user programs. Although clinicians aim to provide the user with the best hearing outcomes, it may not be possible in all situations. In some situations it may be beneficial for the user's hearing experience if they had a clinician on hand to help with optimizing their hearing solution in real time. Indeed, in embodiments where the auto clinician is monitoring the usage of the prosthesis and/or the environment in which the recipient is located, optimization can occur simultaneously with the identification of a problem by the auto clinician. By way of example only and not by way of limitation, the optimizing occurs within 1, 2, 3, 4, 5, 6, 7, 8, 9, 10, 15, 20, 25, 30, 35, 40, 45, 50, 55, or 60 seconds or any value or range of values therebetween in 1 second increments. Embodiments herein, such as the auto clinician detailed herein, can provide such. In some embodiments, the teachings detailed herein provide a recipient a clinician on hand that can optimize their hearing solution in real time when a request is made. When the recipient finds themselves in a hard of hearing situation of which they wish their implant was performing better than it is, at these times they can make a request via the auto clinician. The auto clinician then aims to improve their hearing performance.

In view of the above, in an exemplary embodiment, it is thus noted that the input into the auto clinician/automated assistant/intelligent assistant can be fitting based data and/or fitting related data.

Figure 15:
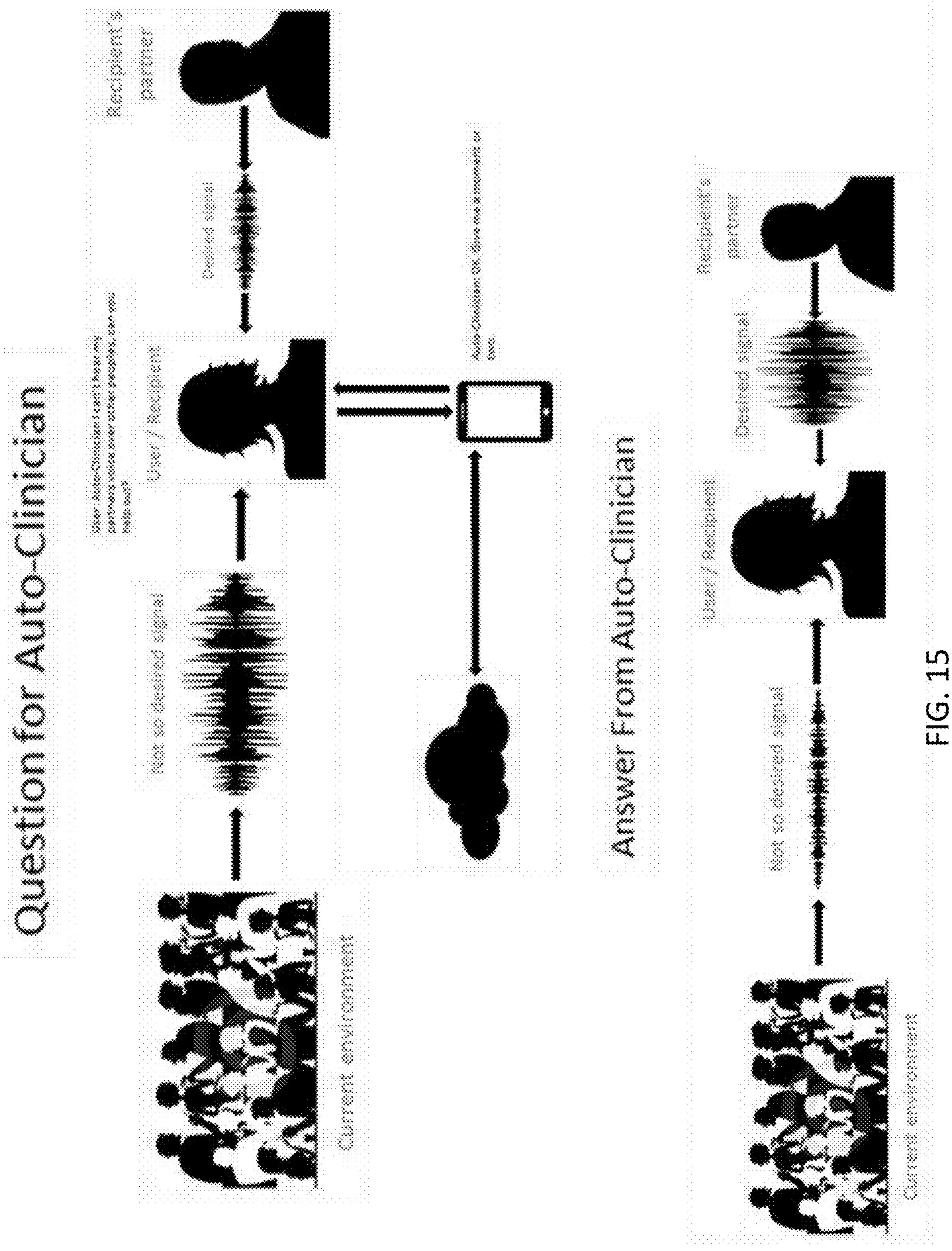
FIGS. 15-17 are exemplary conceptual schematics further providing teachings having utility herein.

FIG. 15 presents a visual conceptual schematic of a scenario utilizing the auto clinician, where the recipient's partner is speaking to the recipient and the recipient is having difficulty hearing the recipient's partner, but after the auto clinician is implemented, the recipient can hear her partner much better than that which was previously the case. As can be seen from FIG. 15, the exemplary scenario is one where a recipient trying to listen to their partner but the noise at their location is loud due to the other discussions taking place. Their partner's voice signal is small when compared to the noise so the difficulty listening is increased. With a request to the auto clinician, the auto clinician analyzes the signals and then provides a solution. In this case, the auto clinician attenuated the noise and boosted the partner's signal. This solution provided an increased benefit because it allowed the auto clinician to understand the environment, what the user wanted and then provide a solution via modifying parameters of an algorithm such as the maximum amount of attenuation that can be applied to the noise of a signal.

In another exemplary scenario, as noted above, the recipient has a high frequency buzzing in their ear and needs a solution to remove that buzzing. In an exemplary scenario, the recipient asks: "Auto clinician, I have a high frequency buzzing in my ear, please help me." The auto clinician can respond, in an exemplary scenario: I'll have a look for you", the auto-clinician will analyze potential problem areas like the audio signal line for a high frequency buzz, or if it is tinnitus of which then a solution can be employed such as removing the problem frequency from the audio line or applying a masker for the tinnitus. The Auto-clinician can then ask if the solution it provided has answered their question.

In some embodiments, a user profile is developed that has a library of scenarios that the auto clinician has previously addressed, thus preventing the need to repeat previous analysis, etc. These can also be pooled as solutions that might be used in situations for different users. Accordingly, in an exemplary embodiment, once a given scenario occurs, the auto clinician stores the data whether that be in the portable device, remote device, utilizing the cloud, etc. Still further, this data that is stored can be utilized for other users. Accordingly, in an exemplary embodiment, user A is similarly situated to user B, and the auto clinician utilizes the solutions that have previously been developed for user A when user B has a problem and user B experiences the same scenario as user A previously experienced, and, at least in some embodiments, the analysis/trial and error routine that was developed for user A was not necessary to be executed when developing the solution for user B.

As briefly noted above, in some embodiments, the auto clinician can be utilized to fit, at least partially, a cochlear implant or another type of implant. In some exemplary scenarios, some types of cochlear implants limit the amount of fitting procedures needed to be performed by the clinician. In an exemplary embodiment, a cochlear implant requires X number of fitting procedures. However, only Y number of fitting procedures can be executed by a clinician. The remaining tasks/procedures, at least some of them, can be performed with the auto clinician. In an exemplary embodiment, the difference between X and Y is 1, 2, 3, 4, 5, 6, 7, 8, 9, 10, 11, 12, 13, 14, or 15, or more.

As noted above, in an exemplary scenario of use, the recipient may try to set or change some settings and is unaware that this may affect their hearing performance. The auto clinician could kick-in and remind the recipient of the issue or otherwise notify the recipient of the issue.

Some exemplary embodiments of auto clinician decision-making algorithms will be described. In an exemplary embodiment, the auto clinician finds answers to the user's questions. Answers can be found, in some embodiments, by two methods, one of which is the common user group reference, and the other is the calculation method. The methods can be employed together as a training mechanism for the common user group database.

In the calculation method, when a request to the auto clinician is made, such as by way of example only and not by way of limitation, with respect to the exemplary scenario of FIG. 15 where the recipient cannot hear or otherwise is having difficulty hearing his or her partner, particular parts of the signal path are analyzed and used to determine an approach that will meet the outcomes of the recipient's request. In an example, if the noise from the ambient environment is 10 dB higher than that of the target speech signal (the speech of the recipient's partner), then the speech will be hard to understand and intelligibility will be low, at least in some embodiments. The auto clinician can analyze the sound and compare against the user's stored intelligibility curve. After this analysis, the auto clinician could decide that an extra 14 dB of attenuation is required to enable the recipient to increase the intelligibility to what could be a satisfactory level. Thus, after analysis, the Auto-Clinician has provided a solution that benefits the recipient's speech intelligibility. This solution might be outside of the fitted parameter range that the user's processor is usually governed by, for instance, the maximum attenuation of the system might be by 6 dB whereas the auto clinician has modified it to 14 dB to cope with this particular scenario.

With respect to common user group methods, in some exemplary scenarios, a user/recipient is assigned to a particular common user group, the association that a particular question will have a common answer is likely. In this manner, a solution to the user's request can be found without the need for an in depth calculation. In an exemplary embodiment, the solution can be found 10%, 20%, 30%, 40%, 50%, 60%, 70%, 80%, 90%, 100%, 125%, 150%, 175%, 200%, 250%, 300%, 350%, 400%, 450%, 500%, 600%, 700%, 800%, 900%, 1000% faster or more or any value or range of values therebetween in 1% increments, relative to that which would be the case without the common user group implementation. That said, although the calculation method might not be needed in full or in part, it still can be performed to provide a comparison reference to the common user group answer to provide input to retrain the auto clinician so as to increase the likelihood that it is responding with a correct solution. Probabilities can be generated that a solution is adequate for particular common user groups. FIG. 16 presents an exemplary flowchart detailing the retraining process at a high level. Machine learning algorithms can be utilized, such as a genetic algorithm, or any time of algorithm for machine learning that can enable such.

Figure 17:
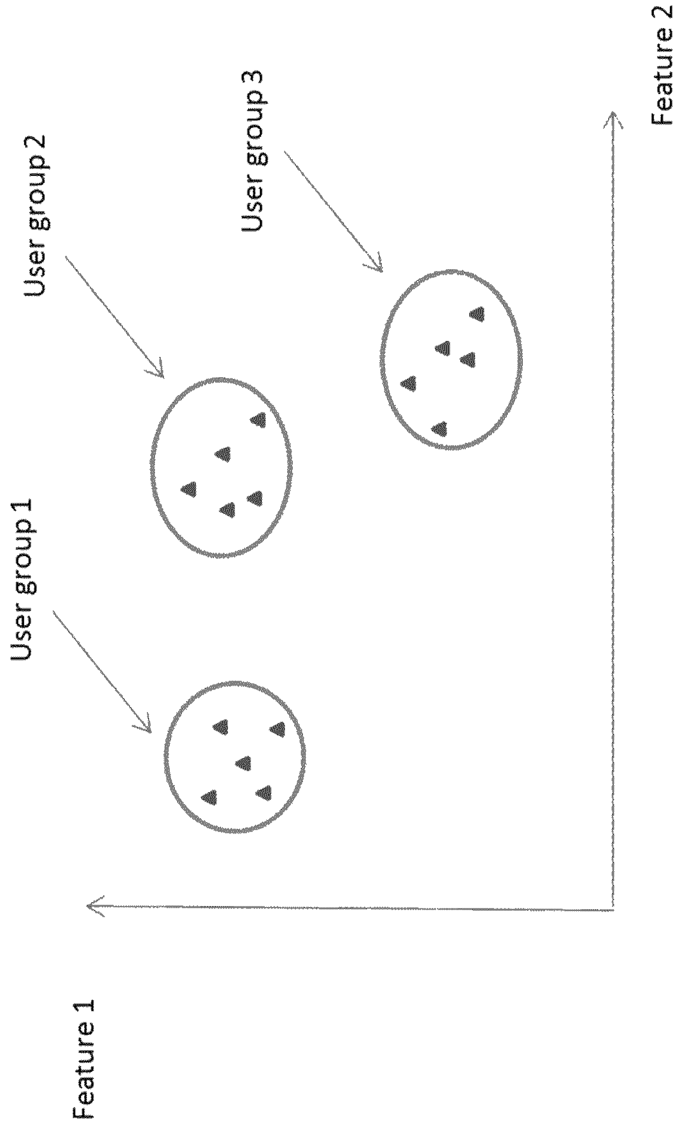

FIG. 17 presents an exemplary schematic representing how the auto clinician can be trained in some embodiments. In this regard, in some embodiments, solutions common to particular user groups can be stored in the cloud so that over time, the auto clinician learns skills and solutions to questions or requests that are made by a recipient. For example, using non-audio features, the user groups can be categorized whereby user group 1 (see FIG. 17) will have the same auto clinician response. For example user groups 1, 2, and 3 might have different attenuations applied to the exact same noise. Depending on which group in which the recipient is, that attenuation for that group can be applied. The question itself can be used as an input feature where the question or questions which draw the same meaning and can be given a label or number. When a user asks the question in a live system, the auto clinician can identify the question and users features to automatically apply a solution instead of calculating the solution. Alongside the applied solution, the calculated solution can be compared against it to check the error in the group response and apply the necessary training to the auto clinician.

As can be seen from the above, in an exemplary embodiment the auto clinician is a system that is able to call on a variety of inputs to perform diagnosis, and apply and applicable solution and/or even alter the function of an associated device, such as a prosthesis in general, and a hearing prosthesis in particular, to improve the a situation where the recipient is having difficulty utilizing his or her prostheses (e.g., such as in a hard of hearing situation). It is noted that at least some exemplary embodiments differentiate from general automated assistant devices, beyond the utilization of such with a prosthesis, such as a hearing prosthesis, in that the automated assistant is able to perform diagnosis/diagnostics, and/or make functional changes to the operation of the particular device (the prosthesis).

By way of example only and not by way of limitation, with regards to the scenario where one of the inputs into the automated assistant is input indicative of the fact that the recipient perceives a buzz in his or her ear, the auto clinician analyzes the request, which triggers relevant devices to capture data for analysis, one at a time, or at the same time. By way of example only and not by way of limitation, the data that could be captured could be the devices that are being utilized with the prosthesis. For example, whether or not the implanted microphone (if present) is activated, whether or not the external microphone, which can be positioned on the BT device, is activated, whether or not the recipient is in an environment where the possibility of EMI could be present, etc.

In an exemplary embodiment, the following inputs could be present for the scenario where the recipient hears a buzzing in his or her ear. By way of example only and not by way limitation, the NRT can be measured (if something is happening to the nerve response, for example). The various microphones can be utilized, such as the remote microphone or the external microphone or the implanted microphone, to capture a brief duration of the audio signal. This captured audio signal can be utilized for diagnostic purposes. By utilizing the different microphones, the input from the microphones can be compared to one another in an attempt to identify the source of the buzzing. In an exemplary scenario, the scan can be one where the auto clinician can potentially have the ability to load or otherwise obtain access to the past X seconds of sound capture/of audio signal, and then analyze that material to determine whether or not there is a signal within the signal that can correspond to the buzzing or otherwise will result in a buzzing when processed by the sound processor.

Any input that can be evaluated to perform diagnostic capabilities can be utilized in at least some exemplary embodiments.

Still further in the exemplary scenario where the auto clinician is utilized as a diagnostic tool, once the source of the buzz is found, the frequency of that buzz can be recorded in a user's log, either in the prosthesis, in the remote assistant (whether that be the handheld device or a computer or other data acquisition unit remote from the recipient), in the cloud, etc. From there, in the case of a cochlear implant, for example, the system can perform a background analysis of those particular electrodes of the cochlear implant to determine the potential source of that frequency.

Thus, by analyzing the collected data, and comparing the data and searching for the best solution in a database given the particular recipient hearing situation, a potential solution can be found. For example, again continuing with the scenario where there is a buzzing sound, based on the inputs, the system can attempt to determine if the buzz is actually coming from the external environment (e.g., a buzz sound is going on in the real environment) or is generated internally (e.g., something is happening to the electrode of the nerve response or as a result of the processing that results in a buzz etc.). With respect to the latter, in an exemplary embodiment, the function of the device can be altered, such as by way of example only and not by way of limitation, map parameters can be adjusted, to optimize or otherwise improve the hearing scenario. By way of example only and not by way of limitation, if the buzzing corresponds to a frequency associated with a given electrode, the particular electrode could be deactivated, and the sound input provided to other electrodes. While this may not correspond to the most perfect frequency association with the captured sound, this will alleviate the buzzing, and will at least in some instances, permit and enhance the hearing experience even though the frequencies are not exactly aligned or otherwise not as aligned as they otherwise would be.

In an exemplary embodiment, the database that contains data associated with the recipient is updated so that this updated data can be used at a later date and/or this data can be utilized for other similarly situated recipients.

From the above, it is clear that in an exemplary embodiment, and performing the analysis, the auto clinician can sample and analyze a given signal at the input, the output, and/or at one or more points during the signal processing flow between the input and the output. This can permit or otherwise enable a determination that a noise source is external to the system and thus input into the microphones. The result of this diagnostic evaluation is that the prosthesis is working as it should. A solution in this exemplary scenario could be the application of a filter regime to attenuate the input signal component that is causing the buzzing. Conversely, a result of the diagnostic evaluation could be that noise is originating due to internal device noise, and the auto clinician can take appropriate action. By way of example, an internal signal line/algorithm/component at the buzz frequency can be coupling into the signal path, resulting in the noise. The auto clinician can identify such, and remove this internal signal or otherwise adjust the internal signal to avoid the noise or otherwise reduce the noise. In an exemplary scenario, the result of the diagnostics can be that the buzzing can be an artifact of a particular signal processing scheme that is manifested at the output, and a solution can be the modification and/or adjustment to the signal to prevent the noise from reoccurring.

Still further, in an exemplary embodiment, with respect to the analysis of the buzzing, or more accurately, with respect to an analysis of the various inputs available to perform a diagnostic evaluation in a scenario where there is buzzing, the surrounding audio environment can be sampled, such as by way of example only and not by way limitation, by utilizing the microphone of the smart phone, or a test mode utilizing the microphone that is provided with the BTE device or the like as opposed to another microphone. In an exemplary scenario, the results of the diagnostic evaluation can be that the buzzing is resulting from environmental noise. In an exemplary scenario, the results of the diagnostic evaluation can further potentially reveal specific features of the source of the noise, such as by way of example only and not by way limitation, that the source is coming from a specific direction. In such an exemplary scenario, an exemplary solution could be to have the auto clinician provide an output that changes a beamforming algorithm such that it attenuates the specific direction. In an exemplary embodiment, the exemplary solution could be to provide an output to the recipient to tell a recipient to adjust the beamforming system. Alternatively, and/or in addition to this, the auto clinician can identify a filter the like that can be applied to the input signal to attenuate a specific portion of the input signal. This can be done automatically by the auto clinician, the auto clinician can provide output to the recipient an instructor otherwise propose the possibility that the recipient can adjust the filtering regime.

Still further, in an exemplary embodiment, the auto clinician can automatically perform diagnostic measurements of the internal and/or external components of the hearing prosthesis, such as that of the sound processor. In an exemplary embodiment, the auto clinician can perform or cause to be performed various integrity checks on the sound processor components, such as by way of example only and not by way of limitation, integrity checks on the microphones, the radiofrequency coil, etc. The result of the diagnostic can be a determination that the noise or other scenario is a result of a device and/or component malfunction. If such is the case, such can be conveyed to the recipient or conveyed to a third-party, such as the manufacturer of the hearing prosthesis, where, with respect to the latter, the manufacturer of the hearing prosthesis can provide the recipient with a replacement component. With respect to the former, a suggestion could be made to the recipient for a workaround on this malfunction. By way of example only and not by way limitation, if the microphone of the BTE device is malfunctioning, a suggestion could be to deactivate the microphone, and enable the remote microphone and/or the implanted microphone for temporary use albeit in all instances until the microphone of the BTE device can be replaced.

In an exemplary embodiment, the diagnostic features of the auto clinician can correspond to performing physiological measurements of the recipient, such as by way of example only and not by way of limitation, impedance between the electrodes and tissue of the recipient and/or between each other, NRT, etc. In an exemplary embodiment, the buzzing can be a result of a physiological change, illness, etc. Indeed, in an exemplary embodiment, the auto clinician can ask the recipient whether or not certain physiological changes have occurred to him or her over a given period. Still further, in an exemplary embodiment, the auto clinician can access medical records of the recipient, which medical records could indicate that the recipient recently visited a dentist or a doctor or the like. That said, medical records per se may not necessarily be accessed, but instead, in an exemplary embodiment, the travel log of the recipient could be accessed. If an evaluation of that travel log indicates that the recipient was proximate a dentist or other healthcare professional, it can be inferred that the recipient had some form of physiological change, and the specific physiological change might be extrapolated therefrom. For example, if the recipient met with the dentist, it is entirely possible that some form of a bone conducted vibration could be causing a given input. In an exemplary embodiment, if the travel log of the recipient indicates that the recipient was on a football field, it could be extrapolated that the recipient was playing some form of contact sport, and thus something could have gone wrong with the device and/or something could have become misaligned as a result of a sudden blow to the recipient.

Again, in an exemplary embodiment, the auto clinician can consult sound processor device usage logs during the diagnostic. In an exemplary embodiment, the evaluation of the usage logs could indicate usage pattern anomalies, which could indicate usage pattern anomalies, indicating faults, physiological changes, inappropriate settings to the prostheses, etc. Still further, in an exemplary embodiment, the auto clinician can evaluate or otherwise perform an audit of current prosthesis settings. By way of example, the recipient may have inadvertently have placed an internal telecoil feature into operation, and thus might be picking up some form of electromagnetic noise that is causing the buzzing.

Still further, in an exemplary embodiment, continuing with the scenario where there is buzzing received by the recipient, the recipient's clinical history can be consulted by the auto clinician. By way of exemplary scenario, the recipient could have a history of intermittent tinnitus. In an exemplary embodiment, the auto clinician could inject a low-level noise into the signal path of the hearing prosthesis, which could mitigate the tinnitus. Still further by way of exemplary scenario, the consultation of the clinical history by the auto clinician could reveal that the recipient's audiogram indicates high sensitivity at the frequency of the noise in question. In this regard, the output gain/channel gain at the particular frequency can be temporarily reduced further than that which would otherwise be the case in an attempt to further reduce the perception of the buzzing.

Briefly, some exemplary inputs for the auto clinician can include, by way of example only and not by way of limitation:

a. Device microphone inputs (audio samples)
b. Signal processing algorithm states
c. Output stimulation characteristics
d. External audio environment measurements
e. Device Usage history
f. Device recent environmental measurements/samples
g. Device settings/present configuration
h. Geo-location and other context inputs
i. Device internal diagnostic measurements
j. Device-to-device stability measurements (audio data streaming, loosen coil attached to sound processor, etc.)
k. Physiological measurements (impedances, NRTs, etc.)
l. Clinical history
i. Including recipient maps, configurations, time of implantation, previous physiological measurements, audiograms, rehabilitation history, etc.

Any input that can have utilitarian value with respect to the teachings detailed herein and/or variations thereof, or otherwise can enable the auto clinician to function in utilitarian manner can be utilized in at least some exemplary embodiments.

Figure 20:
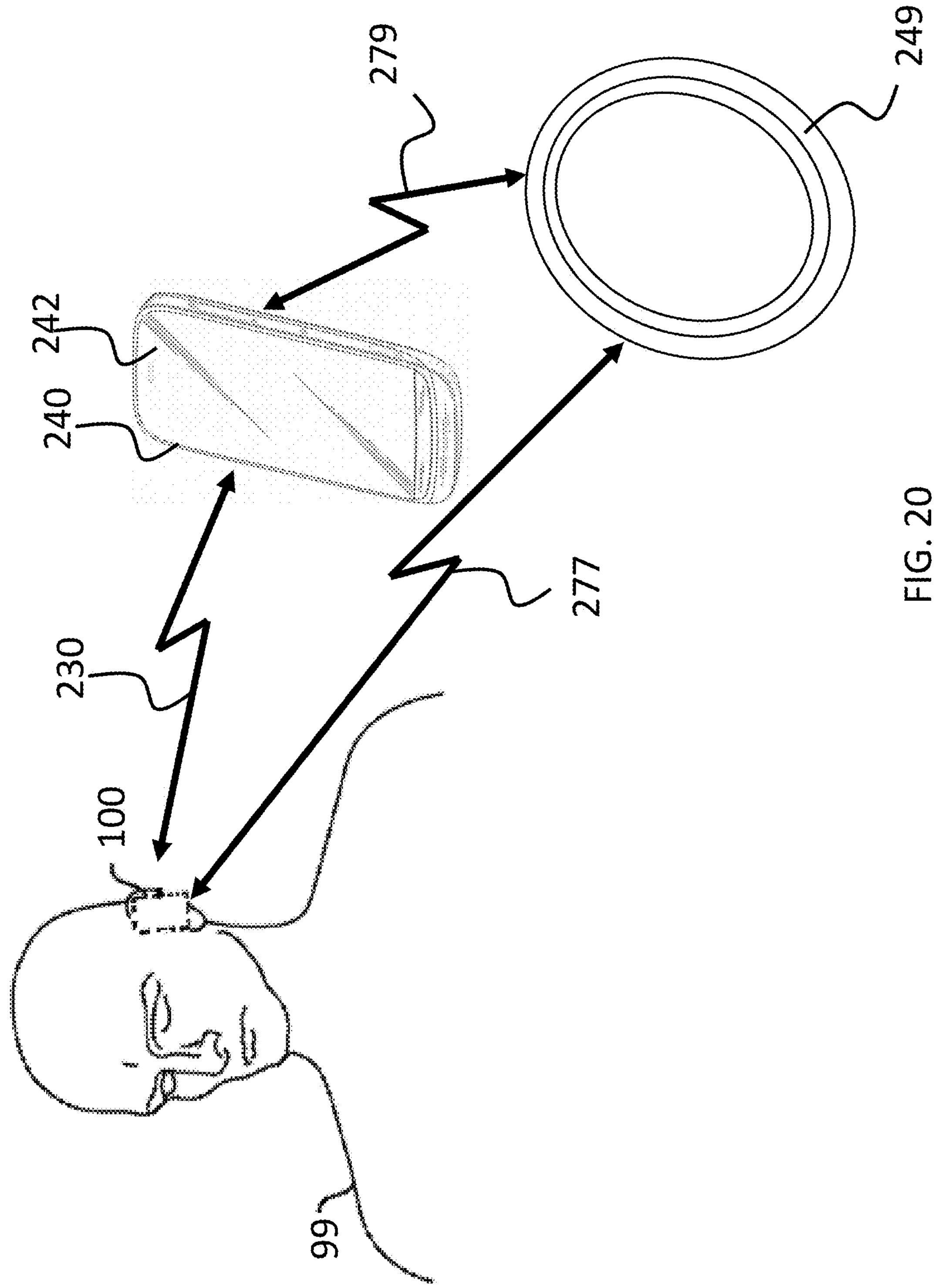
FIG. 20 presents an exemplary system including a hearing prosthesis and a remote device in the form of a portable handheld device, along with a wireless accessory in the form of a telecoil.

Briefly, with respect to solutions that can be provided to solve a problem, or with respect to scenarios that can create a problem, it is noted that in some instances the prosthesis can be used in conjunction with fixed components that operate with the prosthesis. For example, in an exemplary embodiment, a telecommunication infrastructure can be used in communication with the hearing prosthesis. Data provided to the hearing prosthesis can be data that can be indicative of the origin of an audio input (e.g., from cable television, Internet, radio wave transmission, laser beam transmission, room loop (where a telecoil is embedded or located within a floor, ceiling or wall, which telecoil transmits a signal to the hearing prosthesis 100, thereby providing audio input to the hearing prosthesis), etc.). FIG. 20 depicts an exemplary quasi-functional schematic depicting communication between an external audio source 249 (e.g., a telecoil), and the hearing prosthesis 100 and the handheld device 240 by way of links 277 and 279, respectively (note that FIG. 20 depicts two-way communication between the hearing prosthesis 100 and the external audio source 249, and between the handheld device and the external audio source 249—in alternate embodiments, the communication is only one way (e.g., from the external audio source 249 to the respective device)).

FIG. 18 presents a functional schematic of a system with which some of the teachings detailed herein and/or variations thereof can be implemented. In this regard, FIG. 18 is a schematic diagram illustrating one exemplary arrangement in which a system 1206 can be used to execute one or more or all of the method actions detailed herein in conjunction with the use of a hearing prosthesis 100. In an exemplary embodiment, system 1206 is the auto clinician/intelligent assistant detailed herein, and system 1206 has one or more or all of the functionalities detailed herein. System 1206 will be described, at least in part, in terms of interaction with a recipient. In an exemplary embodiment, system 1206 is a recipient activated and/or controlled system, while in other embodiments, it is an autonomous system, while in other embodiments, it is controlled remotely by a provider of services. In an exemplary embodiment, system 1206 can correspond to the remote device 240, which, as detailed above, can be a portable handheld device, and/or can be a personal computer, etc.

In an exemplary embodiment, system 1206 can be a system having additional functionality according to the method actions detailed herein. In the embodiment illustrated in FIG. 18, the hearing prosthesis 100 can be connected to system 1206 to establish a data communication link 1208 between the hearing prosthesis 100 and system 1206. System 1206 is thereafter bi-directionally coupled by a data communication link 1208 with hearing prosthesis 100. Any communications link that will enable the teachings detailed herein that will communicably couple the implant and system can be utilized in at least some embodiments.

System 1206 can comprise a system controller 1212 as well as a user interface 1214. Controller 1212 can be any type of device capable of executing instructions such as, for example, a general or special purpose computer, a handheld computer (e.g., personal digital assistant (PDA)), digital electronic circuitry, integrated circuitry, specially designed ASICs (application specific integrated circuits), firmware, software, and/or combinations thereof. As will be detailed below, in an exemplary embodiment, controller 1212 is a processor. Controller 1212 can further comprise an interface for establishing the data communications link 1208 with the hearing prosthesis 100. In embodiments in which controller 1212 comprises a computer, this interface may be, for example, internal or external to the computer. For example, in an exemplary embodiment, controller 1206 and cochlear implant may each comprise a USB, Firewire, Bluetooth, Wi-Fi, or other communications interface through which data communications link 1208 may be established. Controller 1212 can further comprise a storage device for use in storing information. This storage device can be, for example, volatile or non-volatile storage, such as, for example, random access memory, solid state storage, magnetic storage, holographic storage, etc.

User interface 1214 can comprise a display 1222 and an input interface 1224 (which, in the case of a touchscreen of the portable device, can be the same). Display 1222 can be, for example, any type of display device, such as, for example, those commonly used with computer systems. In an exemplary embodiment, element 1222 corresponds to a device configured to visually display a plurality of words to the recipient 1202 (which includes sentences), as detailed above.

Input interface 1224 can be any type of interface capable of receiving information from a recipient, such as, for example, a computer keyboard, mouse, voice-responsive software, touch-screen (e.g., integrated with display 1222), microphone (e.g. optionally coupled with voice recognition software or the like) retinal control, joystick, and any other data entry or data presentation formats now or later developed. It is noted that in an exemplary embodiment, display 1222 and input interface 1224 can be the same component, e.g., in the case of a touch screen). In an exemplary embodiment, input interface 1224 is a device configured to receive input from the recipient indicative of a choice of one or more of the plurality of words presented by display 1222.

It is noted that in at least some exemplary embodiments, the system 1206 is configured to execute one, or more, or all of the method actions detailed herein, where the various sub-components of the system 1206 are utilized in their traditional manner relative to the given method actions detailed herein.

In an exemplary embodiment, the system 1206, detailed above, can execute one or more or all of the actions detailed herein and/or variations thereof automatically, at least those that do not require the actions of a recipient.

While the above embodiments have been described for the most part in terms of the portable handheld device 240 obtaining the data upon which the display adjustments are based, and performing a given analysis, as noted above, in at least some exemplary embodiments, the data can be obtained at a location remote from the recipient, and thus the hearing prosthesis 100 and the portable handheld device 240. In such an exemplary embodiment, the system 210 can thus also include the remote location.

In this vein, it is again noted that the schematic of FIG. 18 is functional. In some embodiments, a system 1206 is a self-contained device (e.g., a laptop computer, a smart phone, etc.) that is configured to execute one or more or all of the method actions detailed herein and/or variations thereof. In an alternative embodiment, system 1206 is a system having components located at various geographical locations. By way of example only and not by way of limitation, user interface 1214 can be located with the recipient (e.g., it can be the portable handheld device 240) and the system controller (e.g., processor) 1212 can be located remote from the recipient. By way of example only and not by way of limitation, the system controller 1212 can communicate with the user interface 1214, and thus the portable handheld device 240, via the Internet and/or via cellular communication technology or the like. Indeed, in at least some embodiments, the system controller 1212 can also communicate with the user interface 1214 via the Internet and/or via cellular communication or the like. Again, in an exemplary embodiment, the user interface 1214 can be a portable communications device, such as, by way of example only and not by way of limitation, a cell phone and/or a so-called smart phone. Indeed, user interface 1214 can be utilized as part of a laptop computer or the like. Any arrangement that can enable system 1206 to be practiced and/or that can enable a system that can enable the teachings detailed herein and/or variations thereof to be practiced can be utilized in at least some embodiments.

Figure 19:
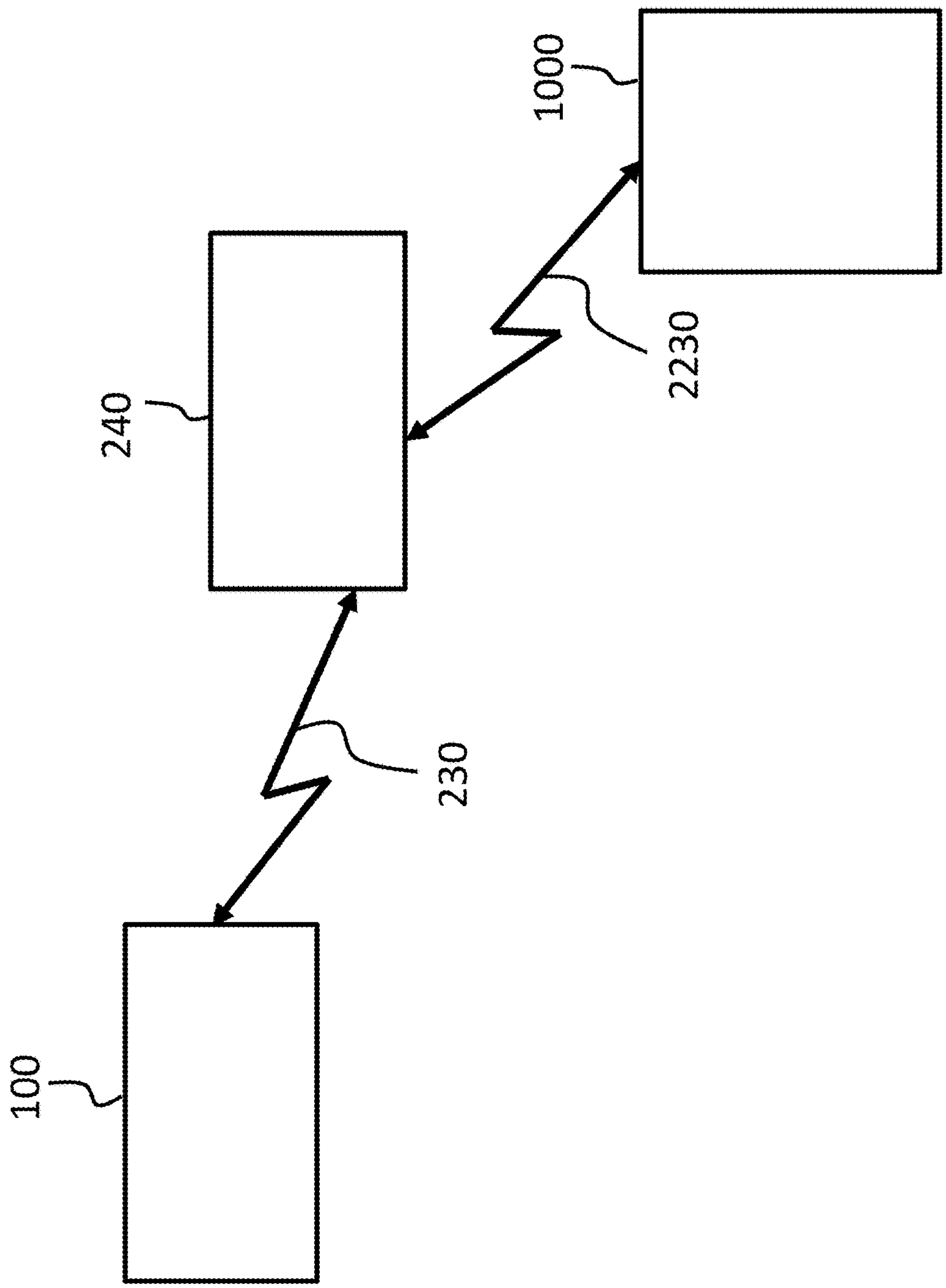
FIG. 19 presents another exemplary functional schematic of an exemplary system according to an exemplary embodiment.

In view of the above, FIG. 19 depicts an exemplary functional schematic, where the remote device 240 is in communication with a geographically remote device/facility 1000 via link 2230, which can be an internet link. The geographically remote device/facility 1000 can encompass controller 1212, and the remote device 240 can encompass the user interface 1214.

Accordingly, an exemplary embodiment entails executing some or all of the method actions detailed herein where the recipient of the hearing prosthesis, the hearing prosthesis 100 and/or the portable handheld device 240 is located remotely (e.g., geographically distant) from where at least some of the method actions detailed herein are executed.

In view of the above, it can be seen that in an exemplary embodiment, there is a portable handheld device, such as portable handheld device 240, comprising a cellular telephone communication suite (e.g., the phone architecture of a smartphone), and a hearing prosthesis functionality suite, (e.g., an application located on the architecture of a smartphone that enables applications to be executed that is directed towards the functionality of a hearing prosthesis) including a touchscreen display. In an exemplary embodiment, the hearing prosthesis functionality suite is configured to enable a recipient to adjust a feature of a hearing prosthesis, such as hearing prosthesis 100, remote from the portable handheld device 240 via the touchscreen display (e.g., by sending a signal via link 230 to the hearing prosthesis 100).

In an exemplary embodiment, the portable handheld device is configured to automatically analyze user use of the portable handheld device and present different hearing prosthesis functions on the display based on the automatic analysis, at least, in some exemplary embodiments, relative to that which would be the case in the absence of the analysis. Still further, in an exemplary embodiment, the portable handheld device is configured to automatically analyze user use of the portable handheld device and present different hearing prosthesis functions on the display, based on the automatic analysis that is different than that which was the case due to a prior analysis. In an exemplary embodiment, the contents of a given specific interface (e.g., a display of an application) is changed relative to that which was previously the case or otherwise would be the case, based on the aforementioned automatic analysis.

It is noted that in describing various teachings herein, various actions and/or capabilities have been attributed to various elements of the system 210. In this regard, any disclosure herein associated with a given functionality or capability of the hearing prosthesis 100 also corresponds to a disclosure of a remote device 240 (e.g., a portable handheld device) having that given functionality or capability providing that the art enable such and/or a disclosure of a geographically remote facility 1000 having that given functionality or capability providing that the art enable such. Corollary to this is that any disclosure herein associated with a given functionality or capability of the remote device 240 also corresponds to a disclosure of a hearing prosthesis 100 having that given functionality or capability providing that the art enable such and/or disclosure of a geographically remote facility 1000 having that given functionality or capability, again providing that the art enable such. As noted above, the system 210 can include the hearing prosthesis 100, the remote device 240, and the geographically remote device 1000. To be clear, in an embodiment, the auto clinician can be a part of the hearing prostheses. By way of example only and not by way of limitation, the functionality of the auto clinician can be based in components that are located in or otherwise part of the behind the ear device.

It is noted that any disclosure herein of a scenario where a hearing prosthesis and/or a recipient is having problems can correspond to a problem that is the subject of the methods devices and systems herein to which these methods devices and systems are directed at solving. It is noted that any disclosure herein of an automated assistant corresponds to a disclosure of the auto clinician, and vice versa.

It is noted that while the teachings here have often been directed towards the utilization of a display to convey data to the recipient, in alternative embodiments, other data conveyance systems can be utilized. In this regard, by way of example only and not by way of limitation, in an exemplary embodiment, instead of and/or in addition to a display, the remote device is configured to provide an interface audio message to the recipient. In an exemplary embodiment, the interface audio message provided to the recipient presents data corresponding at least in part to that which would be displayed on a display according to any of the teachings detailed herein. In this regard, any disclosure herein related to the use of a display and or data conveyance via a display corresponds to a disclosure of a use of an audio output as a substitute and/or as a supplement to the use of the display, wherein the use of the audio output corresponds to providing data in an audio format corresponding at least in part to that which is provided by the display(s) as detailed herein.

In an exemplary embodiment, this embodiment is enabled using technologies corresponding to those that enable a text to speech system that synthesizes speech based on text words to enable a person to be exposed to data verbally as opposed to visually.

Still further, any disclosure herein relating to the use of a display to convey data also corresponds to a disclosure of the use of a retina prosthesis or the like to present the data to the recipient. In at least some embodiments, any device, system, and/or method of presenting data detailed herein can be utilized to enable the embodiments detailed herein.

In an exemplary embodiment, there is a method of implementing a hearing prosthesis automated assistant on one or more computing devices having one or more processors and memory, the method comprising at the one or more computing devices: at an input device, receiving hearing prosthesis recipient input, the input invoking the automated assistant, the input being indicative of a problem associated with a hearing prosthesis of the recipient; interpreting the received recipient input to derive a representation of recipient intent; identifying at least one task based at least in part on the derived representation of user intent; and causing a first output to be provided based on the identified at least one task, the first output providing an attempted solution to the problem. In an exemplary embodiment of this method, the identified at least one task is a diagnostic task to diagnose why the recipient has the problem associated with the hearing prosthesis.

In an exemplary embodiment, there is an automated assistant operating on one or more computing devices, the automated assistant comprising an input device configured to receive first input based at least in part on usage of a prosthesis of a recipient, a dialog flow processor component, for identifying at least one prosthesis related task based least in part on the received first input; an action orchestration component, for identifying at least one action for responding to the identified task; and an output processor component configured to cause a first output to be provided based on the identified at least one action. In an exemplary embodiment, the prosthesis is a hearing prosthesis. In an exemplary embodiment, the automated assistant is configured to retrain itself based on a comparison between information in a database and information calculated by the automated assistant.

It is noted that any method detailed herein also corresponds to a disclosure of a device and/or system configured to execute one or more or all of the method actions associated there with detailed herein. In an exemplary embodiment, this device and/or system is configured to execute one or more or all of the method actions in an automated fashion. That said, in an alternate embodiment, the device and/or system is configured to execute one or more or all of the method actions after being prompted by a human being. It is further noted that any disclosure of a device and/or system detailed herein corresponds to a method of making and/or using that the device and/or system, including a method of using that device according to the functionality detailed herein.

It is noted that embodiments include non-transitory computer-readable media having recorded thereon, a computer program for executing one or more or any of the method actions detailed herein. Indeed, in an exemplary embodiment, there is a non-transitory computer-readable media having recorded thereon, a computer program for executing at least a portion of any method action detailed herein.

It is further noted that any disclosure of a device and/or system detailed herein also corresponds to a disclosure of otherwise providing that device and/or system.

While various embodiments of the present invention have been described above, it should be understood that they have been presented by way of example only, and not limitation. It will be apparent to persons skilled in the relevant art that various changes in form and detail can be made therein without departing from the spirit and scope of the invention.

What is claimed is:

1. A method, comprising:

implementing a hearing prosthesis automated assistant on one or more computing devices having one or more processors and memory, the method further comprising:

at the one or more computing devices:

at an input device, receiving hearing prosthesis recipient input, the input invoking the automated assistant, the input being indicative of a problem associated with a hearing prosthesis of the recipient;

interpreting the received recipient input to derive a representation of recipient intent;

identifying at least one task based at least in part on the derived representation of user intent; and causing a first output to be provided based on the identified at least one task, the first output providing an attempted solution to the problem, the first output being at least one of direct communication to the recipient, wherein the received recipient input is an affirmative request by the recipient to solve the problem, and the affirmative request is spoken as part of a back and forth conversation with the automated assistant.

2. The method of claim 1, wherein:

the problem is the recipient having difficulty distinguishing between machine produced sounds.

3. The method of claim 1, wherein:

the problem is the recipient perceiving sounds that should not be present.

4. The method of claim 1, wherein:

the hearing prosthesis recipient input is at least bifurcated between a first input that initially invokes the automated assistant and a second input that that conveys the problem to the input device.

5. The method of claim 1, wherein:

the input is fitting related input.

6. The method of claim 1, wherein:

the identified at least one task is a diagnostic task to diagnose why the recipient has the problem associated with the hearing prosthesis.

7. The method of claim 1, wherein:

the first output is an automatic change to the hearing prosthesis coupled with the direct communication to the recipient, the direct communication indicating the automatic change to the hearing prosthesis.

8. The method of claim 1, wherein:

the actions of interpreting, identifying and causing are executed totally by one of the one or more computing devices locally located with the hearing prosthesis.

9. The method of claim 1, wherein:

the method is a method of implementing an auto hearing prosthesis clinician functionality of the computing device.

10. The method of claim 1, further comprising:

receiving input at the input device indicative of a recipient's desire to change a setting of the hearing prosthesis;

evaluating the input indicative of the recipient's desire; and based on the evaluation, warning the recipient of a consequence of changing the setting.

11. The method of claim 1, wherein:

the method is a method of mitigating tinnitus.

12. The method of claim 1, further comprising identifying the problem that the recipient is having using reference to a common user group.

13. The method of claim 1, wherein the received recipient input is a statement that people do not typically use in a conversation, with another person, that is unrelated to a hearing device.

14. The method of claim 1, wherein the affirmative request is spoken directly to the hearing prosthesis automated assistant for the sole purpose of conveying that there is the problem associated with the hearing prosthesis of the recipient.

15. The method of claim 1, further comprising receiving, at the input device, a passive indication from the recipient that there is a problem to be solved, the problem to be solved is the problem associated with the hearing prosthesis of the recipient, and causing a second output to be provided based on the passive indication.

16. The method of claim 1, further comprising:

receiving input at the input device indicative of a recipient's desire to change a setting of the hearing prosthesis and evaluating the input indicative of the recipient's desire and automatically taking an action by way of the one or more computing devices, based on the evaluation.

17. The method of claim 1, wherein:

the first output is text output.

18. The method of claim 1, wherein:

the first output is sound output.

19. A system, comprising:

a prosthesis of a recipient; and an automated assistant operating on one or more computing devices, the automated assistant comprising:

an input device configured to receive first input based at least in part on usage of the prosthesis of a recipient;

a dialog flow processor component, for identifying at least one prosthesis related task based least in part on the received first input; and an output processor component configured to cause a first output to be provided based on an identified at least one action, wherein the automated assistant is configured to be in signal communication with a geographically remote device, and to provide data indicative of the identified at least one prosthesis related task to the geographically remote device, and to receive data from the geographically remote device corresponding to the identified at least one action for responding to the identified task, and the system is configured to automatically fit the hearing prosthesis based on the first output.

20. The system of claim 19, further comprising:

a prosthesis interface configured to communicate with the prosthesis of the recipient, wherein:

the first input is received directly from the prosthesis, the first input is indicative of a change of a setting of the prosthesis, and the prosthesis related task is an evaluation of the change of the setting, setting.

21. The system of claim 19, further comprising:

a prosthesis interface configured to communicate with the prosthesis of the recipient, wherein the first input is received directly from a recipient of the prosthesis, the first input is indicative of a problem that the recipient is having related to his or her use of the prosthesis, the prosthesis related task is an evaluation of the problem, the identified at least one action is a change that can be made to the prosthesis that might improve the problem, and the first output is output to at least one of the recipient or the prosthesis that contains instructions on adjusting the prosthesis to alleviate the problem.

22. The system of claim 19, wherein:

the first input is indicative of a problem that the recipient is having related to his or her use of the prosthesis, the prosthesis related task is an evaluation of the problem, the automated assistant further comprises:

an input orchestration component, for calling at least one second input in addition to the first input, the at least one second input having utility for performing the identified task, the input orchestration component is configured to evaluate the at least one second input and identify an action that is a change that can be made to the prosthesis that might improve the problem.

23. The system of claim 22, wherein:

the input orchestration component is configured to select a particular kind of second input depending on the first input.

24. The system of claim 22, further comprising:

the geographically remote device, wherein the geographically remote device includes an action orchestration component, for identifying the at least one action for responding to the identified task.

25. The system of claim 22, wherein:

the automated assistant is configured to retrain itself based on a comparison between information in a database and information calculated by the automated assistant.

26. The system of claim 22, wherein:

the automated assistant is configured to retrain itself.

27. The system of claim 22, wherein the system is configured to identify the problem that the recipient is having using reference to a common user group.

28. The system of claim 19, wherein:

the automated assistant is configured to retrain itself based on a comparison between information in a database and information calculated by the automated assistant.

29. The system of claim 19, wherein:

the automated assistant is configured to be in signal communication with a geographically local device.

30. The system of claim 19, wherein:

the automated assistant is configured to execute a diagnostic function related to a problem associated with utilization of the prosthesis that prevents improved performance; and the system includes a means for orchestrating actions, the means for orchestrating actions corresponding to the geographically remote device, wherein the prosthesis is a means for evoking a hearing percept in the recipient.

31. The system of claim 19, wherein:

the automated assistant is configured to dynamically add and remove services without disrupting code.

32. The system of claim 19, wherein:

the automated assistant is configured to implement distributed query optimization algorithms that are driven by properties and capabilities rather than hard coded to specific services or application programming interfaces.

33. A method, comprising:

at an input device, receiving input from a prosthesis recipient and/or the prosthesis;

invoking an automated assistant implemented on one or more computing devices;

interpreting the received recipient input, if present, to derive a representation of a recipient problem and analyzing data to develop a solution to the recipient problem;

interpreting the received prosthesis input, if present, to identify a possible problem associated with operating the prosthesis in a manner indicated by the input;

causing a first output to be provided via an output interface of the automated assistant, the first output providing the solution to the recipient problem and/or warning of the possible problem; and automatically fitting the hearing prosthesis based on the first output.

34. The method of claim 33, further comprising:

initiating an action of automated obtaining of additional input beyond the received recipient input, wherein the additional input is included in the data analyzed to develop the solution to the recipient problem, wherein the additional input includes ambient environment data of the recipient, the data automatically captured by the prosthesis.

35. The method of claim 33, further comprising:

initiating an action of automated obtaining of additional input beyond the received recipient input, wherein the additional input is included in the data analyzed to develop the solution to the recipient problem, wherein the additional input includes clinical data associated with the recipient's prosthesis related condition.

36. The method of claim 33, further comprising:

after deriving the representation of the recipient problem, identifying one or more data parameters that are relevant to the recipient problem.

37. The method of claim 33, wherein at least one of:

the action of analyzing data to develop a solution to the recipient problem is a diagnostic function; or the action of interpreting the received prosthesis input to identify the possible problem includes referencing a common user group to identify the possible problem.

38. The method of claim 33, further comprising:

identifying at least one of a plurality of core competencies of the automated assistant.

39. The method of claim 38, wherein:

the at least one of the plurality of core competencies is improving speech communication.

40. The method of claim 1, further comprising:

automatically fitting the hearing prosthesis based on the first output.

41. The method of claim 33, further comprising:

the received input from the prosthesis recipient and/or the prosthesis is from the prosthesis recipient, and the input is based on a statement by the recipient as to what he or she wants in terms of properties of a desired outcome of an adjustment to the prosthesis.

* * * * *